US011400850B1

(12) United States Patent
Curtis, III

(10) Patent No.: US 11,400,850 B1
(45) Date of Patent: Aug. 2, 2022

(54) STOWABLE MODULAR UTILITY LIFT SYSTEM

(71) Applicant: Donald Raymond Curtis, III, Perry, FL (US)

(72) Inventor: Donald Raymond Curtis, III, Perry, FL (US)

(*) Notice: Subject to any disclaimer, the term of this patent is extended or adjusted under 35 U.S.C. 154(b) by 0 days.

(21) Appl. No.: 17/349,838

(22) Filed: Jun. 16, 2021

(51) Int. Cl.
*B60P 1/44* (2006.01)
*B60P 1/02* (2006.01)
*B60R 9/06* (2006.01)

(52) U.S. Cl.
CPC ............. *B60P 1/4414* (2013.01); *B60P 1/022* (2013.01); *B60P 1/025* (2013.01); *B60R 9/06* (2013.01); *Y10S 414/13* (2013.01)

(58) Field of Classification Search
CPC ....... B60P 1/022; B60P 1/4407; B60P 1/4414; B60R 9/06; B66F 9/146; B66F 9/147; E02F 3/3408; E02F 3/3604; Y10S 414/13
USPC .................................................. 414/462, 607
See application file for complete search history.

(56) References Cited

U.S. PATENT DOCUMENTS

| | | | | |
|---|---|---|---|---|
| 2,298,166 A * | 10/1942 | Richards | ............... | B60P 1/4414 414/557 |
| 2,683,540 A * | 7/1954 | Wood | .................... | B60P 1/4414 414/557 |
| 3,700,123 A * | 10/1972 | Corley, Jr. | ............ | B60P 1/4414 414/557 |
| 3,779,406 A * | 12/1973 | Hermann | .............. | B60P 1/4414 414/557 |
| 4,519,739 A * | 5/1985 | Risch | ....................... | E02F 3/404 414/704 |
| 4,787,809 A * | 11/1988 | Zrostlik | ................ | B60P 1/4414 414/557 |
| 4,813,842 A * | 3/1989 | Morton | ................. | B60P 1/4414 414/557 |
| 5,456,564 A * | 10/1995 | Bianchini | ................ | B60P 3/07 414/462 |
| 5,951,236 A | 9/1999 | Thompson | | |
| 6,869,265 B2 * | 3/2005 | Smith | ................... | B60P 1/4407 414/462 |
| 6,932,555 B2 * | 8/2005 | Dale | ........................ | B66F 9/06 187/226 |
| 8,342,540 B1 | 1/2013 | Marleau | | |
| 8,689,898 B2 | 4/2014 | Benesch | | |

(Continued)

FOREIGN PATENT DOCUMENTS

| | | | | |
|---|---|---|---|---|
| JP | 8-301587 A | 11/1996 | | |
| KR | 10-1126148 B1 | 3/2012 | | |
| KR | 101515881 B1 * | 5/2015 | ............. | B66F 9/146 |

OTHER PUBLICATIONS

International Search Report dated Mar. 9, 2022 in International Application No. PCT/US2021/041655.

*Primary Examiner* — James Keenan
(74) *Attorney, Agent, or Firm* — Saliwanchik, Lloyd & Eisenschenk

(57) ABSTRACT

The subject invention pertains to stowable, modular lift conversion systems configured for aftermarket or OEM application to a truck, all-terrain vehicle (ATV), or utility task vehicle (UTV). Lift systems provided include removable and mounted systems with power provided by a battery, a winch, or linear motion device either on the lift or on the vehicle. Modular implements and lift attachments are provided.

18 Claims, 57 Drawing Sheets

(56) References Cited

U.S. PATENT DOCUMENTS

| | | | |
|---|---|---|---|
| 8,974,169 B2* | 3/2015 | Mizner | B60P 1/5428 |
| | | | 414/462 |
| 9,731,642 B2 | 8/2017 | Narinen | |
| 10,160,395 B2* | 12/2018 | Robinson | B66F 11/04 |
| 10,384,617 B1 | 8/2019 | Keyset | |
| 10,480,154 B2* | 11/2019 | Breuer | E02F 3/30 |
| 10,682,964 B1 | 6/2020 | Turner et al. | |
| 10,717,636 B2* | 7/2020 | Addicott | B66F 9/125 |
| 2005/0254925 A1* | 11/2005 | Braquet | B60P 1/4414 |
| | | | 414/462 |
| 2006/0120841 A1* | 6/2006 | Meeks | B60P 1/4407 |
| | | | 414/462 |
| 2007/0166138 A1* | 7/2007 | Brooks | B66F 9/082 |
| | | | 414/471 |
| 2008/0292435 A1 | 11/2008 | Turner et al. | |
| 2010/0290876 A1 | 11/2010 | Conatser | |
| 2011/0085880 A1 | 4/2011 | Davis et al. | |
| 2016/0167933 A1 | 6/2016 | Birch et al. | |
| 2021/0331538 A1* | 10/2021 | Kato | B60R 9/06 |

\* cited by examiner

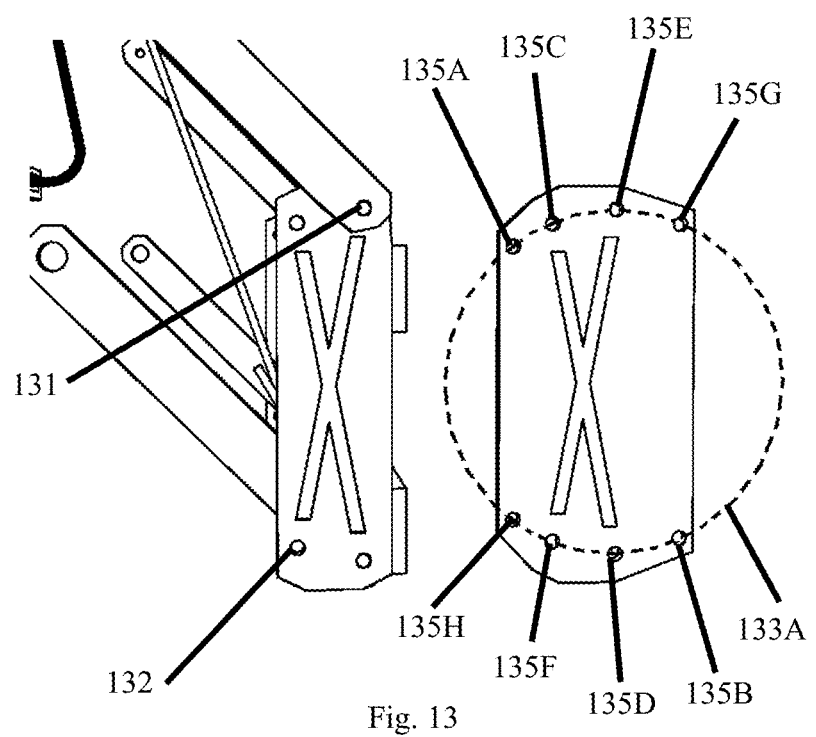

STOWABLE MODULAR UTILITY LIFT SYSTEM

BACKGROUND OF THE INVENTION

In the United States, throughout North America, and around the world there are a large number of trucks, all-terrain vehicles, and utility vehicles in use for personal, recreational, industrial, or mixed applications.

According to Polaris Inc.'s 2020 Annual Shareholder Report (Form 10-K, Page 3), 2020 retail sales of all manufacturers' all-terrain vehicles ("ATVs") and utility task vehicles ("UTVs" or "side-by-side") were as follows:

| | |
|---|---|
| North America ATV retail sales | 345,000 |
| North America side-by-side retail sales | 640,000 |
| Worldwide ATV retail sales | 465,000 |
| Worldwide side-by-side retail sales | 690,000 |

According to General Motor Company's 2020 Annual Shareholder Report (Form 10-K, Page 2), 4,055,000 trucks were sold in the United States in 2020 alone.

Although a smaller portion of the millions sold each year, many trucks come equipped with bumpers and brush guards, or have the same installed aftermarket.

These vehicles may be adapted and particularly suitable for a variety of applications both on and off-road. These vehicles may also be well suited to reach and operate in areas where a traditional fork-lift or lift-equipped tractor is not readily available, is inconvenient to access, or is not suited to operate. For example, a fork-lift may not be able to traverse an unpaved construction or agricultural site. Additionally, conventional commercial lifts, tractors, and the like may be large, heavy, expensive, and otherwise not practical to deploy in many situations including remote sites, areas lacking in improved road access, or tight spaces created by geographical features, trees, or structures.

There exists a need in the art for improved lifting capabilities on trucks, ATVs, and UTVs as evidenced by review of the patent literature.

Marleau (U.S. Pat. No. 8,342,540) teaches a vehicle implement pivotally connected to a frame by at least one arm. The vehicle implement is pivotable between a first position and a second position, vertically higher than the first position. A suspension limiter restricts movement of the left and right suspensions.

Benesch (U.S. Pat. No. 8,689,898) teaches a removable loader for a vehicle wherein the removable loader is configured to pivot about the first pivotal axis and the implement is configured to pivot about the second pivotal axis each by only one winch.

Turner et al. (U.S. Pat. No. 10,682,964) teaches a load lifting system for use on a vehicle comprising a plurality of mounting members and a load lifting assembly.

Keyser (U.S. Pat. No. 10,384,617) teaches a vehicle loader/carrier system comprising a fixed frame, a movable frame, and motion imparting mechanisms including upper links and lower links being curved with a center of curvature above the system when the movable frame is in the lowered orientation and with a center of curvature forwardly of the system when the movable frame is in the raised orientation.

While the above references focus generally on adding some utility to trucks, ATVs, and/or UTVs, they each exhibit shortcomings in cost, complexity, bulk, size, weight, adaptability, or ease of use. Some are limited to specific tasks such as plowing. All require a level of integration with and in some cases modifications of design or construction in the subject vehicle. None fully meet the needs of a stowable modular utility lift system.

BRIEF SUMMARY OF THE INVENTION

Embodiments of the subject invention provide a compact and easily stowed modular lift system designed to transform an ATV, UTV, or truck into a highly portable powered lift and transport. Applications may include vehicles such as ATVs, UTVs, trucks, cars, buses, golf carts, lawn carts, mowers, tractors, and other vehicles known in the art.

In certain embodiments the modular design on the back end (e.g., the end facing the vehicle) may be lifted off of one vehicle and placed in storage or on another vehicle in seconds without adjustment, modifications, or removal of fastening mechanisms. In alternate embodiments the modular design may provide specific adjustment, modifications, or removal of fastening mechanisms to adapt to different vehicles or storage configurations.

The novel x-plate adjustable members allow the lift to be adapted quickly and easily to mount on vehicles of different geometry. The modular design on the front end (e.g., the end facing away from the truck/ATV/UTV) allows a wide variety of implements to be attached quickly and easily; again, without the necessity of fastening mechanisms.

Many UTVs and ATVs are factory equipped with steel brush guards on the front facing end, mounted to the frame of the vehicle. (e.g., A visual review of the 2021 Polaris RANGER Model Lineup from https://ranger.polaris.com/en-us/utvs/ shows 17 of 17 models categorized as 2-Seat, 3-Seat, Special Editions, or CREW are pictured with a factory installed brush guard, while only one model categorized as Youth is pictured without a factory installed brush guard.)

Although the brush guard designs vary widely, many UTV brush guards and ATV brush guards may have at least 18 inches of 1.5" diameter horizontal steel tubing extending across the front of the vehicle. Of those vehicles, a significant number come equipped with cable winches that can be used to pull an ATV or UTV from the mud, or used to drag heavy objects. Cable winches are also available as an aftermarket add-on or upgrade.

Additionally, ATVs and UTVs are commonly factory equipped or aftermarket outfitted with a rear facing two-inch hitch receiver. Front facing two-inch hitch receivers are also available.

Yet there persists a need in the art for a lift that is compact, adaptable, portable, modular, simple, light-weight, and flexible.

The designs set forth herein serve to create incredibly powerful yet simple lift systems for trucks, ATVs, and UTVs, utilizing a combination of the existing vehicle frame, a brush guard, and a winch (if available) or linear actuators in the absence of a winch.

Whether a construction site, farm, factory, or forest, the usefulness of the ability to quickly convert any ATV or UTV effectively into an off-road capable forklift cannot be overstated.

For example, a pallet of roofing shingles is delivered to the one corner of the large construction site, but needs to get to the opposite end. The forklift will get stuck if not on pavement, so it is of no use since the area is not yet paved. And the Foreman didn't foresee the need to have a tractor on site. But, the Foreman has a stowable modular utility lift system as described herein. With ease, the Foreman deploys the system on his job site UTV or truck and is able to lift and transport the pallet as needed.

As the Foreman is to the pallet, so too is the farmer to the bale of hay, the equestrian to bags of feed, the hunter to downed game; and so on.

Since truck brush guards, unlike with ATVs and UTVs, vary widely with few common design elements providing a uniform add on lift system may present additional challenges. Instead, integrally designing the lift system within a brush guard allows for manufacturers and aftermarket dealers to equip a truck with an integrated stowable modular utility lift system.

Additionally, the majority of trucks are factory equipped or aftermarket outfitted with a rear facing 2-inch (or other standard size, e.g., 1¼", 2½", 3", or 50 mm) hitch receiver in the rear that would allow for quick attachment of a non-integral stowable modular utility lift system.

The designs set forth herein serve to create incredibly powerful, yet simple, lift systems for trucks, utilizing a combination of the subject stowable modular utility lift system (integral or non-integral) and the existing vehicle frame or hitch receiver.

In the prior example, the Foreman still needs to transport a load of construction materials across the job site.

Fortunately for the Foreman, he has a stowable modular utility lift system as described herein that he can fit into his 2-inch hitch receiver.

The Foreman is an overachiever though, and has outfitted his truck with the integral version of the stowable modular utility lift system. With ease, the Foreman employs either system and is able to lift and transport the pallet with his truck as needed.

Again, whether a job Foreman, famer, equestrian, hunter, or otherwise, the value of being able to use existing motorized vehicles to lift and transport heavy and/or awkward loads without the need for a dedicated forklift or tractor cannot be overstated.

A prototype in accordance with embodiments of the subject invention has been used to move horse trailers, utility trailers, boat trailers with boat, horse feed, hay, pallets loaded down with 400 pounds of potting soil, 8 foot long by 18 inch diameter logs, and other heavy loads. Embodiments have also been used to pick up a tractor box blade and even a tractor harrow and move them from one location to another. Potential implements include but are not limited to platforms or containers that would enable easy transport of a wide variety of loads, including downed livestock, injured persons, medical supplies, or construction materials.

By redirecting the pull capacity of existing ATV/UTV winches (e.g., 4,500 pounds tension from model 45RC manufactured and sold by Warn Industries, Inc., located in Clackamas, Oreg.), embodiments provide the user with substantial lift and carry capacity (e.g., easily providing up to 4,500 pounds vertical lifting force depending on the angles and leverage ratios selected) where it would not otherwise be available. In trucks, winch tension capacity is typically up to 12,000 pounds. Where linear actuators are used in lieu of a winch, lift capacities may range from 250 pounds to 10,000 pounds depending on the motor and gear ratio utilized. In all examples, the effective lift capacity may be limited by or designed around the ultimate load carrying capacity of the vehicle.

In addition to recreational, agricultural, construction, commercial, and home-use applications suited to embodiments of the subject invention, the military, law enforcement, fire rescue, public works, and parks management applications are nearly innumerable. ATV/UTV vehicles are a longstanding and growing part of military and public service operations (see, e.g., military.polaris.com/en-us/about and www.popularmechanics.com/military/a17336/special-forces-atv-marines-army/). The modularity, flexibility, simplicity, and robust nature of the subject invention unlock immense value in governmental and public service applications.

Embodiments provide rapid conversion of existing vehicles into cargo lifts, immediately enhancing the utility of existing equipment. For example, a military, government, or public service unit in operation with or supported by multiple single-rider or multi-passenger light vehicles (e.g., jeeps, hummers, UTVs, and ATVs) can provide cargo lift and transport functionality to any available vehicle with a modular lift according to an embodiment of the subject invention, then either remove the lift from the vehicle, or place the lift in a stowed configuration until needed again. In this manner, a single lift or a small number of lifts may serve a large number of vehicles in a service area.

BRIEF DESCRIPTION OF THE DRAWINGS

FIG. 13 shows two x-plate designs according to embodiments of the subject invention.

DETAILED DISCLOSURE OF THE INVENTION

Figure 1A:
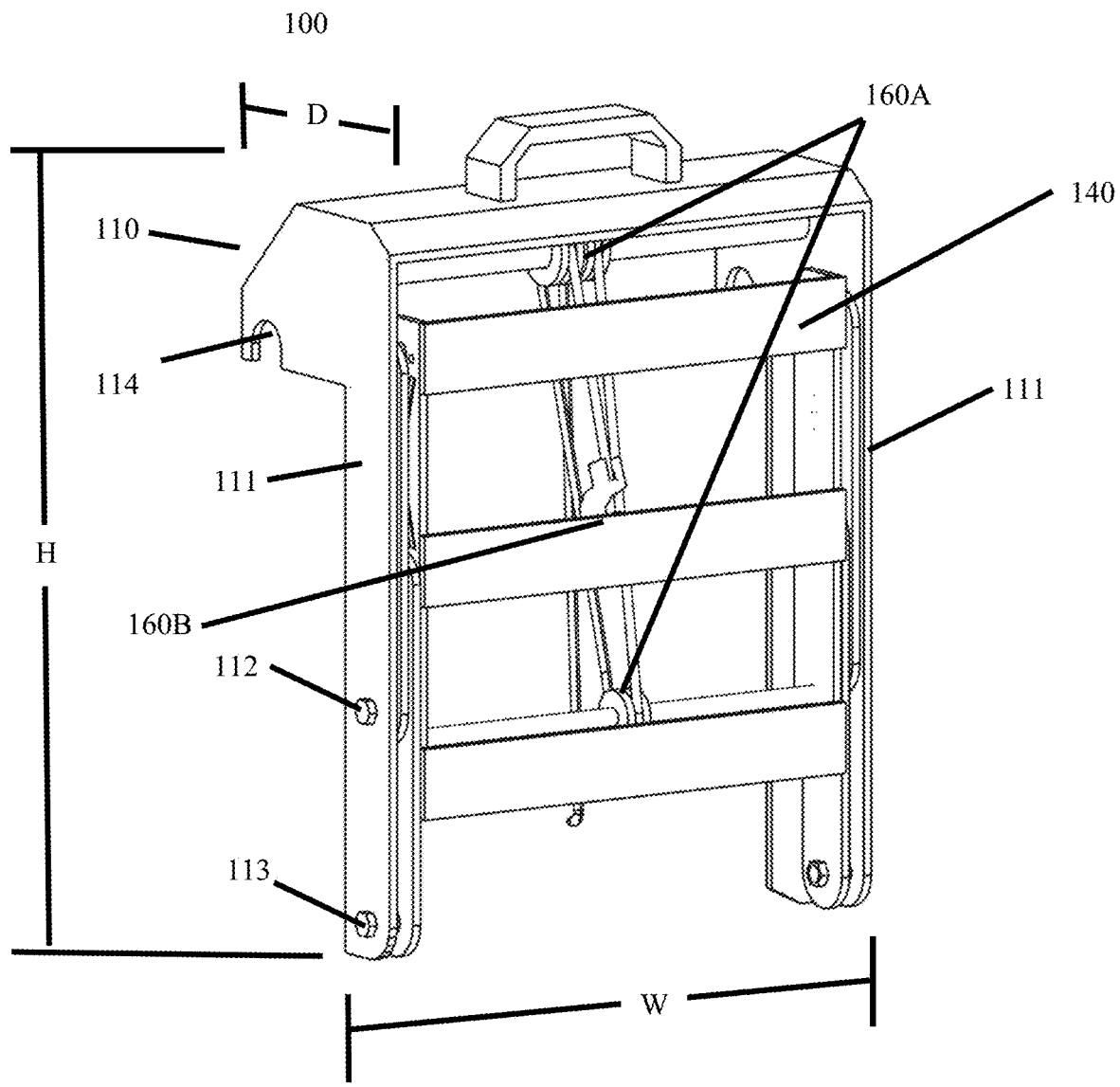
FIG. 1A shows a modular lift conversion system for mounting on an existing vehicle rack or guard in accordance with an embodiment of the subject invention in perspective view. The lift is in a stowed configuration and ready for mounting on a vehicle.

Embodiments of the subject invention provide a compact and easily stowed modular lift system designed to transform an ATV, UTV, or truck into a highly portable fork-lift.

In an ATV/UTV embodiment, when in a stowed configuration, the lift may measure approximately 24" high×18" wide×14". When ready for use, the user may unfold the lift and place it on the top horizontal rail of an ATV or UTV grill guard. The ATV or UTV's winch may be threaded through the lift's pulleys, and the winch hook attached to a connection point (e.g., a winch ring.)

The user does not need to bolt or strap down the lift, as it may be secured to the ATV or UTV by a combination of gravity, leverage, and downward force of the winch cable. The user is then ready to lift loads (e.g., up to 600 pounds or 1,000 pounds in certain embodiments) simply by pushing his or her ATV/UTV winch button.

In one embodiment, a top bracket sits on the horizontal bar of an ATV, UTV, or truck. The combination of the winch cable being applied to the lift along with the forward weight of the implement mount plates, forces the vertical braces press against the grill guard of the vehicle, causing the lift to be secured to the vehicle. The lift may hang on the vehicle's grill guard in a stowed configuration, or in an extended or deployed position where a movable frame, a modular implement base, implement bar, or frame members extend (e.g., by folding out and down.) Once deployed (e.g., into an extended position), multiple modular implements may be placed upon the front implement plates, including but not limited to a trailer ball for moving trailers, a pair of narrow forks (e.g., for carrying lighter loads), or a seat lift for low speed riding (e.g., quail hunting.) An alternative embodiment provides a vertical or near vertical fork-lift design, using the same modular hang on back-end that enables attachment to multiple different vehicles without latches or bolts. The winch cable may feed through a pulley at the top of the rail, then pull the lift directly up.

Further embodiments provide a line, family, or kit of multi-vehicle, multi-power, modular vehicle lift conversion systems providing on and off-road vehicles the ability to quickly transform existing components and/or systems to lift systems. In certain embodiments the implement mounting bars are designed to be modular such that implements can readily be made compatible for mounting across multiple lift systems or on multiple vehicles. A vertical adaptive alignment plate affixed, attached, or connected to the implement mounting bars to allow for pitch adjustments to easily be made (e.g., by providing multiple attachment points or adjustable attachments to vary the angle of the x-plate or implement mounting bar.) The adaptive alignment plate may be referred to herein as the "X-Plate" or "x-plate" and may refer to a single plate, a pair of plates, an opposing pair of plates, or a multitude of plates. Since it is common for brush guards to have slight design variations (e.g., some pitch forward, some pitch rearward, and some are vertical or near-vertical) the X-Plate allows a user to adjust for an individual vehicle's brushguard, frame, or bumper pitch following installation, without removing the lift from the vehicle, and without altering, weakening, or increasing the cost and complexity of the fixed frame or vehicle attachment elements. The adaptive alignment plate, or x-plate, provides direct and simplified adjustment of the critical alignment of implements (e.g., modular implements including lifting forks) at the end of the kinematic chain nearest the load, while simultaneously allowing for simpler, more cost effective, more robust, and more reliable structures where the lift mounts to the vehicle. The adaptive alignment plate is itself also a simpler, more cost effective, more robust, and more reliable alignment and attachment mechanism compared to other methods (e.g., hydraulics, electric motors, or more complex mechanical linkages commonly employed to adjust alignment.)

The x-plate may have multiple or adjustable attachment points configured to adjust the ultimate pitch or alignment of the modular implement base or implements. Alternatively, the x-plate or adaptive alignment plate may have one or more simple or fixed alignment points (e.g., a pair of drilled holes) and one or more of the upper pivot arms and lower pivot arms may have multiple or adjustable mounting points configured to adjust the ultimate pitch or alignment of the modular implement base or implements.

Embodiments provide a mounting system that uses gravity to create a combination of downward and rearward pressure that secures a lift to a vehicle, optionally also using the downward and rearward pressure of the vehicle's winch cable as additional security while also serving as the lift motor.

Embodiments provide a brush guard for a vehicle (e.g., a truck, ATV, or UTV.) Within the confines of what would otherwise be a traditional brush guard may be stowed a lift system that utilizes a winch. The winch cable extends up and over the horizontal pulley bar, then down to the modular implement base or lower horizontal implement bar. Once deployed, various implements may be hung upon the one, two, or multiple (e.g., 3, 4, or more) horizontal implement bars with or without any type of fastener being used to secure them.

Embodiments provide a compact lift conversion system that affixes to the front brush guard of most existing UTVs (or ATVs or trucks) on the market. The system utilizes a combination of the UTV's existing winch, gravity, and rearward facing pressure to secure the unit to the UTV. The winch also serves to power the lift mechanism, by running up and over the horizontal pulley bar. In certain embodiments the horizontal pulley bar may be advantageously placed as high and as far forward as possible or as practical within a given design and considering other design constraints. Depending on where an existing winch is mounted on a UTV, placement (e.g., further rear placement) of the pulley bar may in some cases cause the winch to rub against the UTV causing frays to the cable, causing damage to the vehicle, or preventing utilization of the winch altogether. Because UTVs have various different shapes and sizes of brush guards, by having the pulley bar high and forward, the number that are compatible with the unit is maximized. The winch cable may extend up and over the horizontal pulley bar, then down to the lower horizontal implement bar. The angle of the winch cable as it exits the existing winch and runs up to the horizontal pulley bar may be minimized (e.g., between 0 and 20 degrees, alternatively 1, 2, 3, 4, 5, 6, 7, 8, 9, 10, 11, 12, 13, 14, 15, 16, 17, 18, 19, or 20 degrees, including ranges, increments, and combinations thereof.) This may create downward and rearward pressure even when not under external load, causing the unit to remain securely affixed to the UTV. Once deployed, various implements may be hung upon the two horizontal implement bars without any type of fastener being used to secure them, or alternatively, with a fastener, catch, latch, or lock to hold the implement in place or limit motion of the implement.

Embodiments provide a compact lift conversion system that affixes to the front brush guard of most existing UTVs on the market. It is intended for use with UTVs without a winch, or for users who do not wish to employ their UTV's winch. It utilizes a combination of the gravity and rearward facing pressure to secure the unit to the UTV. A linear actuator, powered by any standard hand-tool battery (e.g., batteries from Dewalt, Ryobi, Milwaukee) serves to power the actuator, thus powering the lift function. Alternatively, a conventional linear actuator (e.g., Warn ProVantage Power Lift, from Warn Industries, Clackamas, Oreg.) may power the lift. Once deployed, various implements may be hung upon the horizontal implement bars without any type of fastener being used to secure them.

Embodiments provide a lift conversion system that affixes to the front brush guard of most existing UTVs (or ATVs or trucks) on the market, utilizing a combination of the vehicle's existing winch, gravity, and rearward facing pressure to secure the unit to the vehicle. The vehicle's winch also serves to power the lift mechanism, by running up and over the horizontal pulley bar. The horizontal pulley bar is placed as high as possible so as to raise the lift bracket up the vertical guiderails. The winch cable, by design, creates a retaining force (e.g., a downward or rearward pressure) even when not under load, causing the unit to remain securely affixed to the vehicle. Once deployed, various implements may be hung upon the horizontal implement bars without any type of fastener being used to secure them.

Embodiments provide a lift conversion system that affixes to the front brush guard of most existing UTVs on the market. It is intended for use with UTVs without a winch, or for users who do not wish to employ their UTV's winch. It utilizes a combination of the gravity and rearward facing pressure to secure the unit to the UTV. A linear actuator, powered by any standard hand-tool battery (e.g., Dewalt, Ryobi, Milwaukee) serves to power the actuator, thus powering the lift function. Alternatively, a conventional winch or linear actuator (e.g., Warn ProVantage Power Lift, from Warn Industries, Clackamas, Oreg.) may power the lift. Once deployed, various implements may be hung upon the horizontal implement bars without any type of fastener being used to secure them.

Figure 1B:
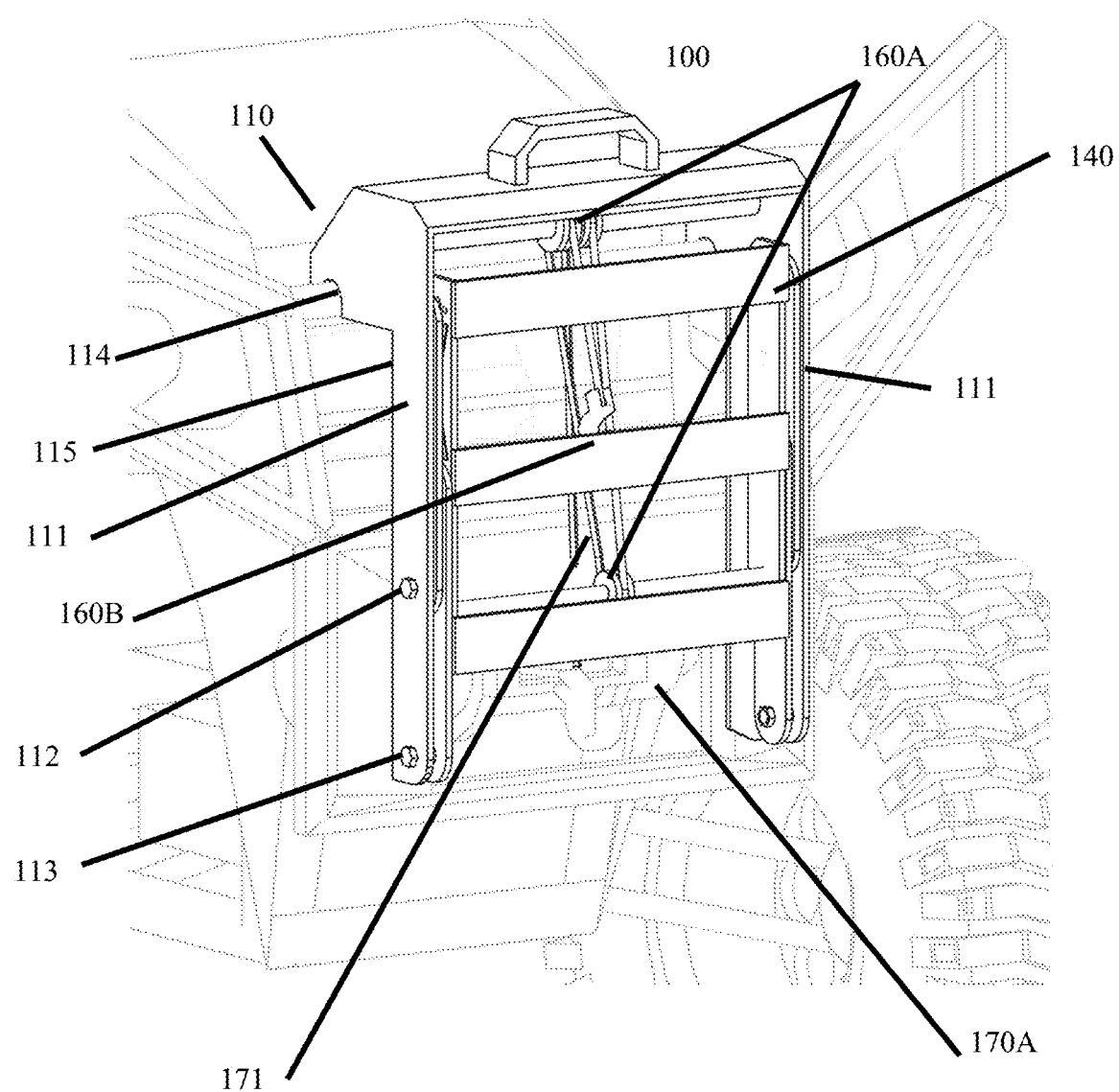
FIG. 1B shows a modular lift conversion system for mounting on an existing vehicle rack or guard in accordance with an embodiment of the subject invention in perspective view. The lift is in a stowed configuration mounted on a vehicle.
Figure 1C:
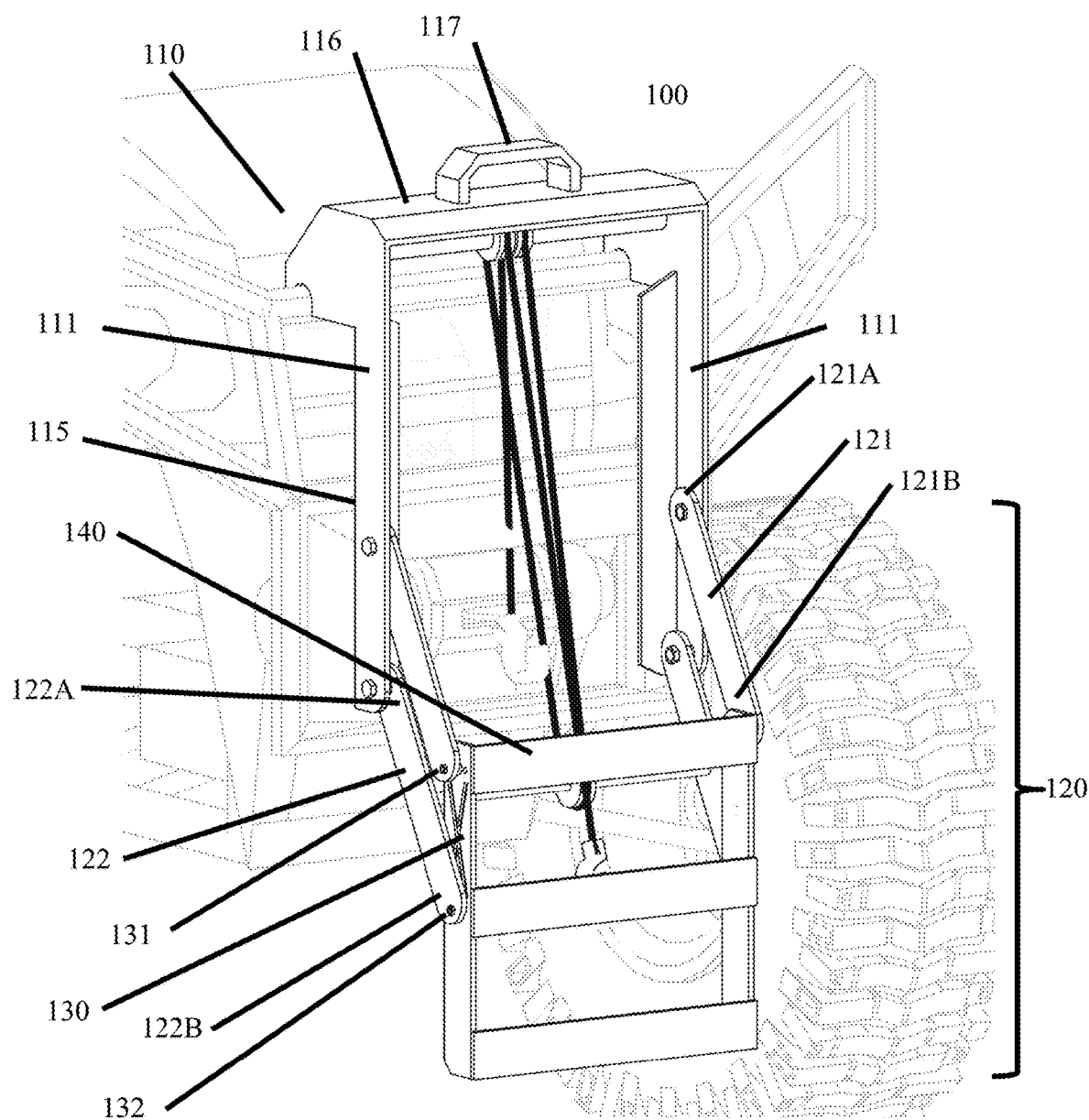
FIG. 1C shows a modular lift conversion system for mounting on an existing vehicle rack or guard in accordance with an embodiment of the subject invention in perspective view. The lift is in a deployed position mounted on a vehicle.
Figure 1D:
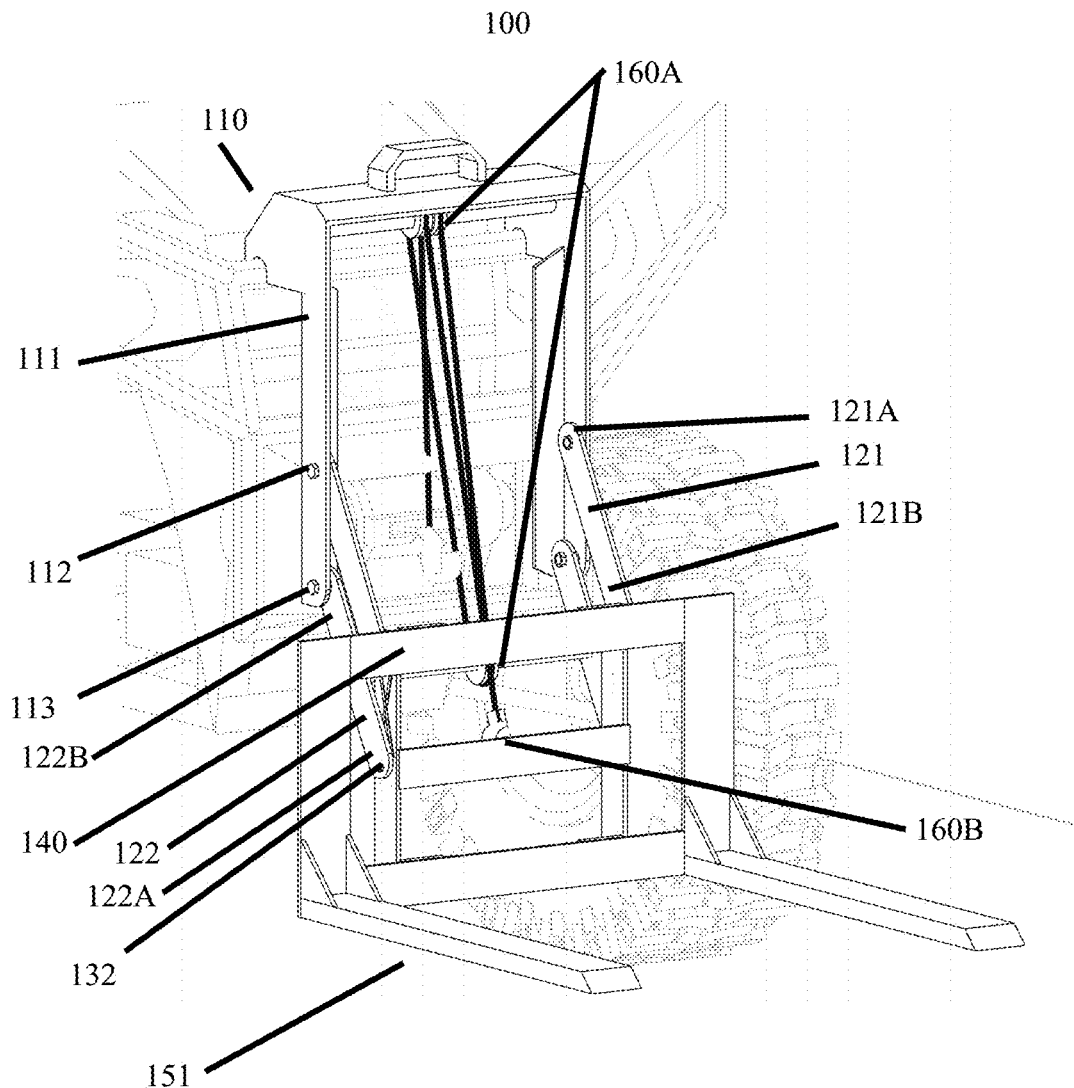
FIG. 1D shows a modular lift conversion system for mounting on an existing vehicle rack or guard in accordance with an embodiment of the subject invention in perspective view. The lift is in a deployed position mounted on a vehicle with a modular forklift implement installed.

Turning now to the figures, FIGS. 1A through 1D show a modular lift conversion system 100 for mounting on an existing vehicle rack or guard in accordance with an embodiment of the subject invention in perspective view. In FIG. 1A the lift is in a stowed configuration and ready for mounting on a vehicle. In FIG. 1B the lift is in a stowed configuration mounted on a vehicle. In FIG. 1C the lift is in a deployed position mounted on a vehicle. In FIG. 1D the lift is in a deployed position mounted on a vehicle with a modular forklift implement 151 installed.

As depicted in FIGS. 1A through 1D, the lift system 100 comprises a fixed frame 110 having a frame width W, a frame depth D, and a frame height H and a movable frame 120. Vertical frame members 111 connect upper pivot point 112, lower pivot point 113, and hook 114; while providing in this embodiment support surface 115. Upper pivot arms 121 connect at a near end 121A to upper pivot point 112 and at a far end 121B to adjustable upper pivot point 131. Lower pivot arms 122 connect at a near end 122A to lower pivot point 113 of x-plate 130 and at a far end 122B to adjustable lower pivot point 132 of x-plate 130. Vehicle mounted winch 170A is shown with cable 171 routing in contact with cable interface points, comprising one or more rollers 160A and an attachment point 160B, respectively, such that tension applied to the cable may create a downward or rearward pressure on the fixed frame 110 and a motion imparting force on the movable frame 210. Attachment points and other elements may be hidden from view in some figures. Modular implement base 140 spans between x-plates 130 to support and align modular lifting fork implement 151. Upper frame member 116 may connect or support opposing vertical frame members 111 as well as optional handle 117.

Embodiments provide hook 114 and vertical frame member 111 as a unitary construct, optionally formed from a single piece of metal or other suitable material (e.g., a high strength polymer), offering benefits of simplicity in design and manufacture and reduced cost and complexity. Alternatively, hook 114 and vertical frame member 111 may be independently manufactured (e.g., of the same or different material) and joined (e.g., permanently, semi-permanently, or removably) either when the lift assembly is constructed, by an aftermarket installer or technician, by the end user, or at any other time (e.g., before, during, or after installation.) The hook 114 may comprise any suitable shape including but not limited to a half-circle, rounded slot, square, rectangle, notch, inside corner, "L", or "T" shape. Hook 114 may be formed of a single piece, multiple pieces, or as part of another frame member (e.g., as an integrated feature of a vertical frame member 111 or as part of an upper frame member 116.) Hook 114 may be of a fixed geometry or of an adjustable or dynamic geometry (e.g., either a rigid shaped cutout or having a movable or deformable element which may latch, hold, or lock the lift system in place on the vehicle or in storage.)

Figure 1E:
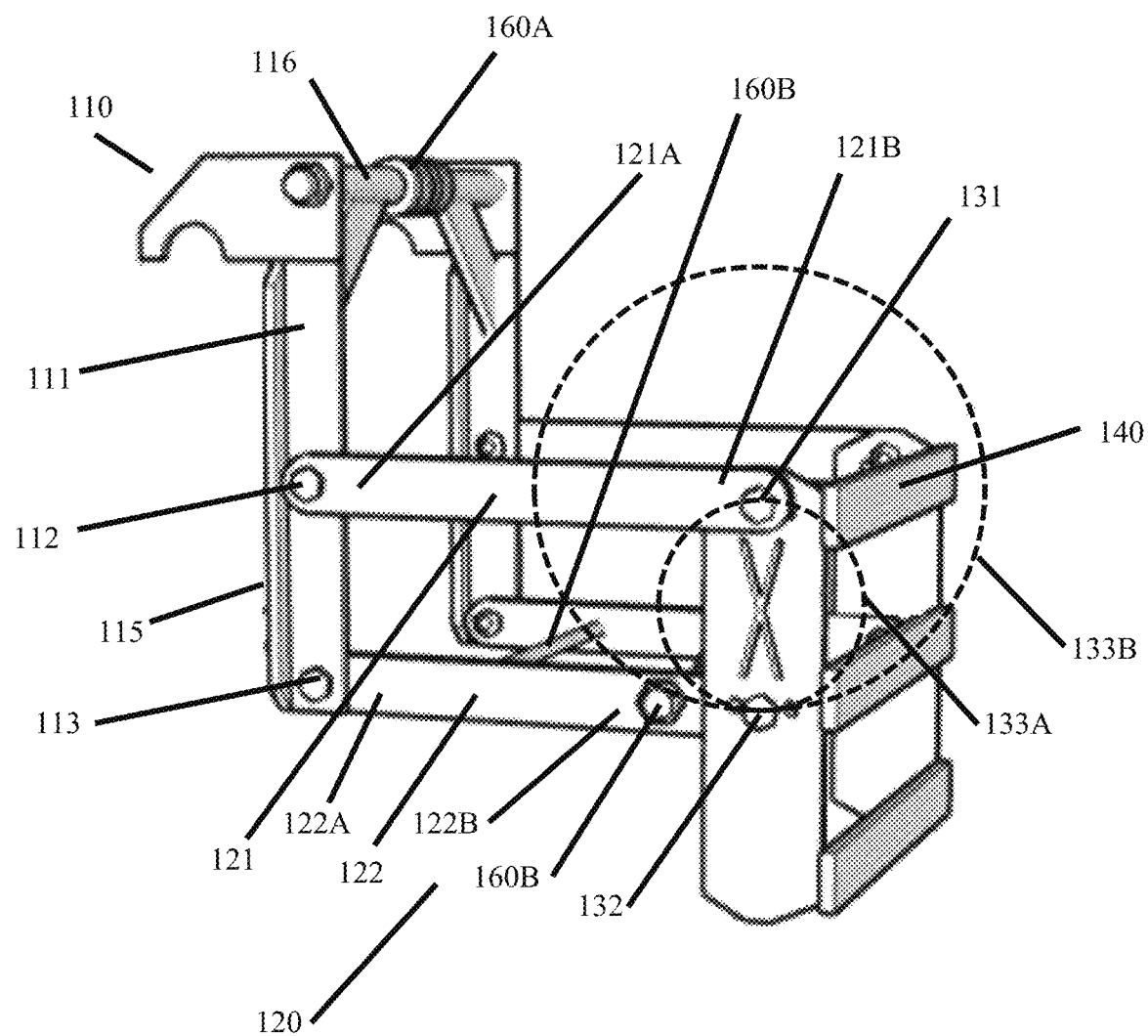
FIG. 1E shows a modular lift conversion system for mounting on an existing vehicle rack or guard in accordance with an embodiment of the subject invention in perspective view. The lift is depicted in a deployed position to more clearly show elements of the invention.
Figure 1F:
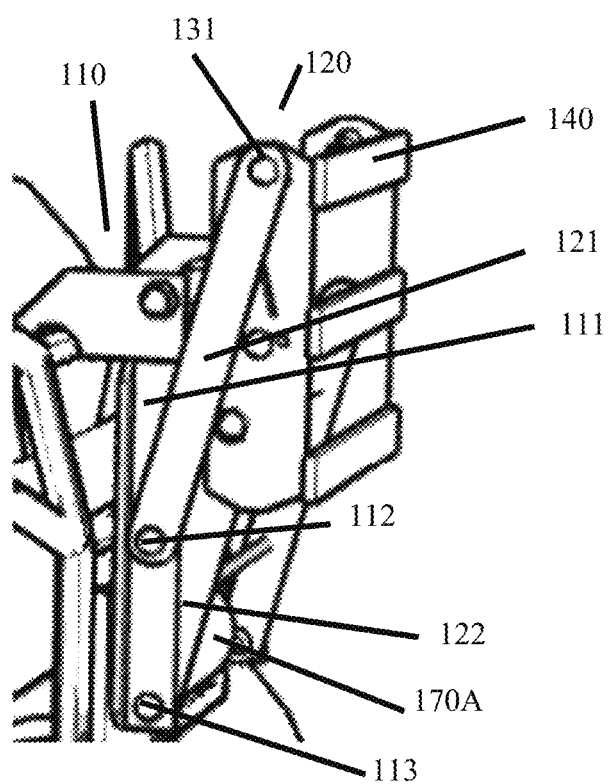
FIG. 1F shows a modular lift conversion system for mounting on an existing vehicle rack or guard in accordance with an embodiment of the subject invention in perspective view. The lift is depicted in a raised position to more clearly show elements of the invention.
Figure 1G:
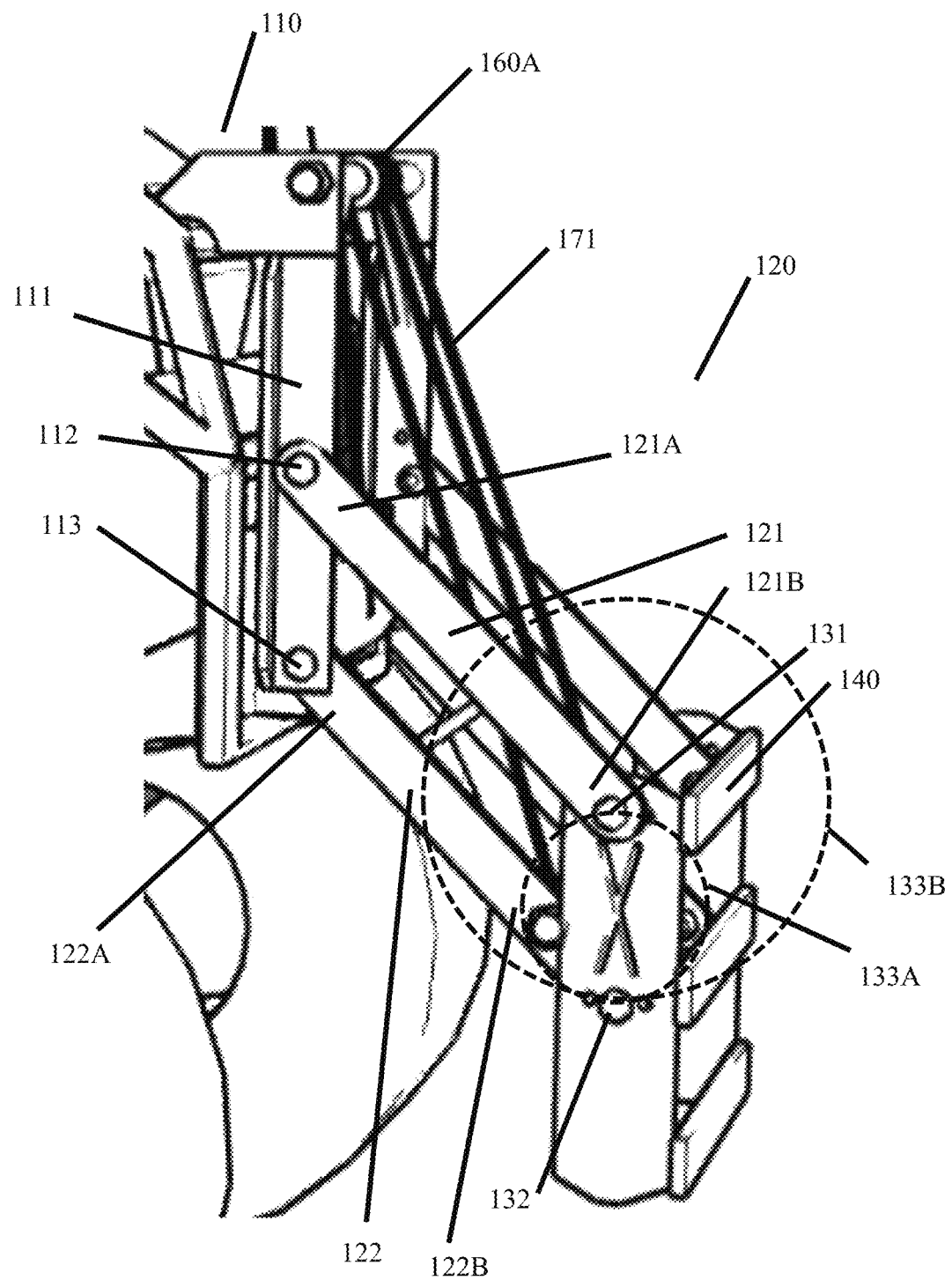
FIG. 1G shows a modular lift conversion system for mounting on an existing vehicle rack or guard in accordance with an embodiment of the subject invention in perspective view. The lift is depicted in a lowered position to more clearly show elements of the invention.
Figure 1H:
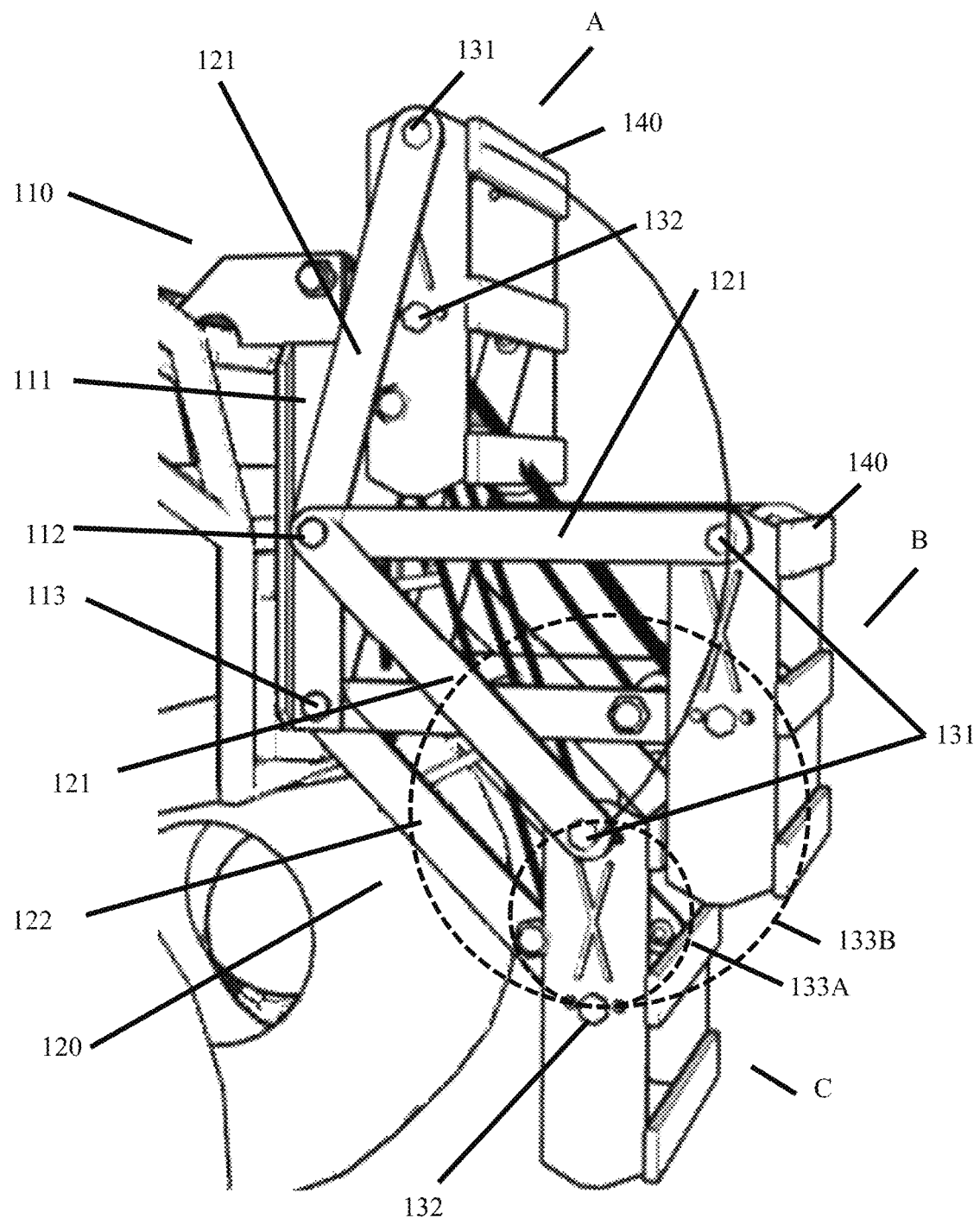
FIG. 1H shows a three-position overlay of a modular lift conversion system for mounting on an existing vehicle rack or guard in accordance with an embodiment of the subject invention in perspective view. The lift is depicted in an overlay of three different positions to more clearly show elements and working motion of the invention.
Figure 1I:
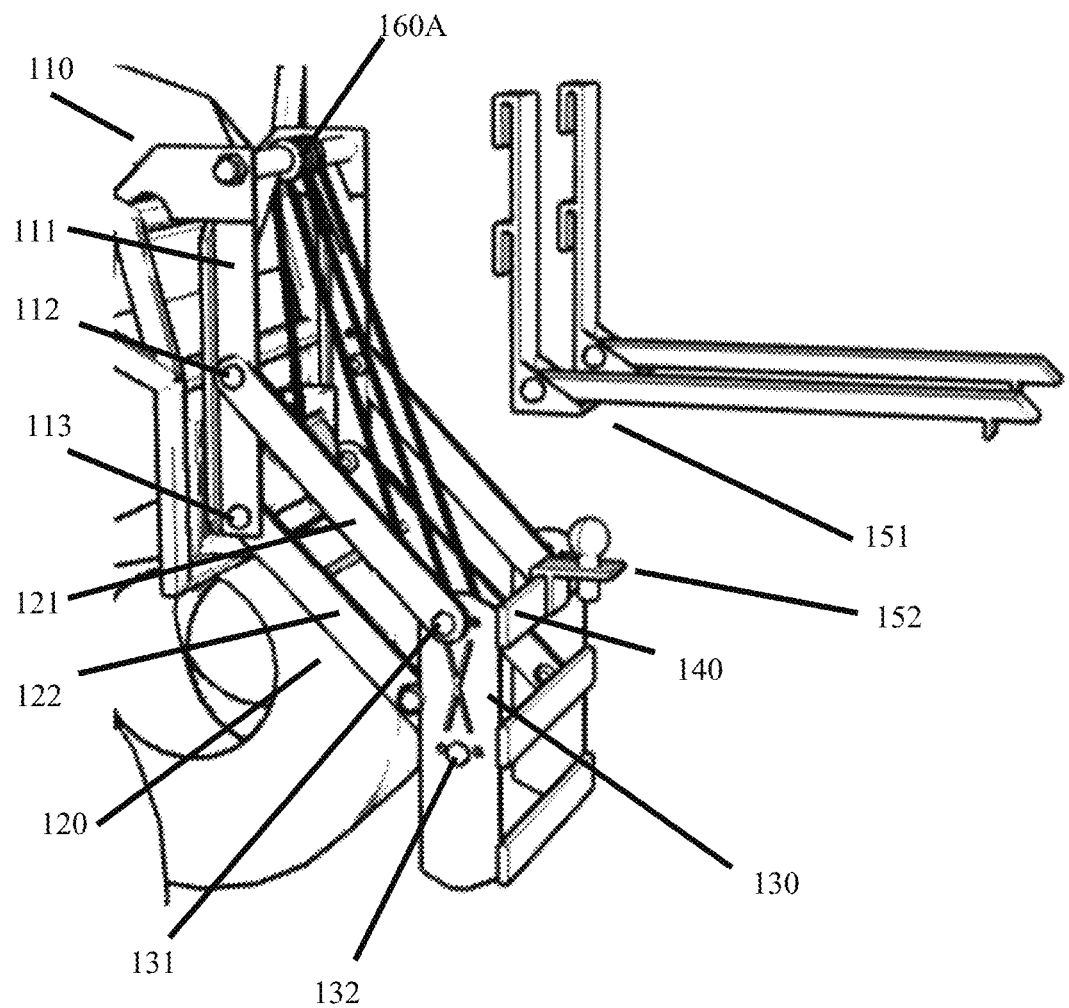
FIG. 1I shows a modular lift conversion system for mounting on an existing vehicle rack or guard in accordance with an embodiment of the subject invention in perspective view. The lift is depicted in a lowered position with modular implements to more clearly show elements of the invention.
Figure 1J:
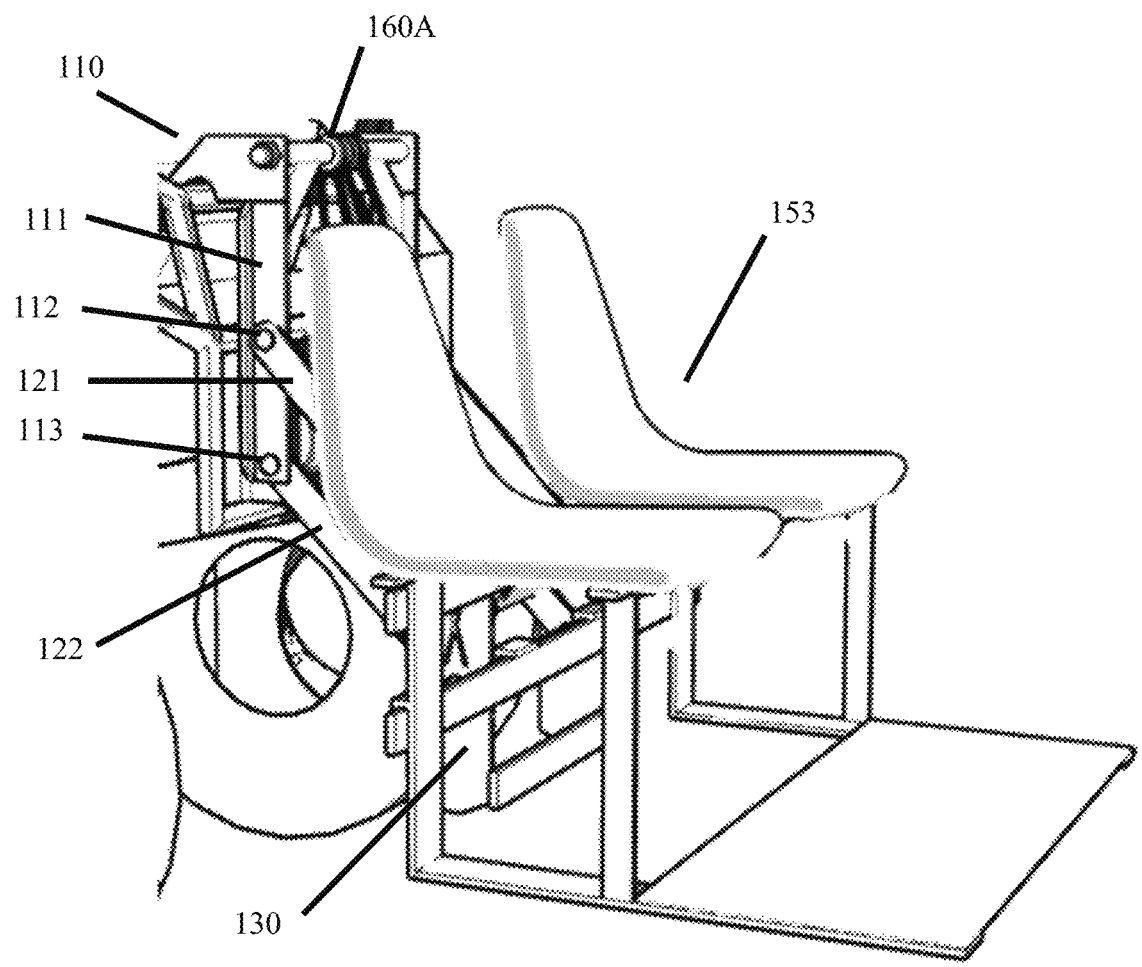
FIG. 1J shows a modular lift conversion system for on mounting an existing vehicle rack or guard in accordance with an embodiment of the subject invention in perspective view. The lift is depicted in a lowered position with a modular passenger carrying seat implement to more clearly show elements of the invention.

FIGS. 1E through 1J show a modular lift conversion system 100 for mounting on an existing vehicle rack or guard in accordance with an embodiment of the subject invention in perspective view. In FIG. 1E the lift is depicted in a deployed position to more clearly show elements of the invention. In FIG. 1F the lift is depicted in a raised position to more clearly show elements of the invention. In FIG. 1G the lift is depicted in a lowered position to more clearly show elements of the invention. In FIG. 1H the lift is depicted in an overlay of three different positions (A, B, C) to more clearly show elements and working motion of the invention. In FIG. 1I the lift is depicted in a lowered position with modular implements. In FIG. 1J the lift is depicted in a lowered position with a modular passenger carrying seat implement 153.

As depicted in FIGS. 1E through 1J, the lift system 100 comprises a fixed frame 110 and a movable frame 120. Vertical frame members 111 connect upper pivot point 112, lower pivot point 113, and hook 114; while providing in this embodiment support surface 115. Upper pivot arms 121 connect at a near end 121A to upper pivot point 112 and at a far end 121B to adjustable upper pivot point 131. Lower pivot arms 122 connect at a near end 122A to lower pivot point 113 of x-plate 130 and at a far end 122B to adjustable lower pivot point 132 of x-plate 130. Vehicle mounted winch 170A is shown with cable 171 routing in contact with cable interface points, comprising one or more rollers 160A and one or more attachment points 160B, respectively, such that tension applied to the cable may create a downward or rearward pressure on the fixed frame 110 and a motion imparting force on the movable frame 120. Modular implement base 140 spans between x-plates 130 to support and align modular lifting fork implement 151, modular trailer ball implement 152, and modular passenger carrying seat implement 153. Additional and various modular implements not shown or described are contemplated within embodiments of the subject invention. Modular implements shown and described (e.g., 151, 152, 153) are exemplary and in no way limiting except where expressly specified or required.

FIGS. 1A through 1J, in part, illustrate embodiments of an x-plate (or a pair of x-plates) configured to maintain vertical alignment of a modular implement base throughout a range of motion via a four-bar mechanism. The x-plate in this embodiment is depicted with an adjustable upper pivot point 131, and an adjustable lower pivot point 132, each having three mounting holes available to alter the angle of the x-plate while securely fastening and allowing rotary motion of the linkages in the four-bar mechanism.

In FIG. 1E a smaller dashed circle 133A centered at the crossing of the "X" illustrates that these adjustable pivot points may be aligned in a circle such that the distance between pivot points is consistent around the circle (e.g., to allow consistent rotational adjustment of the angle of the x-plate), while a larger dashed circle 133B centered at the adjustable upper pivot point illustrates that the distance between pivot points may be consistent with respect to the opposite pivot point (e.g., to allow adjustment of one of either upper or lower pivot points with or without adjustment of the other.) Alternatively, adjustment points may be aligned in a straight line or along another curve, circle, grid, pattern, line, or arc. Advantages of adjustment point alignment may include offering a variation in angle as the lift moves through a range of motion (e.g., tipping back as the lift raises to secure a load, or angling an implement up slightly near the ground to avoid digging in or damaging a floor or ground surface.)

In embodiments where the opposing bolt holes are laid in a circular pattern, the x-plate may have 2 opposing x-plate mounting points, alternatively 1, 3, 4, 5, 6, 7, 8, 9, 10, or more opposing x-plate mounting points (e.g., as shown in FIG. 13.)

FIG. 1E also shows corner braces supporting an upper pivot bar bolted at each end between two vertical frame members 110, a lateral support extending between an opposing pair of lower pivot arms 122, and a stacked arrangement where the upper pivot arms 121 are located outside both the vertical frame members 110 and the x-plates 130 while the lower pivot arms 122 are located inside both the vertical frame members 110 and the x-plates 130. The vertical frame members 111 are each, respectively, shown having a flat main body supporting the upper and lower pivot points (112, 113) and an orthogonal cross member or beam support adding lateral stiffness and providing a wider back vertical plane for supporting the lift against the front of the vehicle rack or brush guard when installed. In some embodiments, an orthogonal cross member or beam support may be formed of angle iron (e.g., an "L" or "T" cross section), having advantages of compactness and cost efficiency for a required or determined amount of lateral strength. Alternatively, an orthogonal cross member or beam support may be formed of box section (e.g., round, oval, square, or rectangular tubing) having advantages of increased torsional strength and stiffness. Alternatively, an orthogonal cross member or beam support may be formed of welded stock (e.g., flat, angle, or hollow cross section) having advantages of design freedom or customization.

FIG. 1F shows an embodiment where the pivot arms 121, 122, frame members 111, x-plates 130, and modular implement base 140 are arranged in the design to allow at least a partial overlap for compact storage. Embodiments may provide a stowed configuration in which the movable frame 120 is adjacent the fixed frame 110 as shown in FIG. 1F, having advantages of simplicity in design and construction and potential for cost reduction. Alternatively, embodiments provide a stowed configuration in which the movable frame 120 is partially overlapped with the fixed frame 110, having advantages of increased compactness for a slight reduction in potential for cost reduction. Alternatively, embodiments provide a stowed configuration in which the movable frame 120 is completely overlapped with the fixed frame 110, having advantages of further increased compactness. Alternatively, embodiments provide a stowed configuration in which the movable frame 120 is within, partially within, or completely within the confines of the fixed frame 110, having advantages of protection, compactness, and improved aesthetic design as shown in FIG. 1A.

By within the confines is meant generally or largely enclosed within or protected by elements of the fixed frame 110, and may include, e.g., a member of the movable frame which overlaps or partially overlaps and is positioned adjacent to a member of the fixed frame, including on the outer edge of the fixed frame. The confines of the fixed frame may include defined and finite areas adjacent an outer edge or surface of a member of the fixed frame within the material thickness of an element of the movable frame 120, or within the material thickness of an element of the fixed frame 110, alternatively about 1.0, 1.5, 2.0, 2.5, or 3 times the material thickness, including ranges, increments, and combinations thereof (e.g., the confines may include an area between about 1.5 and 2.25 times the material thickness on the outside edge and adjacent to one or more elements of the fixed frame 110.) By way of a non-limiting example, a fixed frame 110 with vertical frame members 111 having a material thickness of 10 mm (about ⅜") may define within the confines to include an area between 15 mm and 25 mm (about ⅝" to about 1") beyond one or more outer surfaces of the vertical frame members 111 on each side in any direction.

By partially within or at least partially within is meant the majority of an element is enclosed within or protected by the fixed frame or elements thereof. Partially within is broader than and includes within the confines.

By completely within is meant that the movable frame, one or more components of the movable frame, or another specified member (e.g., a modular attachment 151, 152, 153 or a portion thereof) is completely enclosed or protected by the fixed frame or by one or more elements thereof. Completely within is not meant to exclude minor or inconsequential excursions of elements such as a single layer of material, a fastener, a tab, a latch, a stop, or a connector unless it is explicitly specified that such elements are also completely within the confines of the fixed frame. Completely within is narrower than and included in the scope of within the confines.

The terms within, partially within, or at least partially within the confines of the fixed frame 110 are further meant to include configurations where the movable frame 120, components thereof, or other elements are enclosed within or protected by the fixed frame or elements thereof in two dimensions, but extend within a finite area in a third dimension. By way of a non-limiting example, the movable frame 120 or members thereof may be within, partially within, or at least partially within the confines of the fixed frame 110 by being inside the width W and depth D of the fixed frame 110 while extending above only the height H of the fixed frame 110 when in a stowed configuration, such that the movable frame 120 or elements thereof are enclosed within or protected by a finite vertical extension of the confines of the fixed frame 110 (e.g., a vertical extension of about 0.25, 0.5, 1.0, 1.5, or 2 times the height H, including ranges, increments, and combinations thereof (e.g., the confines may include a finite area extending in one direction between about 0.5 and 1.25 times the height of the fixed frame 110. This could include, for example, upper pivot arms 121 or lower pivot arms 122 which are longer than or which extend beyond the top of vertical frame members 111 when in a stowed configuration.)

Embodiments may provide one or more passive or active locking mechanisms to retain the lift in a stowed, deployed, intermediate or other position when not in use, when disconnected from the winch, when on the vehicle, when off the vehicle, or during storage, shipping, or manufacturing.

Figure 14:
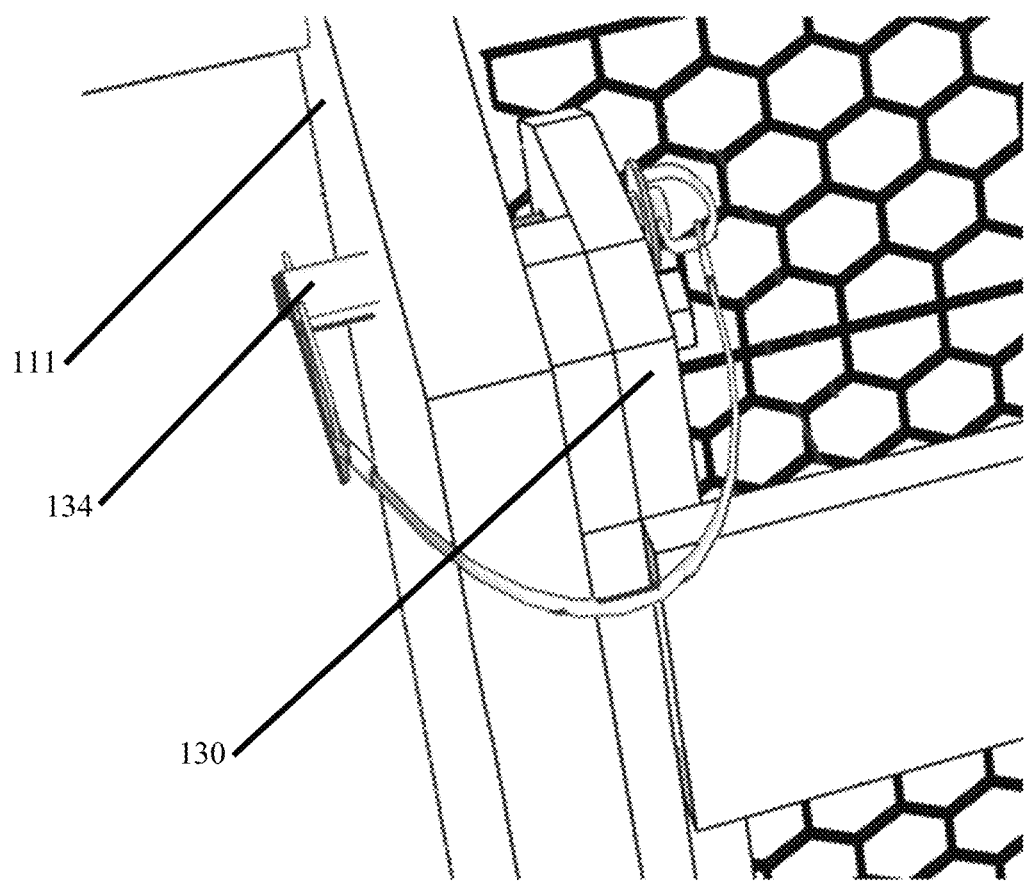
FIG. 14 shows a linchpin for securing the lift in a stowed configuration according to an embodiment of the subject invention.

Embodiments may provide a simple linchpin, cotter pin, or clevis pin as a retainer 134 to secure the unit (e.g., when in a stowed configuration as shown in FIG. 14.) Alternatively or additionally, embodiments may provide an automatic spring, clip, latch, or other element as a retainer 134 to secure or stabilize the unit in one or more configurations (e.g., a leaf spring mounted on the fixed frame 110 may press against one or more elements of the movable frame 120 to inhibit or prohibit motion when the lift is in a stowed configuration or a deployed configuration, respectively.) Alternatively or additionally, embodiments may provide a selective spring, clip, latch, or other element as a retainer 134 to secure or stabilize the unit in one or more configurations (e.g., a manually activated latch mounted on the fixed frame 110 may be held disengaged by a spring, by a cam, or by the force of gravity until a user takes an action to engage the latch with one or more elements of the movable frame 120 to inhibit or prohibit motion when the lift is in a stowed configuration or a deployed configuration, respectively.)

FIG. 1H represents a four-bar mechanism embodiment swinging through a partial arc of motion with three different positions (A, B, C) overlayed in the same view. The modular implement base 140 maintains a constant vertical alignment as the lift is raised and lowered.

A modular implement base 140 may comprise one or more implement bars, implement mounts, or implement receptacles, respectively. For example, the modular implement base 140 shown in FIGS. 1A through 1J comprises three horizontal implement bars of uniform geometry and spacing, each implement bar connecting to one or more x-plates of the opposing pair of x-plates 130. A modular implement base may comprise fewer elements (e.g., one or two implement bars) or additional elements (e.g., one or more motion elements, supporting or connecting elements, braces, or structures.) An implement mount may comprise forms or shapes beyond that of a bar (e.g., a cylinder, pipe, post, peg, hook, boss, threaded rod, or protrusion.) An implement receptacle may include a pocket, slot, hole, recess, or depression. A modular implement base may consist essentially of only one or more implement bars, mounts, or receptacles. Alternatively, a modular implement base 140 may comprise multiple elements, including different combinations (e.g., one or more implement bars, with or without additional supporting or connecting structures, and with or without one or more implement mounts or receptacles.)

A modular implement base 140 may be configured such that implements 151, 152, 153 may be attached or detached with or without additional tools or fasteners and may be advantageously held in place under gravity or secured (e.g., to prevent theft, or to prevent accidental disengagement when traveling over rough terrain) either passively or actively at one or more configurations of the lift system.

Specific combinations of elements in a modular implement base 140 have been shown to offer unique advantages. One exemplary combination includes a modular implement base 140 comprising one or more horizontal implement bars wherein implements may be quickly loaded or unloaded without tools in a deployed, extended, or lowered configuration, are held in place under by their own weight under gravity, and then further secured (e.g., by positioning of an upper frame member that blocks removal of the implements or obscures visibility of or access to implements) when in a stowed, retracted, or raised configuration. This combination offers advantages of simplicity in design, manufacture, ease of usage, low cost, security of implements, safety, and speed of implement changes. These advantages may be maximized in some cases by the absence of additional elements. Alternatively, the addition of additional elements (e.g., an implement mount or receptacle) to an implement bar or implement base may provide additional advantages including efficient, repeatable, or reliable positioning of one or more implements, and enhanced security, safety, or structural support.

Embodiments provide specific implements, combinations of implements, and kits including implements providing unique functionality in the subject invention. For example, as shown in FIG. 1I, a trailer hitch ball 152 may be mounted and used with or without additional implements (e.g., a pair of loading forks, a hay bale spear, or a riding seat.) Alternatively, a kit or set of trailer hitch implements (e.g., including three different size hitch balls, or featuring one or more selectable hitch drop heights, or being configured to mount at multiple heights on the implement base) may offer users of the subject invention benefits including rapid change between different trailers or flexibility to raise, lower, or move trailers at various heights, angles, or orientations. Embodiments further provide implements that may be reversed or redirected on the modular implement base (e.g., an implement with a 2" trailer ball on one side may lift up, rotate 180-degrees in a horizontal plane, and drop back down to provide a 1⅞" ball on the opposite side; or the modular implement base may provide multiple mounting locations configured to provide access to implements at differing heights of angles (e.g., implements accessible straight out the front of the vehicle in a first configuration and at an angle or to the side of the vehicle in a second configuration.)

Figure 2A:
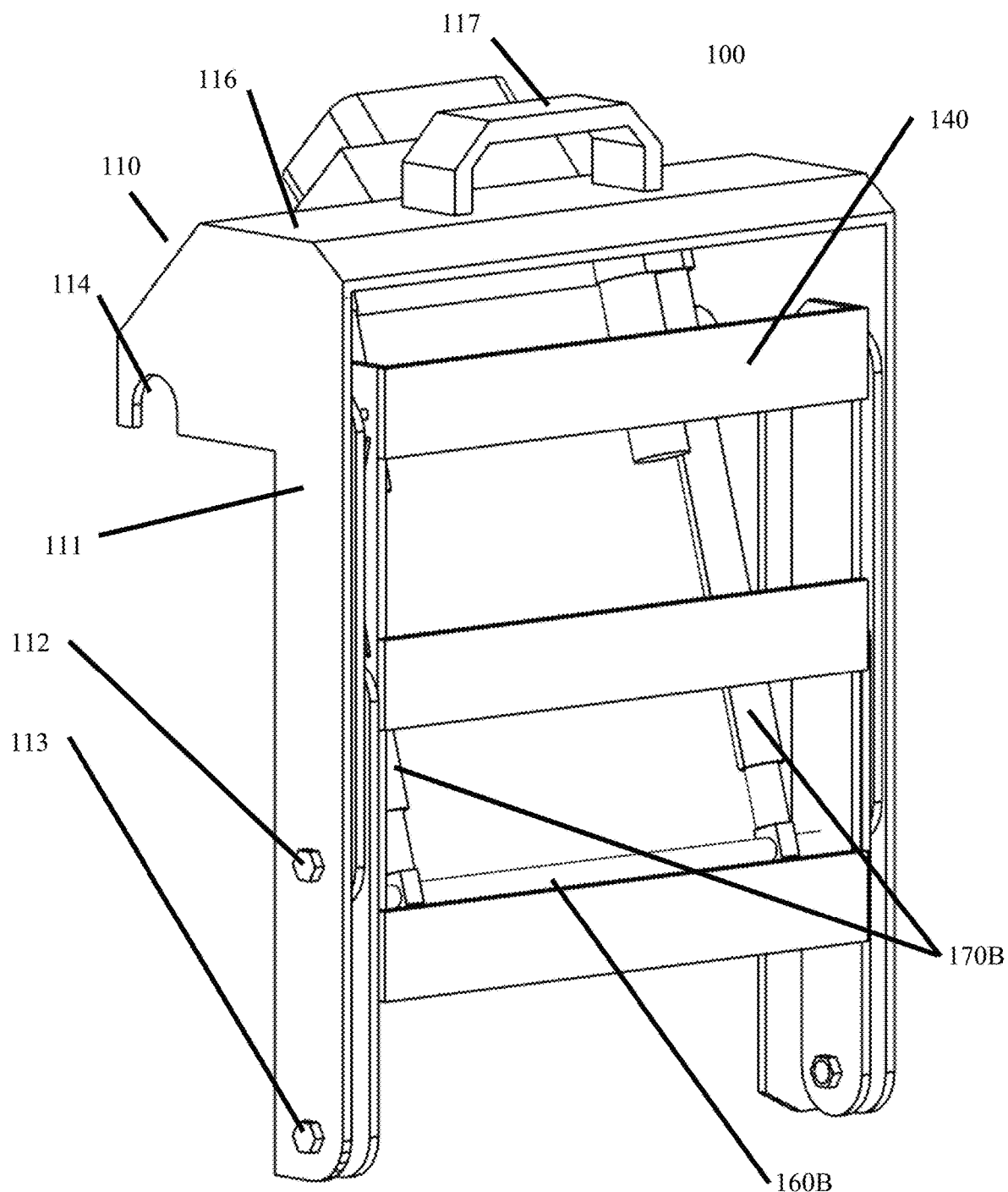
FIG. 2A shows a modular lift conversion system for mounting on an existing vehicle rack or guard in accordance with an embodiment of the subject invention in perspective view. The lift is in a stowed configuration and ready for mounting on a vehicle.
Figure 2B:
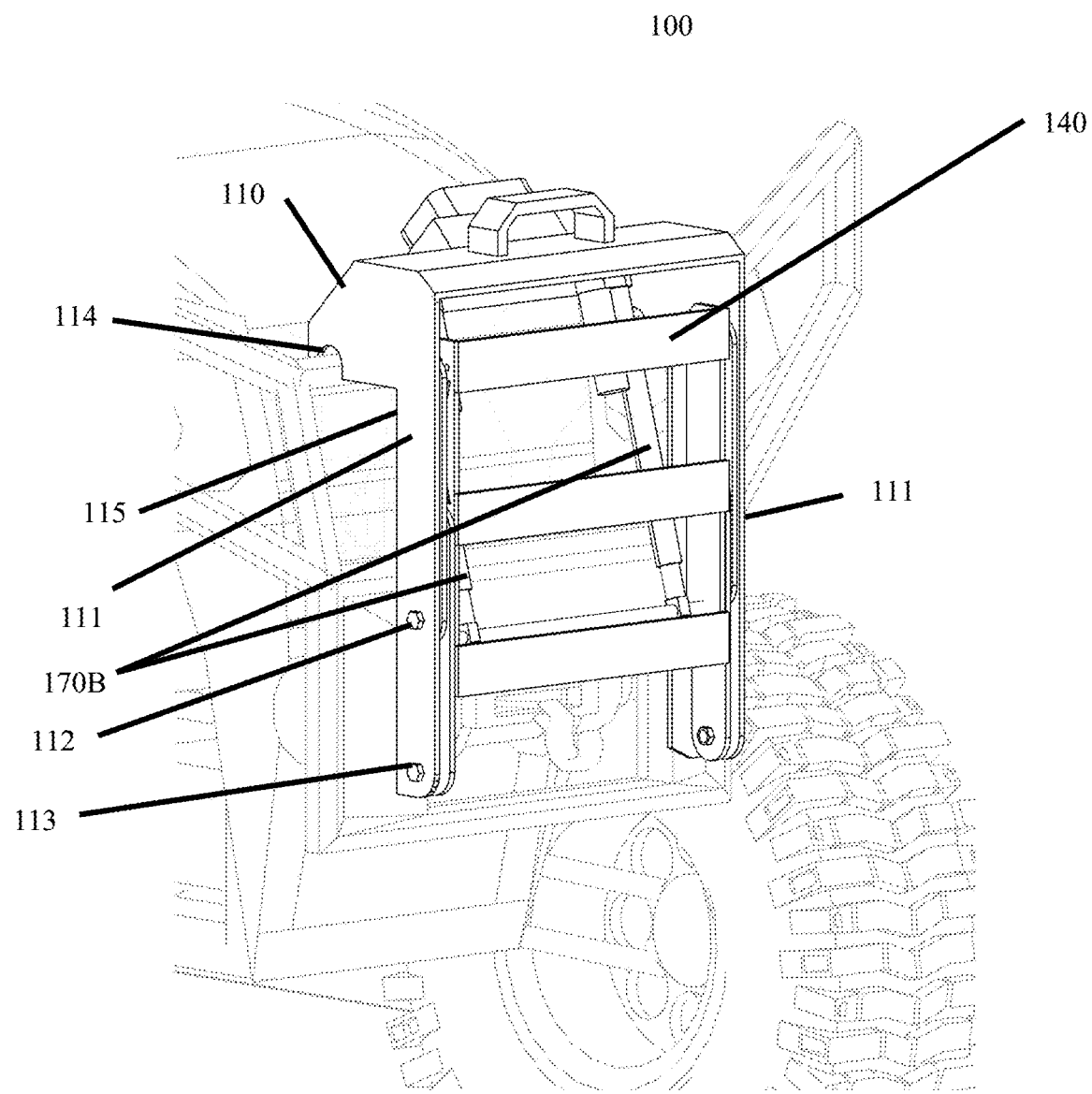
FIG. 2B shows a modular lift conversion system for mounting on an existing vehicle rack or guard in accordance with an embodiment of the subject invention in perspective view. The lift is in a stowed configuration mounted on a vehicle.
Figure 2C:
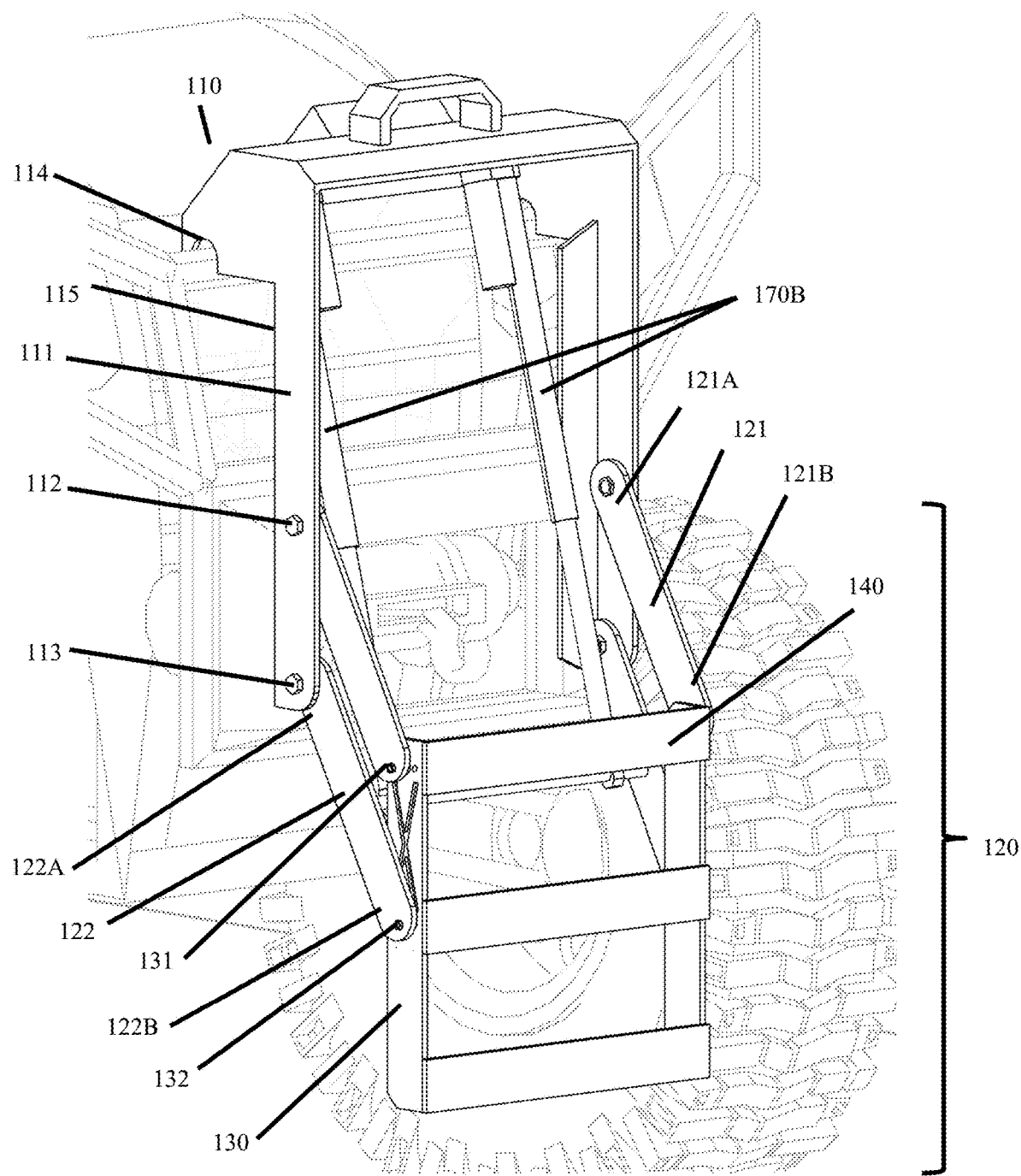
FIG. 2C shows a modular lift conversion system for mounting on an existing vehicle rack or guard in accordance with an embodiment of the subject invention in perspective view. The lift is in a deployed position mounted on a vehicle.
Figure 2D:
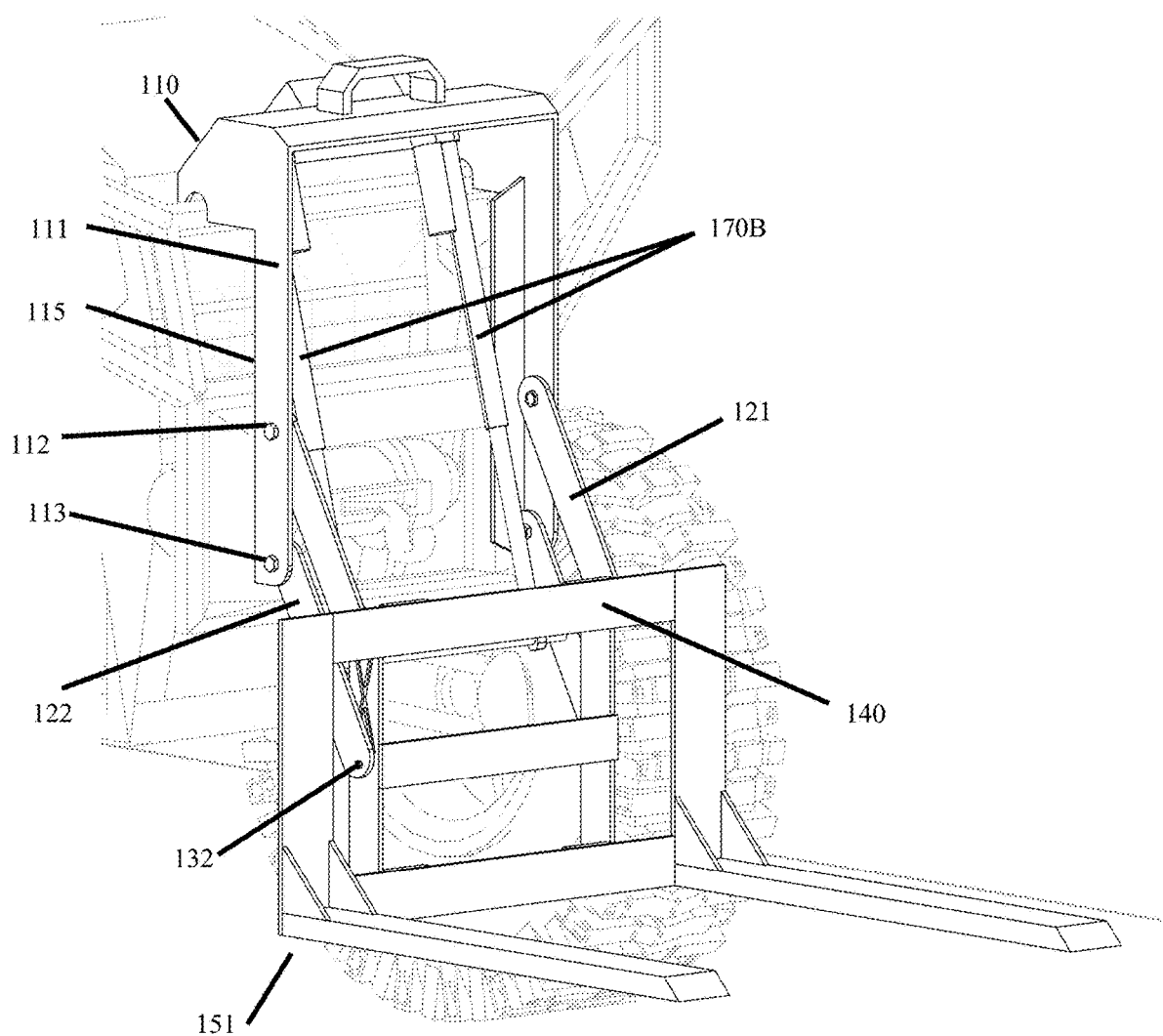
FIG. 2D shows a modular lift conversion system for mounting on an existing vehicle rack or guard in accordance with an embodiment of the subject invention in perspective view. The lift is in a deployed position mounted on a vehicle with a modular forklift implement installed.
Figure 2E:
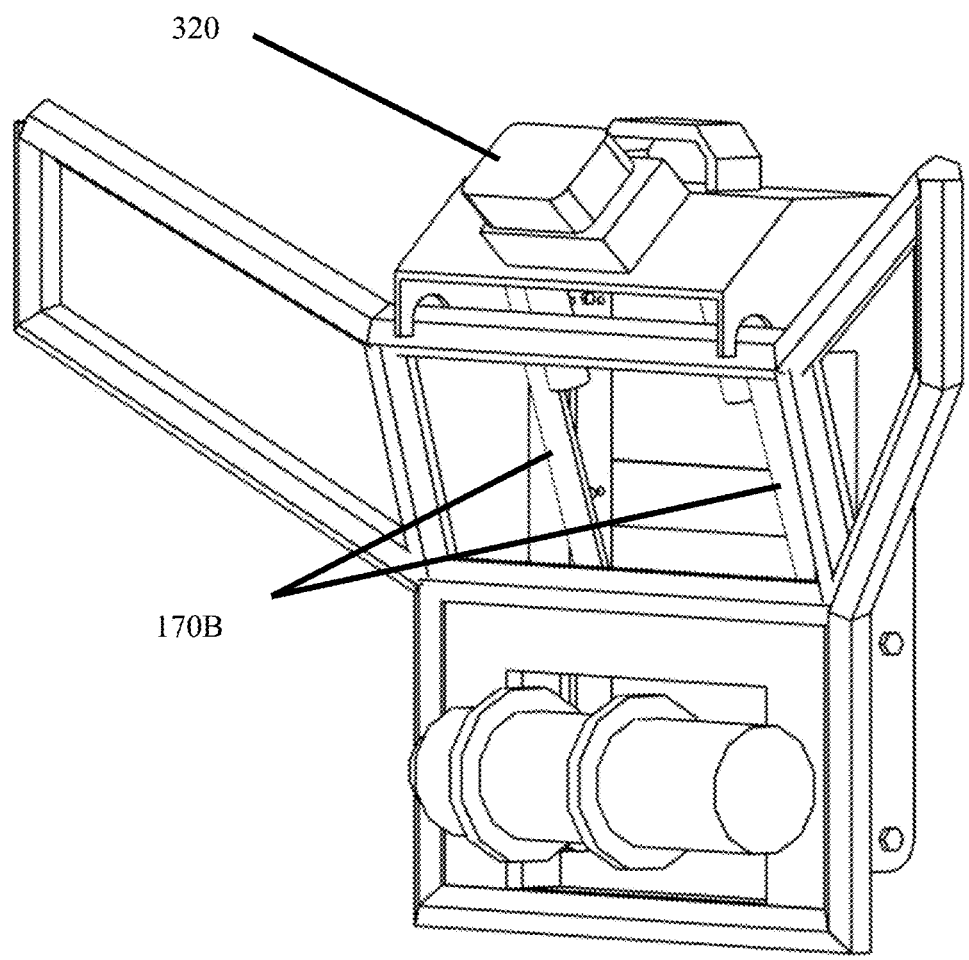
FIG. 2E shows a modular lift conversion system for mounting on an existing vehicle rack or guard in accordance with an embodiment of the subject invention in rear perspective view. The lift is depicted from the rear in a deployed position mounted on a rack with no vehicle shown to more clearly show elements of the invention.

FIGS. 2A through 2E show a self-powered or independently powered modular lift conversion system 100 for mounting on an existing vehicle rack or guard in accordance with an embodiment of the subject invention in perspective view. In FIG. 2A the lift is in a stowed configuration and ready for mounting on a vehicle. In FIG. 2B the lift is in a stowed configuration mounted on a vehicle. In FIG. 2C the lift is in a deployed position mounted on a vehicle. In FIG. 2D the lift is in a deployed position mounted on a vehicle with a modular forklift implement installed. In FIG. 2E the lift is depicted from the rear in a deployed position mounted on a rack with no vehicle shown to more clearly show elements of the invention. In each of FIGS. 2A through 2E the vehicle winch 170A is available for other uses while the lift is installed or in use. Alternatively, the lift is operable in the absence of a vehicle winch, or in the event of failure of a vehicle winch. Alternatively, in this or many other embodiments contemplated under the subject invention, the lift may be provided with or configured to accept a lift winch in addition to or in place of any vehicle winch. The lift winch may be operable in addition to or in parallel with linear actuators 170B and may be used to power the lift or to accomplish other tasks. Embodiments may advantageously provide mounting options for multiple actuators (e.g., one or more winches, one or more linear actuators, other lifting devices, or combinations of lifting devices.) Upper frame member 116 may connect or support opposing vertical frame members 111 as well as optional handle 117.

As depicted in FIGS. 2A through 2E, the lift system 100 comprises a fixed frame 110 and a movable frame 120. Vertical frame members 111 connect upper pivot point 112, lower pivot point 113, and hook 114; while providing in this embodiment support surface 115. Upper pivot arms 121 connect at a near end 121A to upper pivot point 112 and at a far end 121B to adjustable upper pivot point 131. Lower pivot arms 122 connect at a near end 122A to lower pivot point 113 of x-plate 130 and at a far end 122B to adjustable lower pivot point 132 of x-plate 130. One or more integrated linear actuators 170B may operate with or without a cable (not shown in FIGS. 2A through 2E) routing in contact with cable interface points, comprising one or more rollers 160A and one or more attachment points 160B, respectively, such that tension applied to the linear actuators 170B may create a downward or rearward pressure on the fixed frame 110 and a motion imparting force on the movable frame 120. Cable interface points 160A, 160B or associated supporting structures (e.g., axles, bolts, brackets, rods, or bosses) may be advantageously employed as linear actuator mounting points. Modular implement base 140 spans between x-plates 130 to support and align modular lifting fork implement 151, modular trailer ball implement 152 (not shown in FIGS. 2A through 2E), and modular passenger carrying seat implement 153 (not shown in FIGS. 2A through 2E).

Figure 3A:
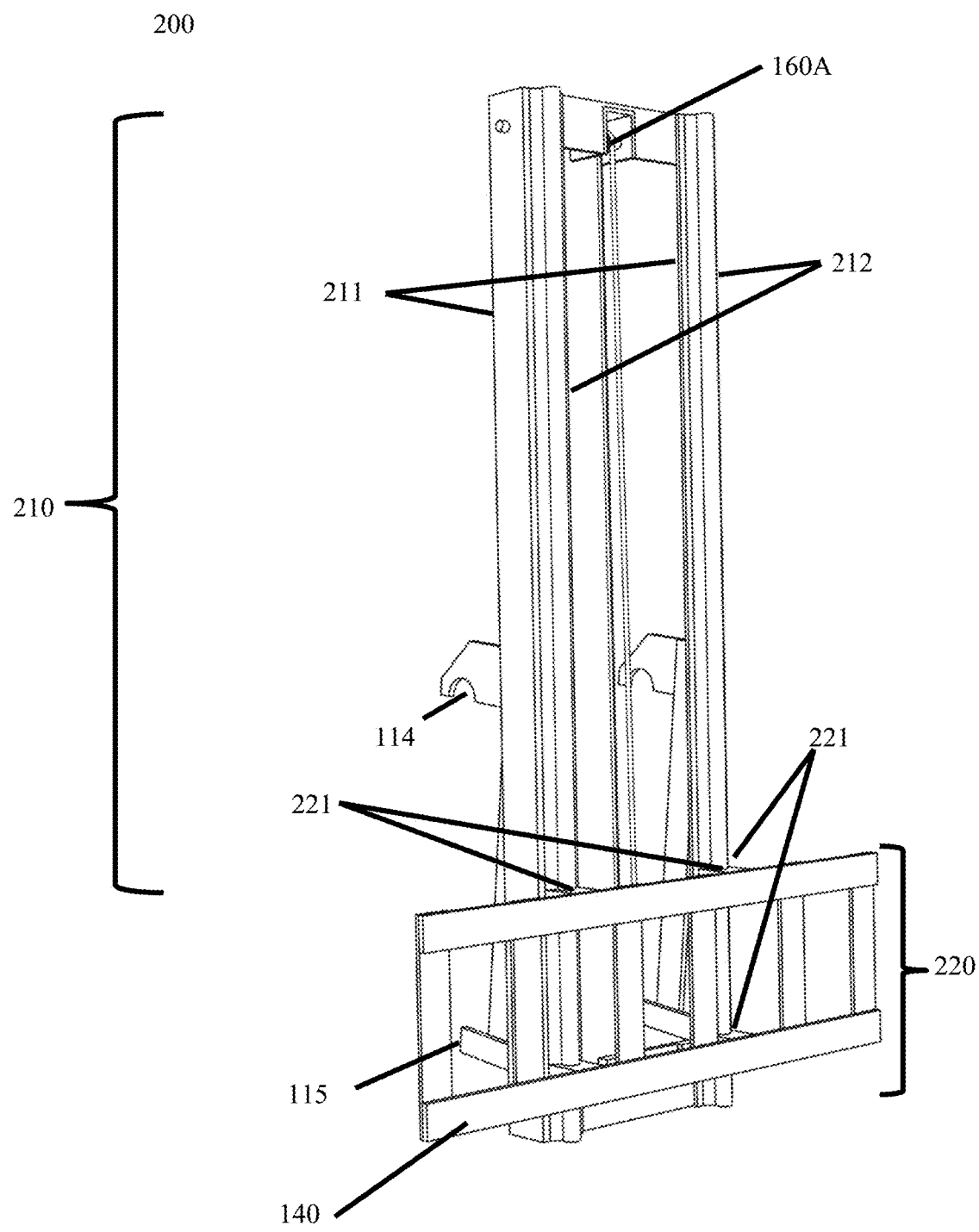
FIG. 3A shows a modular vertical slide lift conversion system for mounting on an existing vehicle rack or guard in accordance with an embodiment of the subject invention in perspective view. The lift is in a stowed configuration and ready for mounting on a vehicle.
Figure 3B:
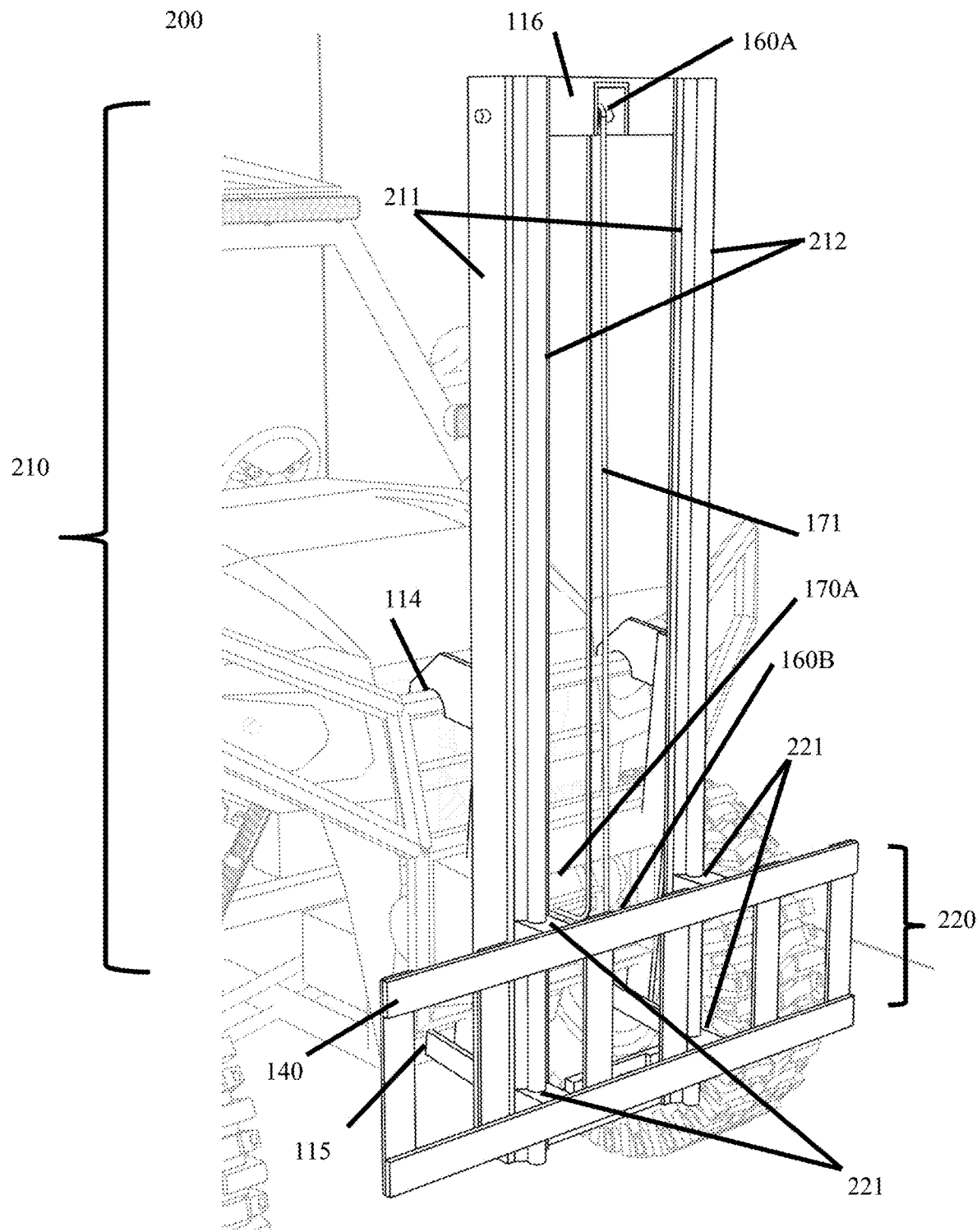
FIG. 3B shows a modular vertical slide lift conversion system for mounting on an existing vehicle rack or guard in accordance with an embodiment of the subject invention in perspective view. The lift is in a stowed configuration mounted on a vehicle.
Figure 3C:
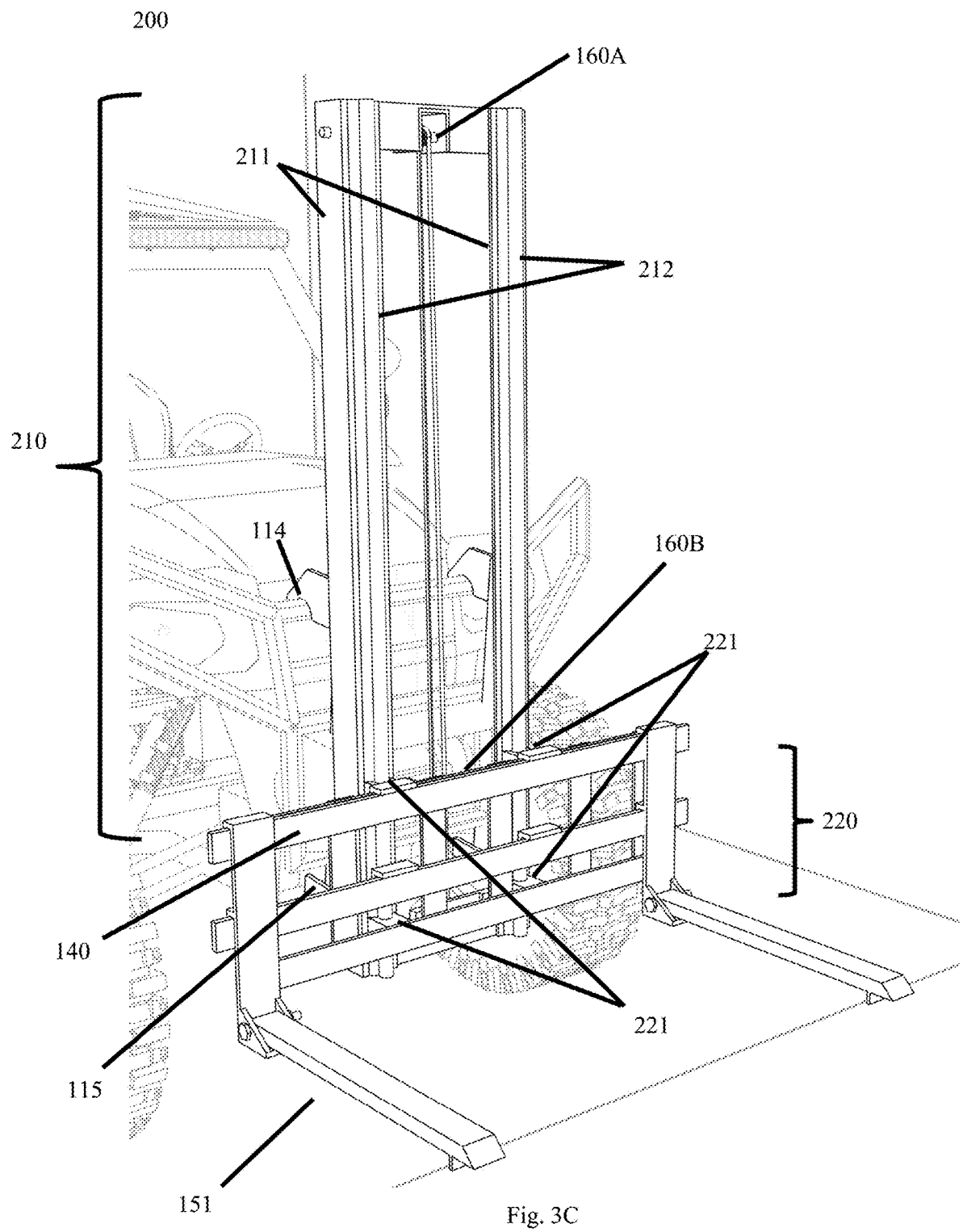
FIG. 3C shows a modular vertical slide lift conversion system for mounting on an existing vehicle rack or guard in accordance with an embodiment of the subject invention in perspective view. The lift is in a stowed configuration mounted on a vehicle with a modular forklift implement installed.

FIGS. 3A through 3C show a modular vertical slide lift conversion system for mounting on an existing vehicle rack or guard in accordance with an embodiment of the subject invention in perspective view. In FIG. 3A the lift is in a stowed configuration and ready for mounting on a vehicle. In FIG. 3B the lift is in a stowed configuration mounted on a vehicle. In FIG. 3C the lift is in a stowed configuration mounted on a vehicle with a modular forklift implement installed. Embodiments may provide a vertical lift configured to raise or lower directly under tension from a cable (e.g., pulled by a winch installed on the vehicle or on the lift.) The cable may extend from the winch over an interface point located at or near the top of the vertical guiderails and down to an interface point on, proximal, or connected to the modular implement base or x-plate.

As depicted in FIGS. 3A through 3C, the lift system 200 comprises a fixed frame 210 and a movable frame 220. Vertical frame members 211 support vertical guiderails 212 and connect in this embodiment to rails providing support surface 115. Vehicle mounted winch 170A is shown with cable 171 routing in contact with cable interface points, comprising one or more rollers 160A and one or more attachment points 160B, respectively, such that tension applied to the cable may create a downward or rearward pressure on the fixed frame 210 and a motion imparting force on the movable frame 220. Pulley 160A is shown near the top of the fixed frame 210. Modular implement base 140 spans rail followers 221 to support and align modular lifting fork implement 151, modular trailer ball implement 152 (not shown in FIGS. 3A through 3C), and modular passenger carrying seat implement 153 (not shown in FIGS. 3A through 3C).

Figure 4A:
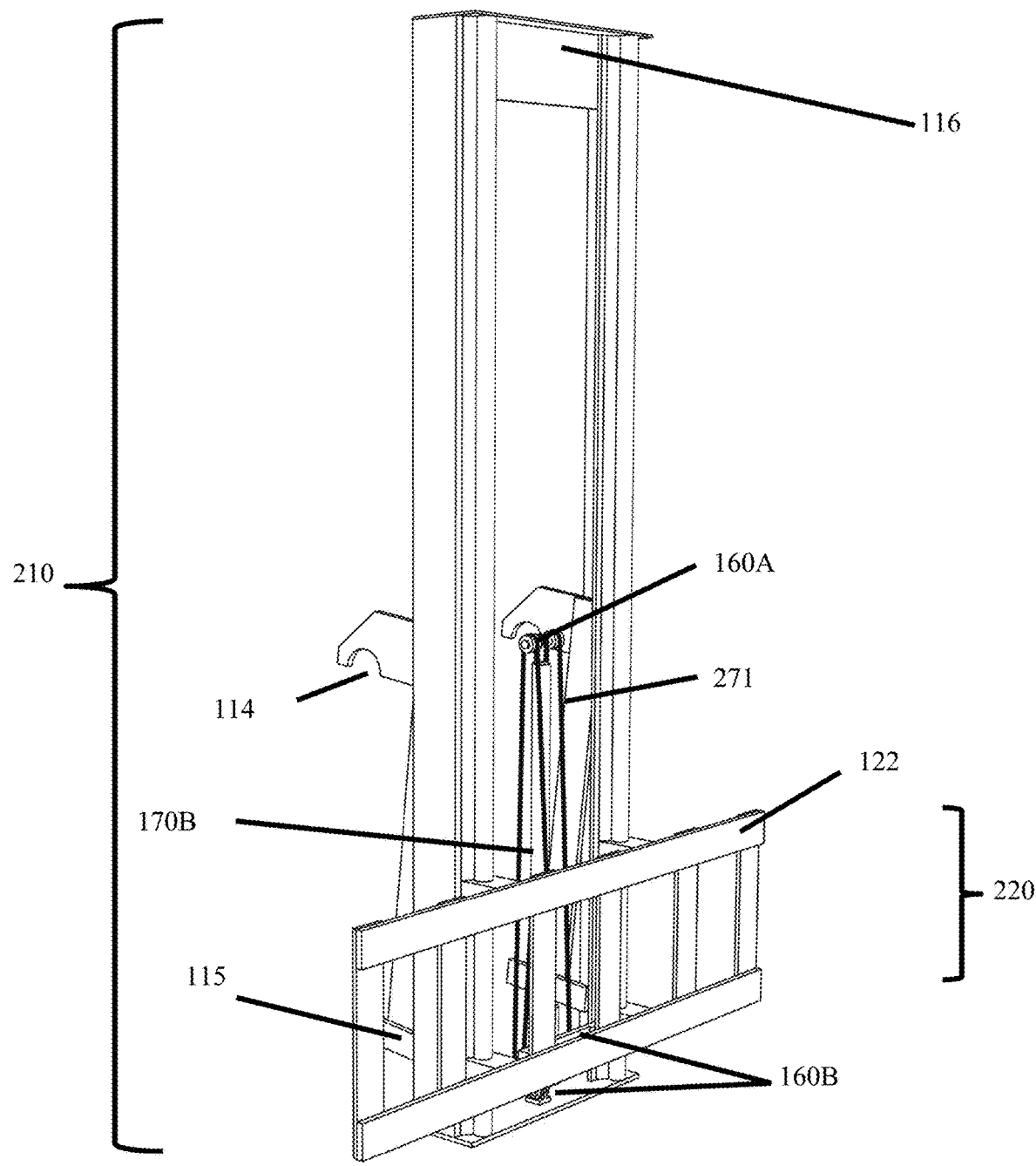
FIG. 4A shows a modular vertical slide lift conversion system for mounting on an existing vehicle rack or guard in accordance with an embodiment of the subject invention in perspective view. The lift is in a stowed configuration and ready for mounting on a vehicle.
Figure 4B:
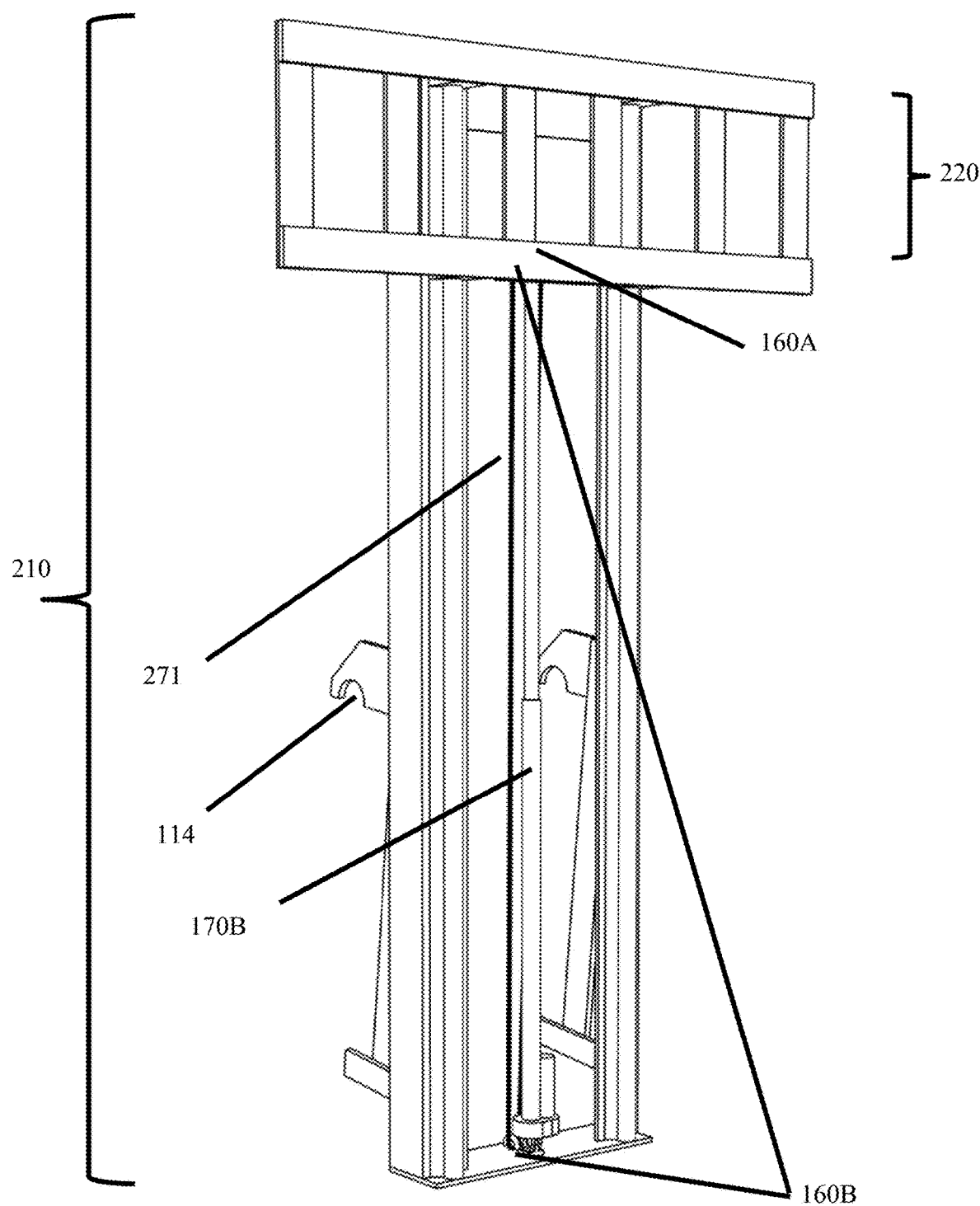
FIG. 4B shows a modular vertical slide lift conversion system for mounting on an existing vehicle rack or guard in accordance with an embodiment of the subject invention in perspective view. The lift is in a deployed position with no vehicle shown to more clearly show elements of the invention.
Figure 4C:
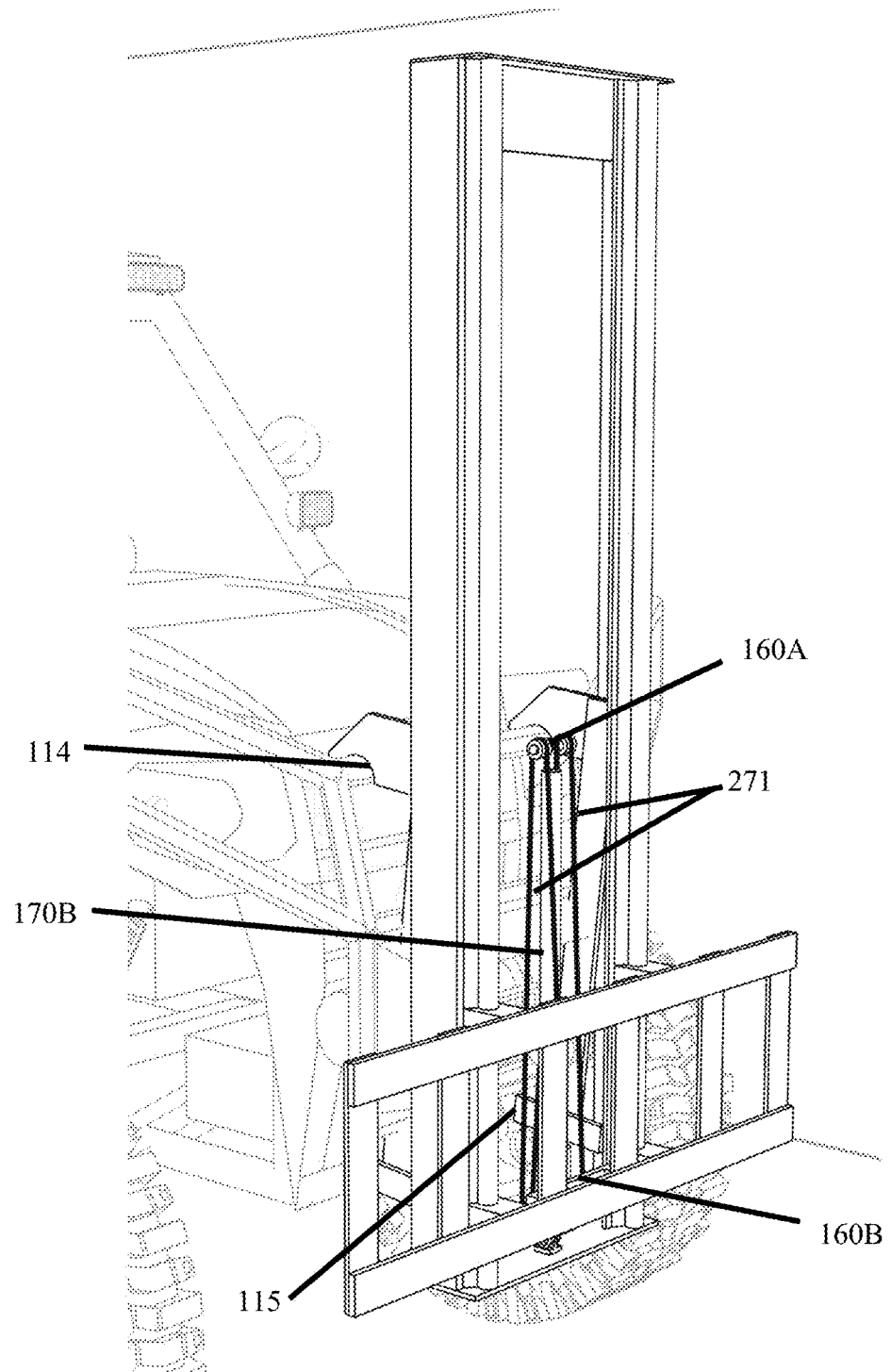
FIG. 4C shows a modular vertical slide lift conversion system for mounting on an existing vehicle rack or guard in accordance with an embodiment of the subject invention in perspective view. The lift is in a stowed configuration mounted on a vehicle.
Figure 4D:
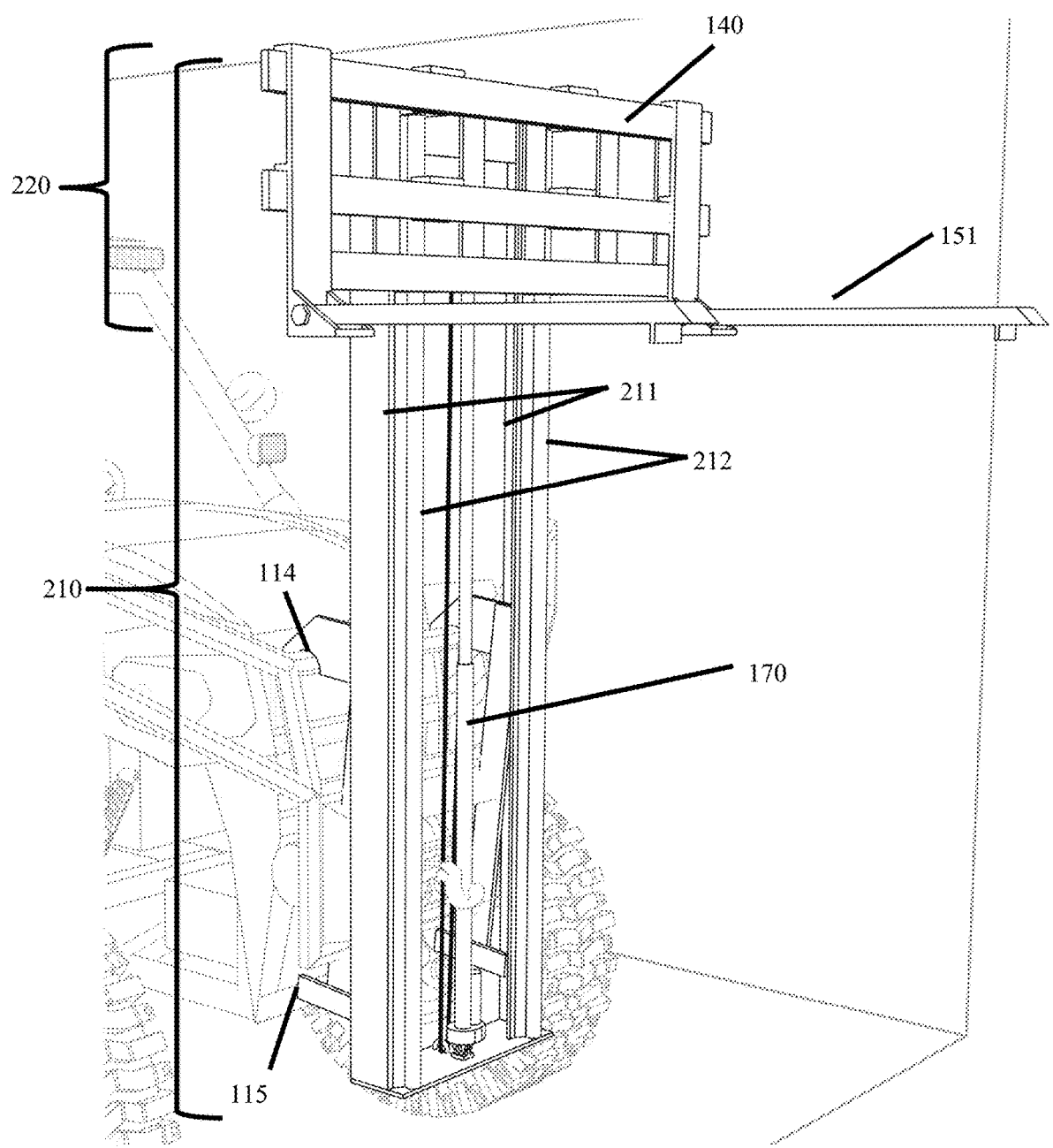
FIG. 4D shows a modular vertical slide lift conversion system for mounting on an existing vehicle rack or guard in accordance with an embodiment of the subject invention in perspective view. The lift is in a deployed position mounted on a vehicle with a modular forklift implement installed.

FIGS. 4A through 4D show a modular independently powered vertical slide lift conversion system for mounting on an existing vehicle rack or guard in accordance with an embodiment of the subject invention in perspective view. In FIG. 4A the lift is in a stowed configuration and ready for mounting on a vehicle. In FIG. 4B the lift is in a deployed position with no vehicle shown to more clearly show elements of the invention. In FIG. 4C the lift is in a stowed configuration mounted on a vehicle. In FIG. 4C the lift is in a stowed configuration and ready for mounting on a vehicle. In FIG. 4D the lift is in a deployed position mounted on a vehicle with a modular forklift implement 151 installed. Embodiments may provide one or more linear actuators 170B that drives up the lift either directly or through a cable, chain, cord, linkage, or other connector 271 to raise the lift. The connection may be direct or one to one, or the connection may provide a leverage or multiplier (e.g., a two to one ratio of lift motion per actuator motion as depicted in FIGS. 4A through 4D.)

As depicted in FIGS. 4A through 4D, the lift system 200 comprises a fixed frame 210 and a movable frame 220. Vertical frame members 211 support vertical guiderails 212 and connect in this embodiment to rails providing support surface 115. One or more integrated linear actuators 170B may operate with or without a cable 271 routing in contact with cable interface points, comprising one or more rollers 160A and one or more attachment points 160B, respectively, such that tension applied to the linear actuators 170B may create a downward or rearward pressure on the fixed frame 110 and a motion imparting force on the movable frame. pulley 160 is shown near the top of the fixed frame 110, while cable interface points 160A, 160B or associated supporting structures (e.g., axles, bolts, brackets, rods, or bosses) may be advantageously employed as linear actuator mounting points. In this embodiment linear actuator 170B carries rotation point 160, driving cable 271 away from fixed mounting point 160B to raise movable frame 220 at a two to one ratio. Modular implement base 140 spans rail followers 221 to support and align modular lifting fork implement 151, modular trailer ball implement 152 (not shown in FIGS. 3A through 3C), and modular passenger carrying seat implement 153 (not shown in FIGS. 3A through 3C).

Figure 5A:
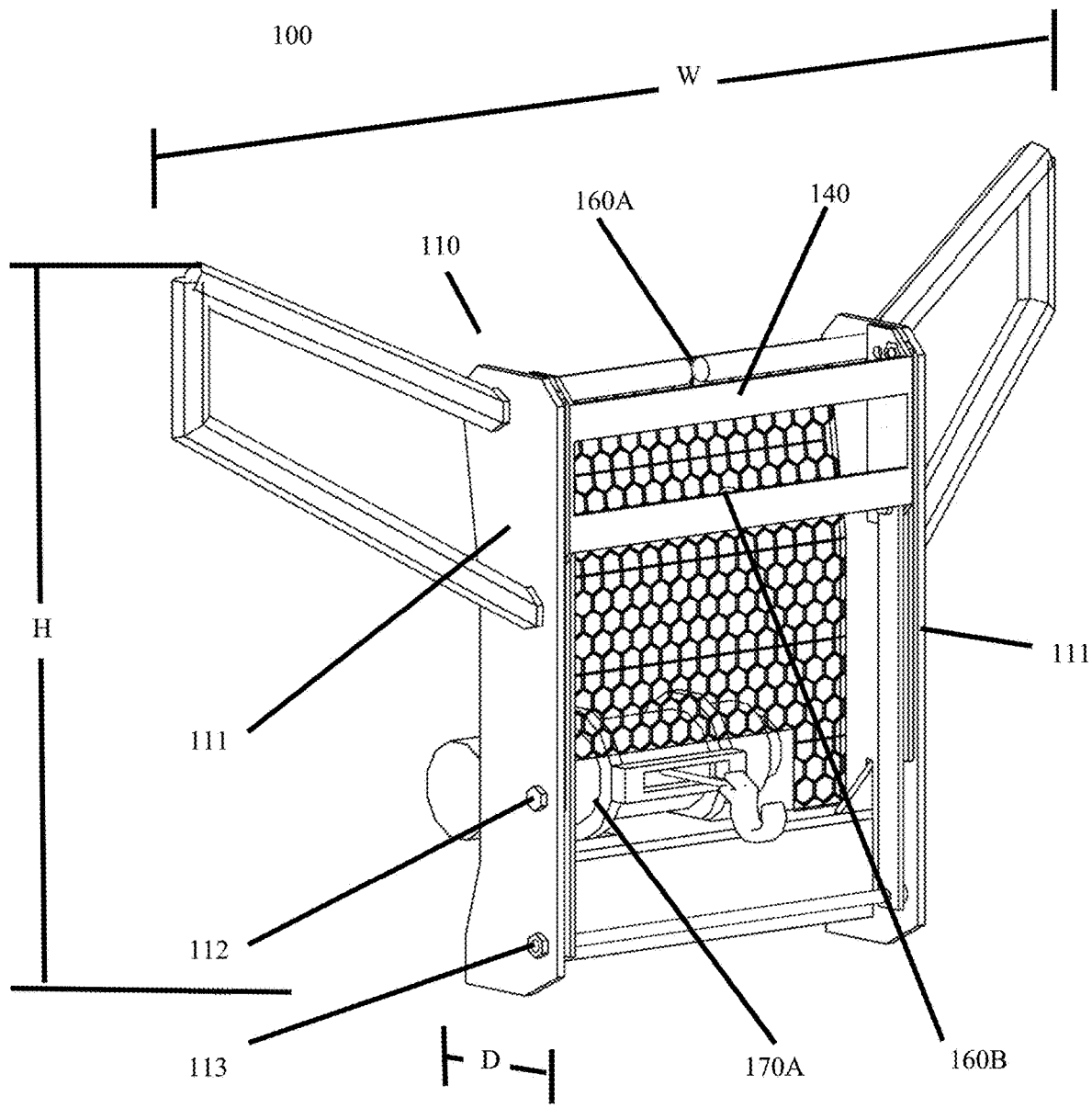
FIG. 5A shows an integrated modular brush guard and lift conversion system for mounting on an existing vehicle in accordance with an embodiment of the subject invention in perspective view. The lift is in a stowed configuration and ready for mounting on a vehicle.
Figure 5B:
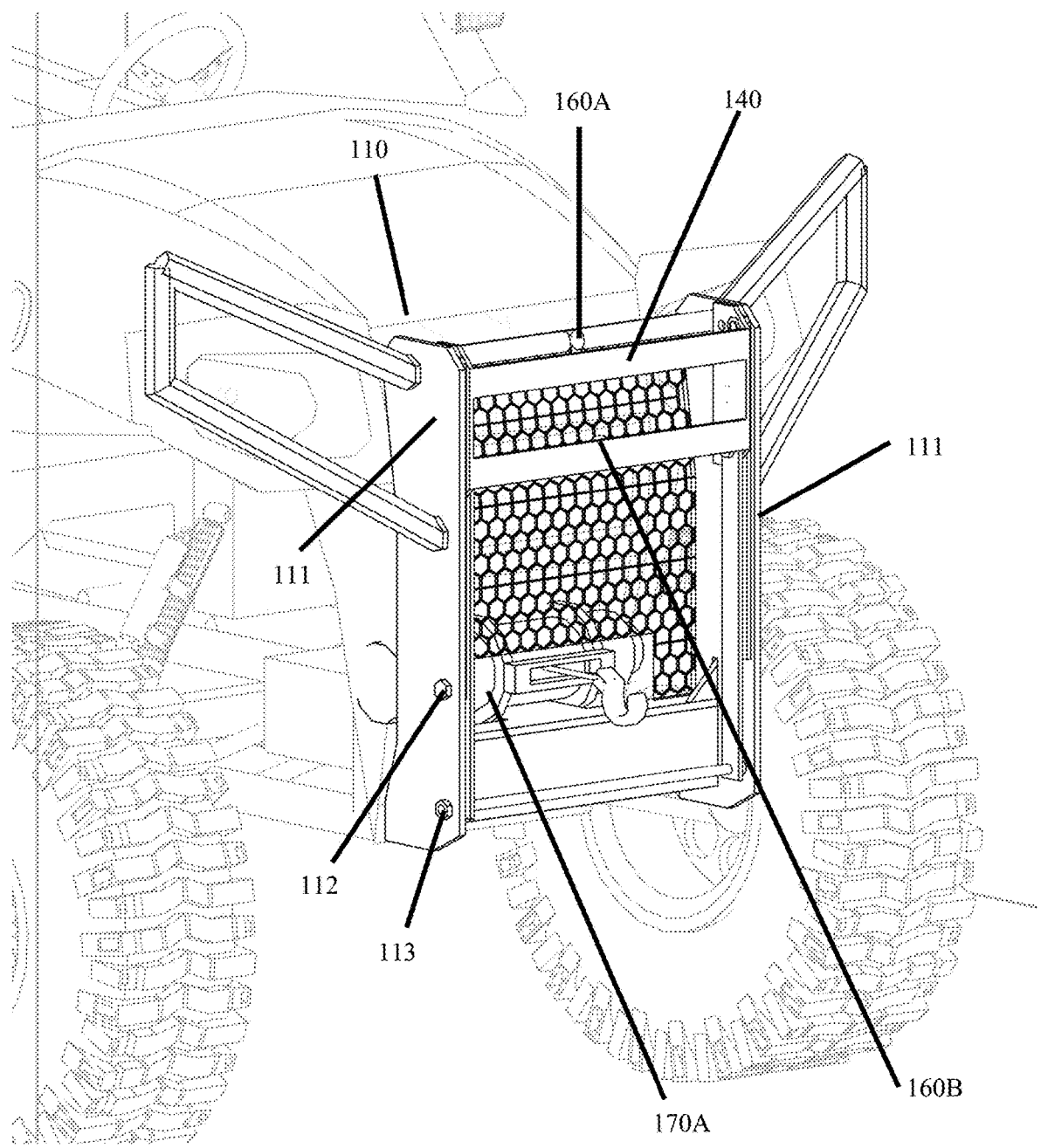
FIG. 5B shows an integrated modular brush guard and lift conversion system for mounting on an existing vehicle in accordance with an embodiment of the subject invention in perspective view. The lift is in a stowed configuration mounted on a vehicle.
Figure 5C:
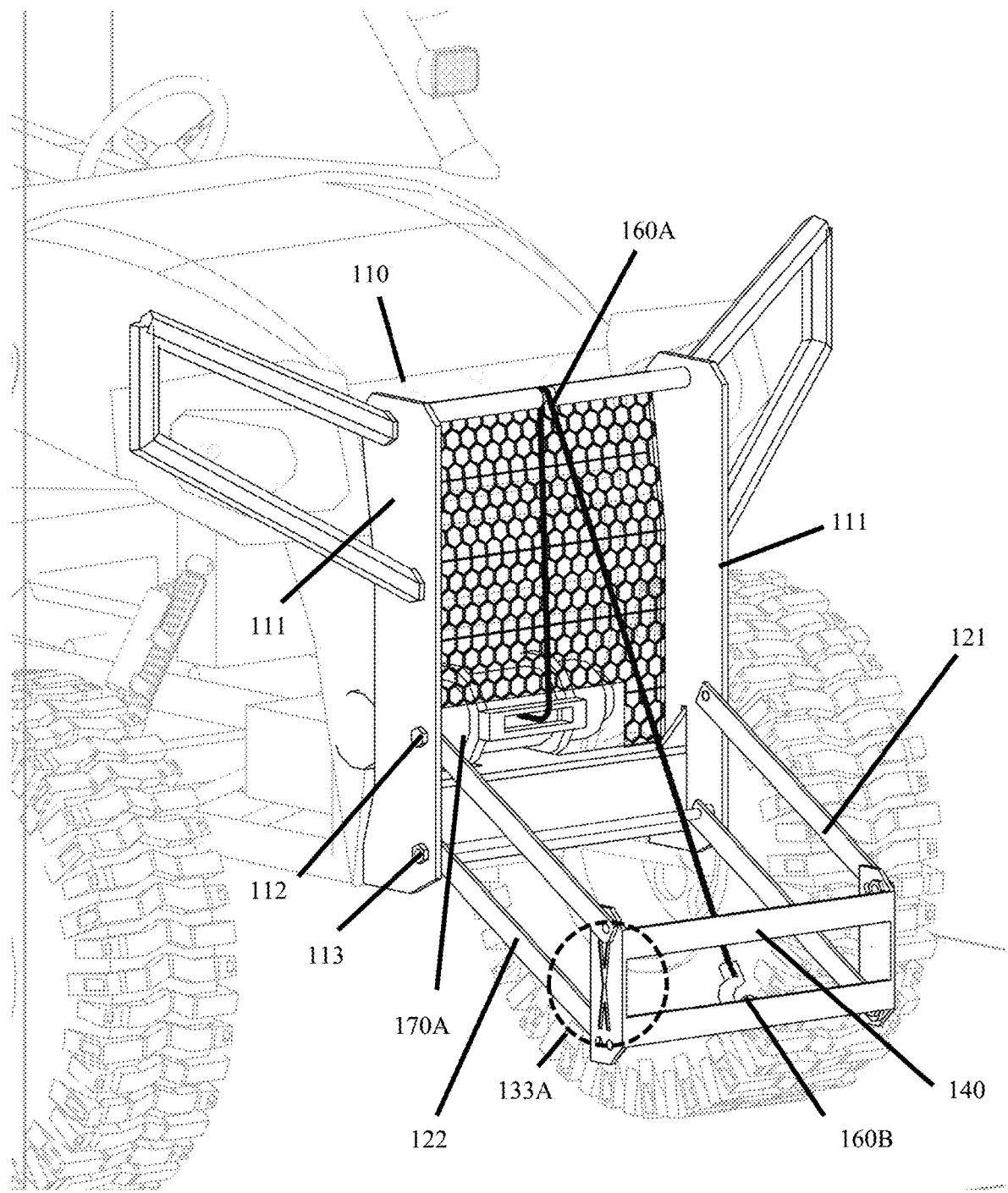
FIG. 5C shows an integrated modular brush guard and lift conversion system for mounting on an existing vehicle in accordance with an embodiment of the subject invention in perspective view. The lift is in a deployed position mounted on a vehicle.
Figure 5D:
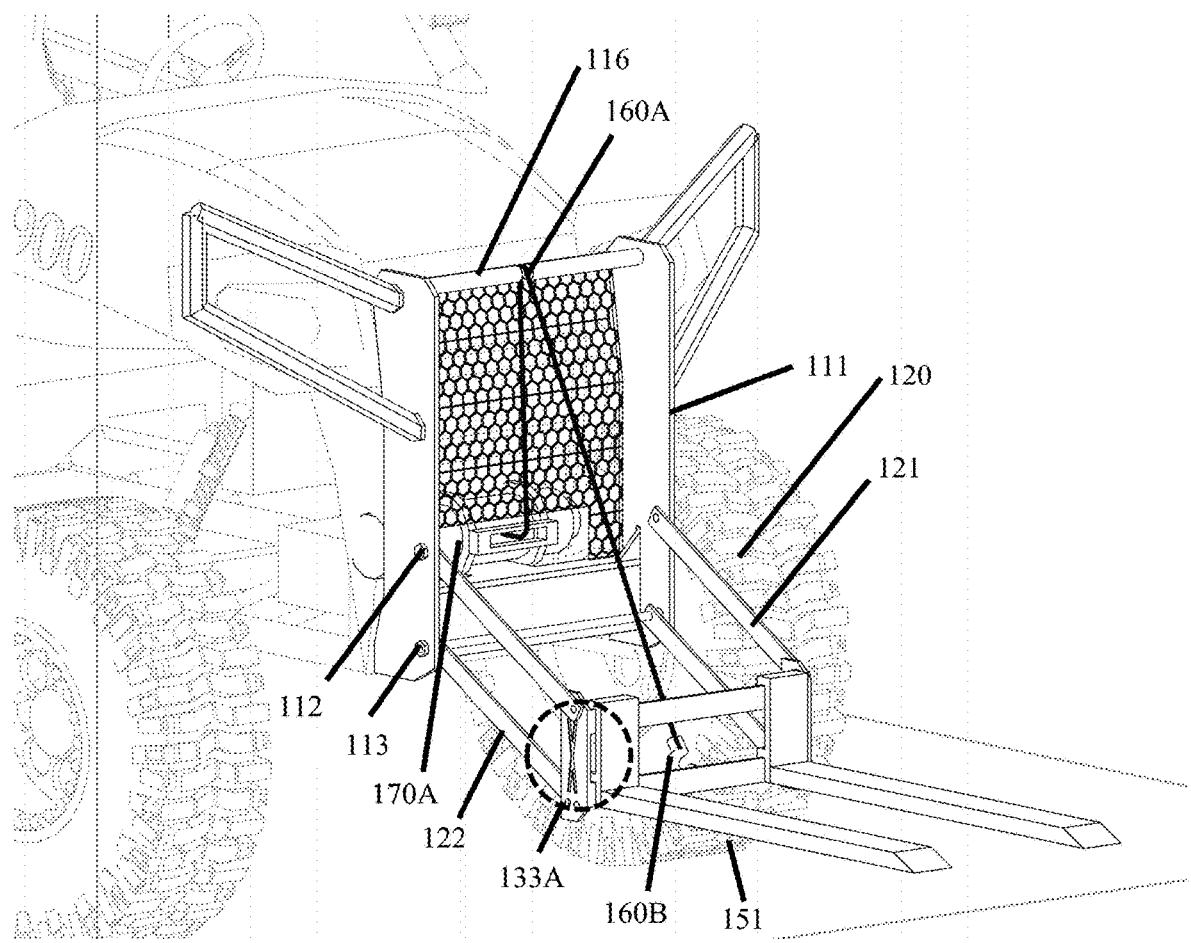
FIG. 5D shows an integrated modular brush guard and lift conversion system for mounting on an existing vehicle in accordance with an embodiment of the subject invention in perspective view. The lift is in a deployed position mounted on a vehicle with a modular forklift implement installed.

FIGS. 5A through 5D show an individually powered integrated modular brush guard and lift conversion system for mounting on an existing vehicle in accordance with an embodiment of the subject invention in perspective view. In FIG. 5A the lift including a lift winch 170A is in a stowed configuration and ready for mounting on a vehicle. In FIG. 5B the lift is in a stowed configuration mounted on a vehicle. In FIG. 5C the lift is in a deployed position mounted on a vehicle. In FIG. 5D the lift is in a deployed position mounted on a vehicle with a modular forklift implement installed. Embodiments may provide a lift that is self powered (e.g., by an onboard battery) or powered from the vehicle (e.g., by receiving electrical power from the vehicle.) In some embodiments the winch may be quickly and easily connected to or disconnected from the lift by routing up and over a cable interface point (e.g., a slide or roller on the fixed frame, such as that shown in FIGS. 5A through 5D) before connecting to the movable frame, x-plate, or modular implement base (e.g., by hooking into a cable interface point, such as that shown in FIGS. 5A through 5D) to drive the lift upward when tension is applied to the cable.

As depicted in FIGS. 5A through 5D, the lift system 100 comprises a fixed frame 110 having a frame width W, a frame depth D, and a frame height H and a movable frame 120. Vertical frame members 111 connect upper pivot point 112, lower pivot point 113, and hook 114; while providing support for vehicle frame mounting points (not shown). Upper pivot arms 121 connect at a near end 121A to upper pivot point 112 and at a far end 121B to adjustable upper pivot point 131. Lower pivot arms 122 connect at a near end 122A to lower pivot point 113 of x-plate 130 and at a far end 122B to adjustable lower pivot point 132 of x-plate 130. Small circle 133A represents the angular adjustability of x-plates 130. Vehicle mounted winch 170A is shown with cable 171 routing in contact with cable interface points, comprising one or more rollers 160A and an attachment point 160B, respectively, such that tension applied to the cable may create a downward or rearward pressure on the fixed frame 110 and a motion imparting force on the movable frame 120. Attachment points and other elements may be hidden from view in some figures. Modular implement base 140 spans between x-plates 130 to support and align modular lifting fork implement 151.

Figure 6A:
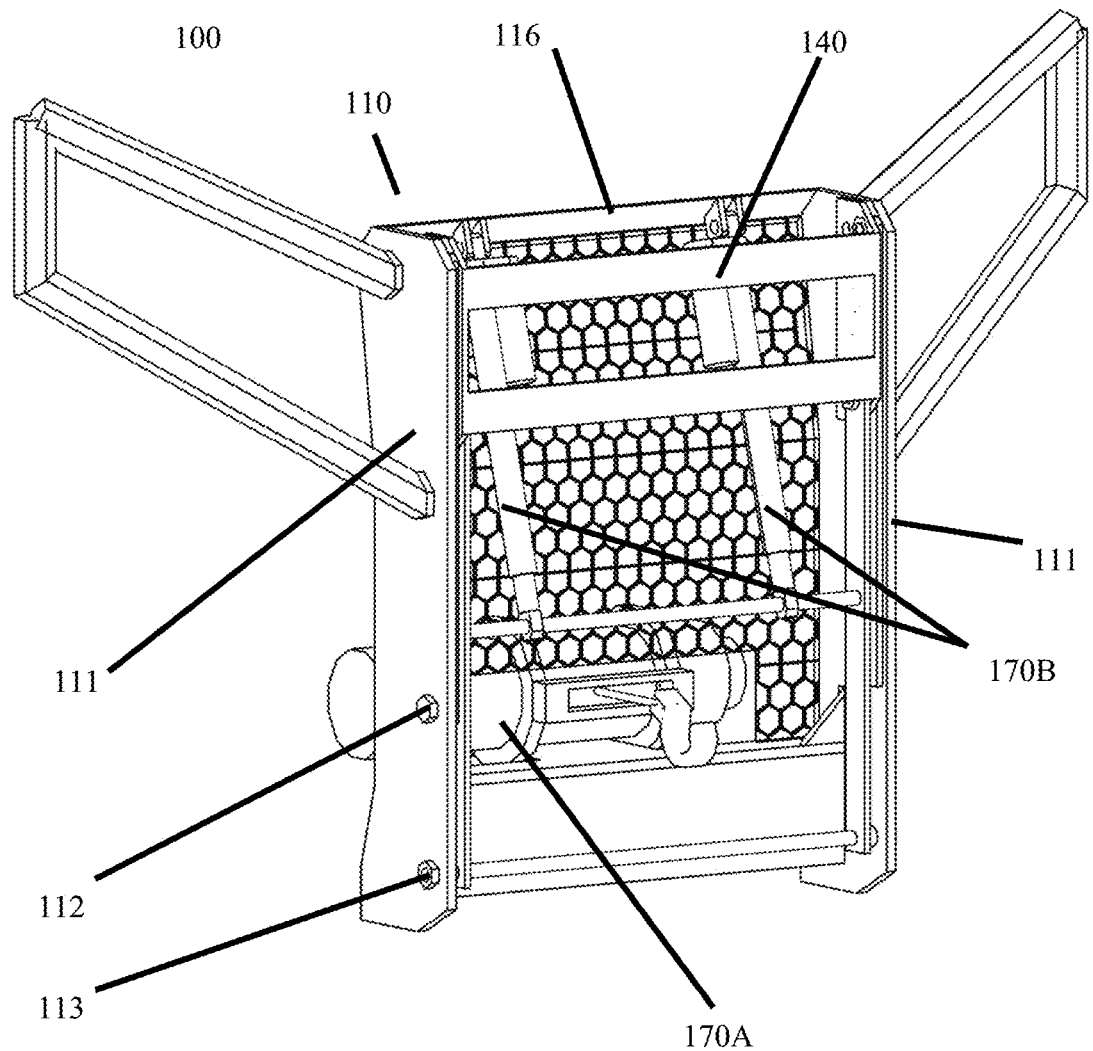
FIG. 6A shows an integrated modular brush guard and lift conversion system for mounting on an existing vehicle in accordance with an embodiment of the subject invention in perspective view. The lift is in a stowed configuration and ready for mounting on a vehicle.
Figure 6B:
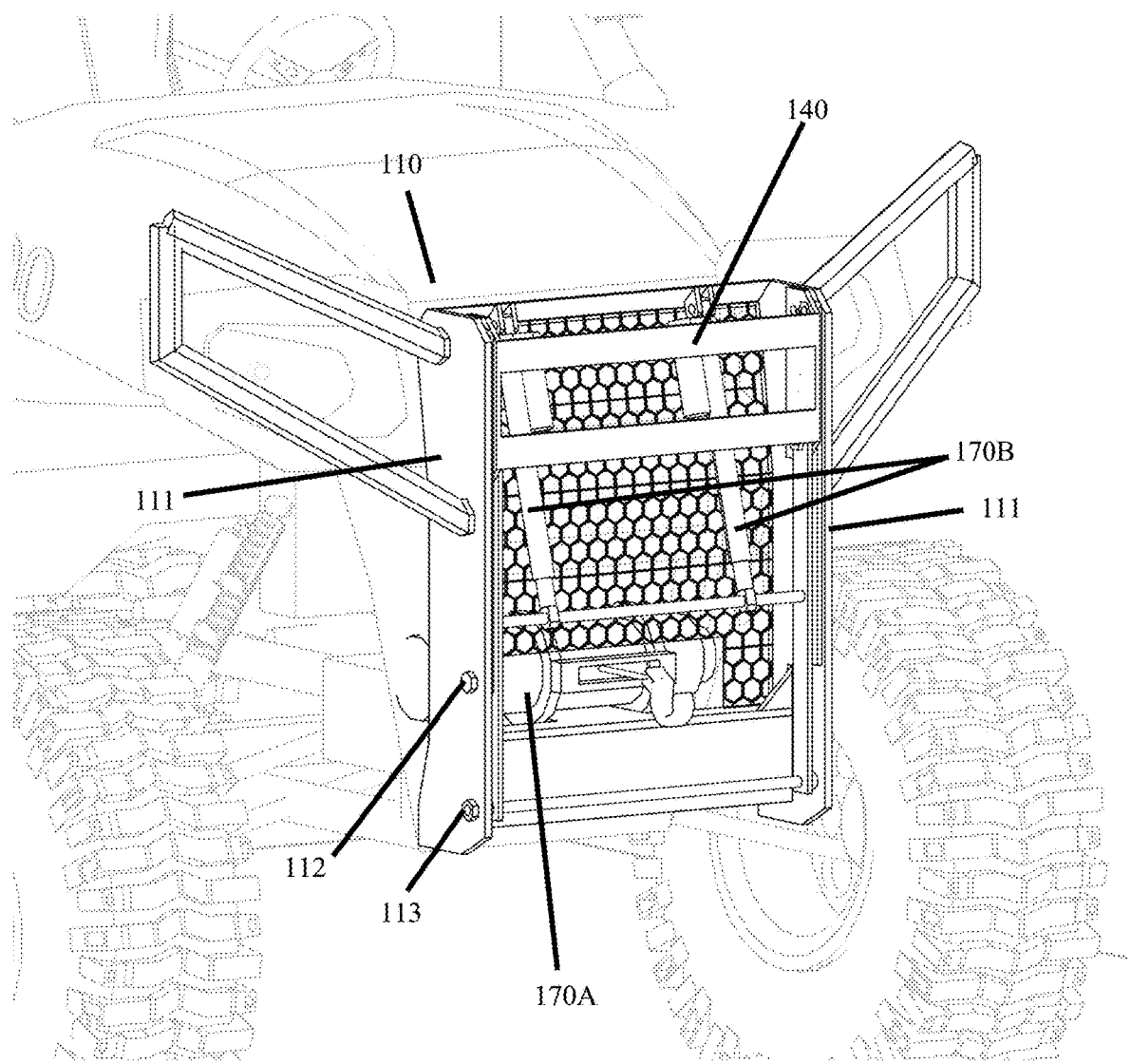
FIG. 6B shows an integrated modular brush guard and lift conversion system for mounting on an existing vehicle in accordance with an embodiment of the subject invention in perspective view. The lift is in a stowed configuration mounted on a vehicle.
Figure 6C:
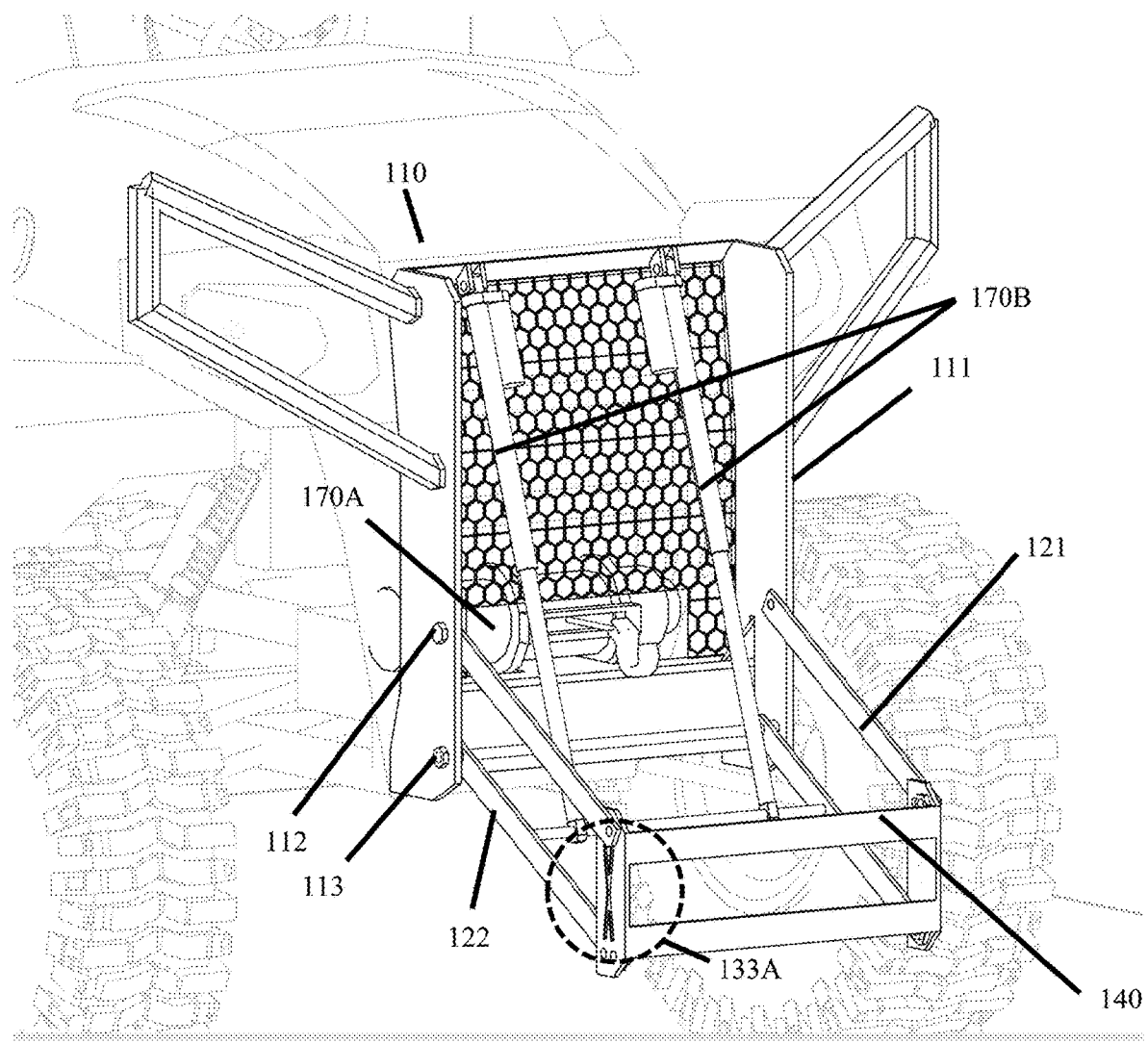
FIG. 6C shows an integrated modular brush guard and lift conversion system for mounting on an existing vehicle in accordance with an embodiment of the subject invention in perspective view. The lift is in a deployed position mounted on a vehicle.
Figure 6D:
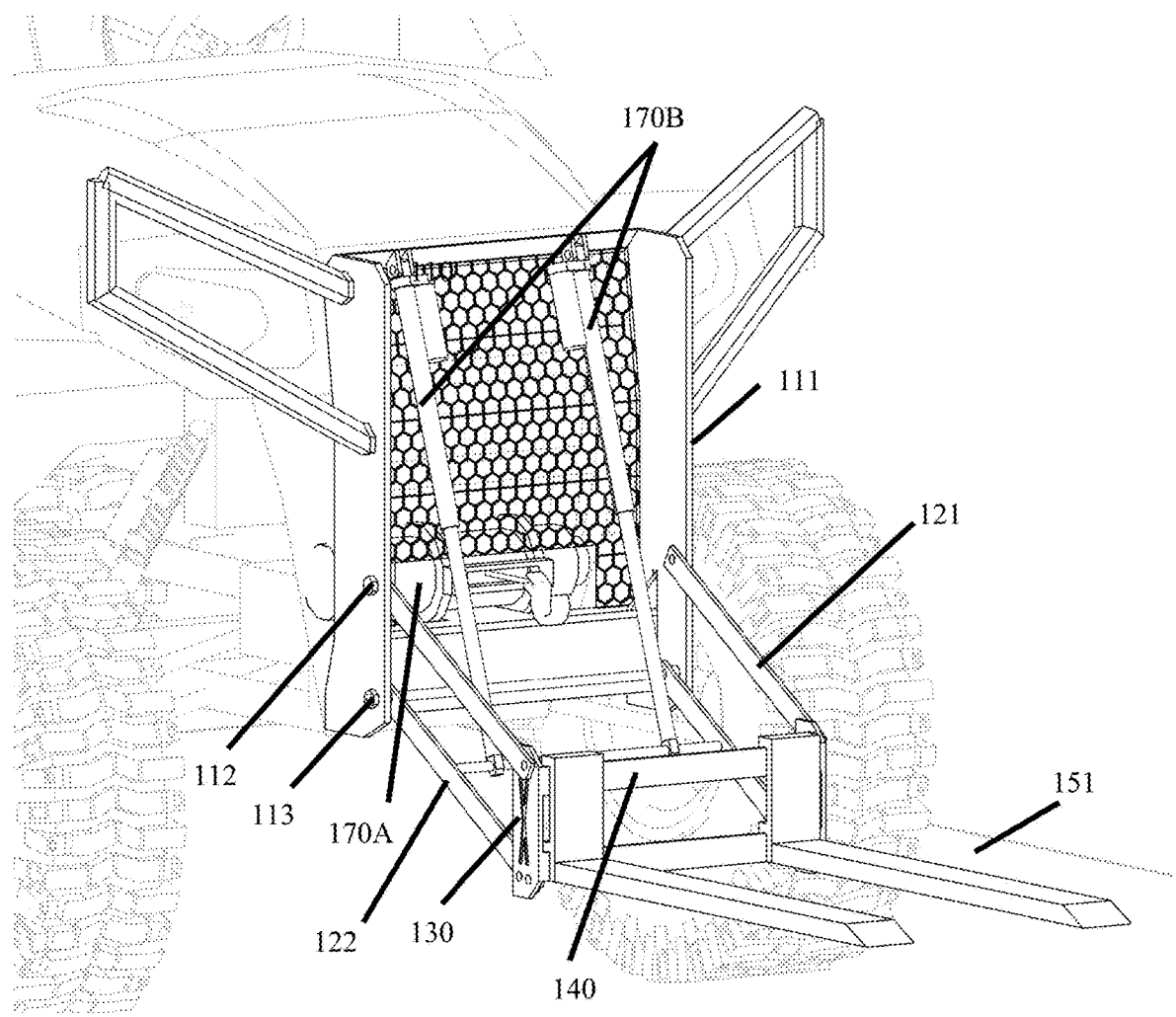
FIG. 6D shows an integrated modular brush guard and lift conversion system for mounting on an existing vehicle in accordance with an embodiment of the subject invention in perspective view. The lift is in a deployed position mounted on a vehicle with a modular forklift implement installed.

FIGS. 6A through 6D show an independently powered integrated modular brush guard and lift conversion system for mounting on an existing vehicle in accordance with an embodiment of the subject invention in perspective view. In FIG. 6A the lift is in a stowed configuration and ready for mounting on a vehicle. In FIG. 6B the lift is in a stowed configuration mounted on a vehicle. In FIG. 6C the lift is in a deployed position mounted on a vehicle. In FIG. 6D the lift is in a deployed position mounted on a vehicle with a modular forklift implement installed. Embodiments may provide a lift winch as depicted in FIG. 6A, or make use of a vehicle winch.

As depicted in FIGS. 6A through 6D, the lift system 100 comprises a fixed frame 110 and a movable frame 120. Vertical frame members 111 connect upper pivot point 112, lower pivot point 113, and hook 114; while providing support for vehicle frame mounting points (not shown.) Upper pivot arms 121 connect at a near end 121A to upper pivot point 112 and at a far end 121B to adjustable upper pivot point 131. Lower pivot arms 122 connect at a near end 122A to lower pivot point 113 of x-plate 130 and at a far end 122B to adjustable lower pivot point 132 of x-plate 130. One or more integrated linear actuators 170B may operate with or without a cable (not shown in FIGS. 6A through 6D) routing in contact with cable interface points, comprising one or more rollers 160A and one or more attachment points 160B, respectively, such that tension applied to the linear actuators 170B may create a downward or rearward pressure on the fixed frame 110 and a motion imparting force on the movable frame 120. Cable interface points 160A, 160B or associated supporting structures (e.g., axles, bolts, brackets, rods, or bosses) may be advantageously employed as linear actuator mounting points. Modular implement base 140 spans between x-plates 130 to support and align modular lifting fork implement 151, modular trailer ball implement 152 (not shown in FIGS. 6A through 6D), and modular passenger carrying seat implement 153 (not shown in FIGS. 6A through 6D).

Figure 7A:
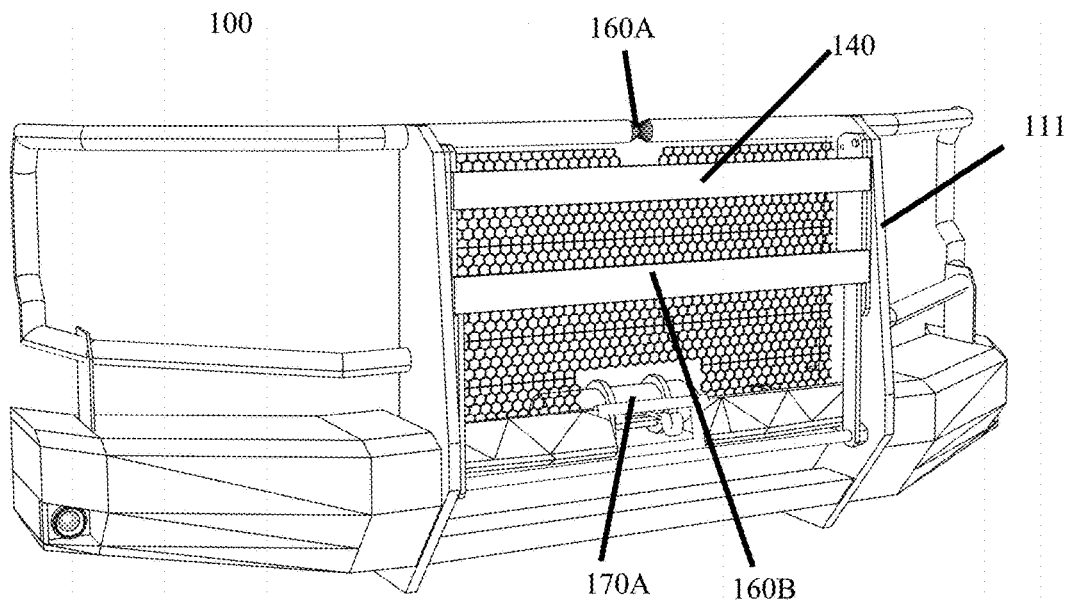
FIG. 7A shows an integrated modular brush guard and lift conversion system for mounting on an existing vehicle in accordance with an embodiment of the subject invention in perspective view. The lift is in a stowed configuration and ready for mounting on a vehicle.
Figure 7B:
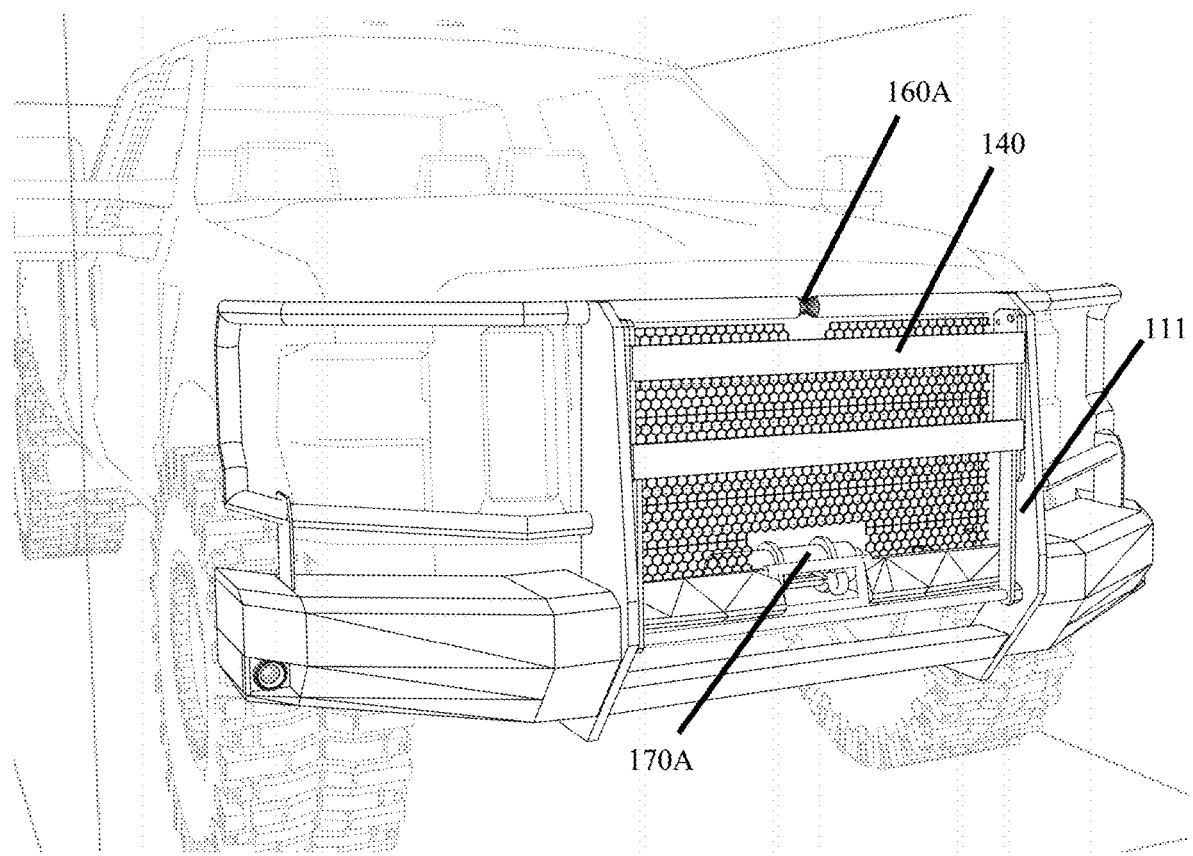
FIG. 7B shows an integrated modular brush guard and lift conversion system for mounting on an existing vehicle in accordance with an embodiment of the subject invention in perspective view. The lift is in a stowed configuration mounted on a vehicle.
Figure 7C:
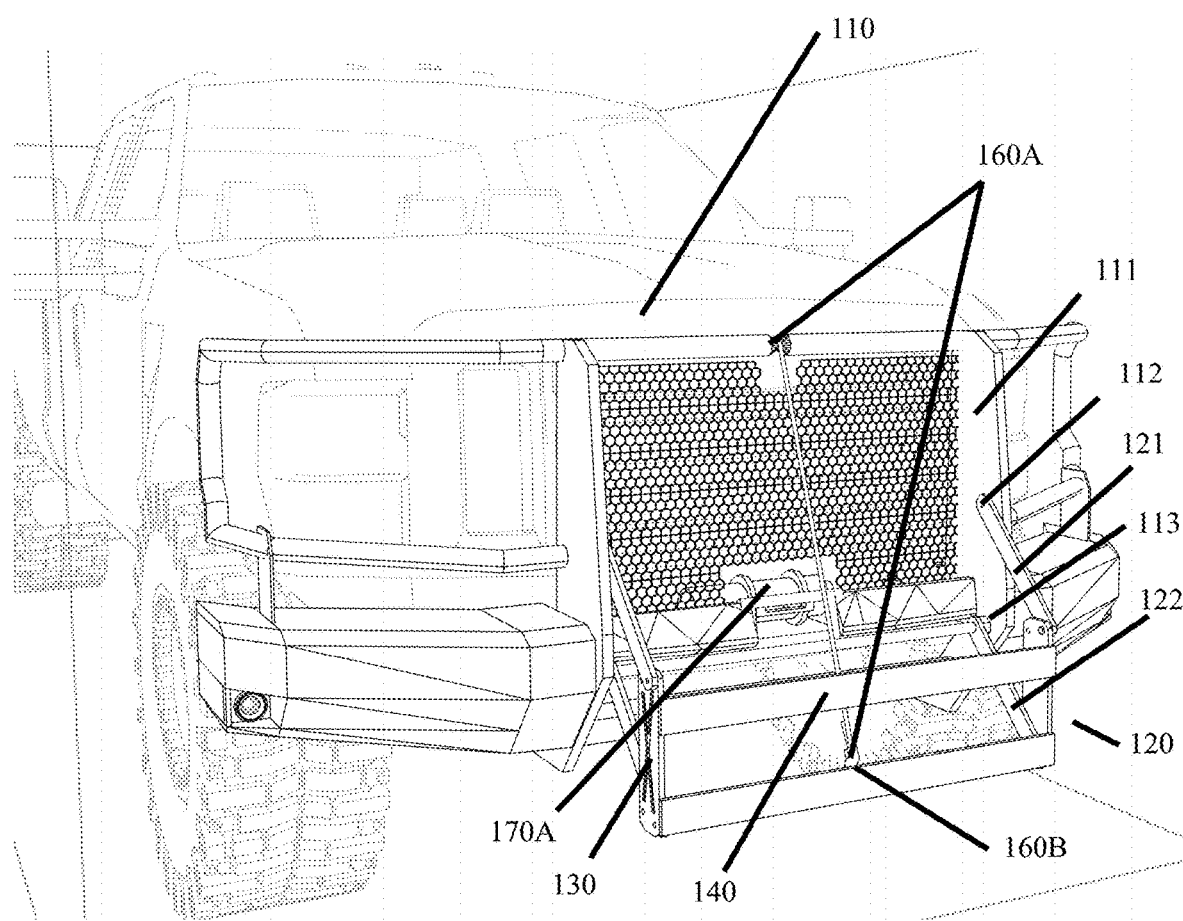
FIG. 7C shows an integrated modular brush guard and lift conversion system for mounting on an existing vehicle in accordance with an embodiment of the subject invention in perspective view. The lift is in a deployed position mounted on a vehicle.
Figure 7D:
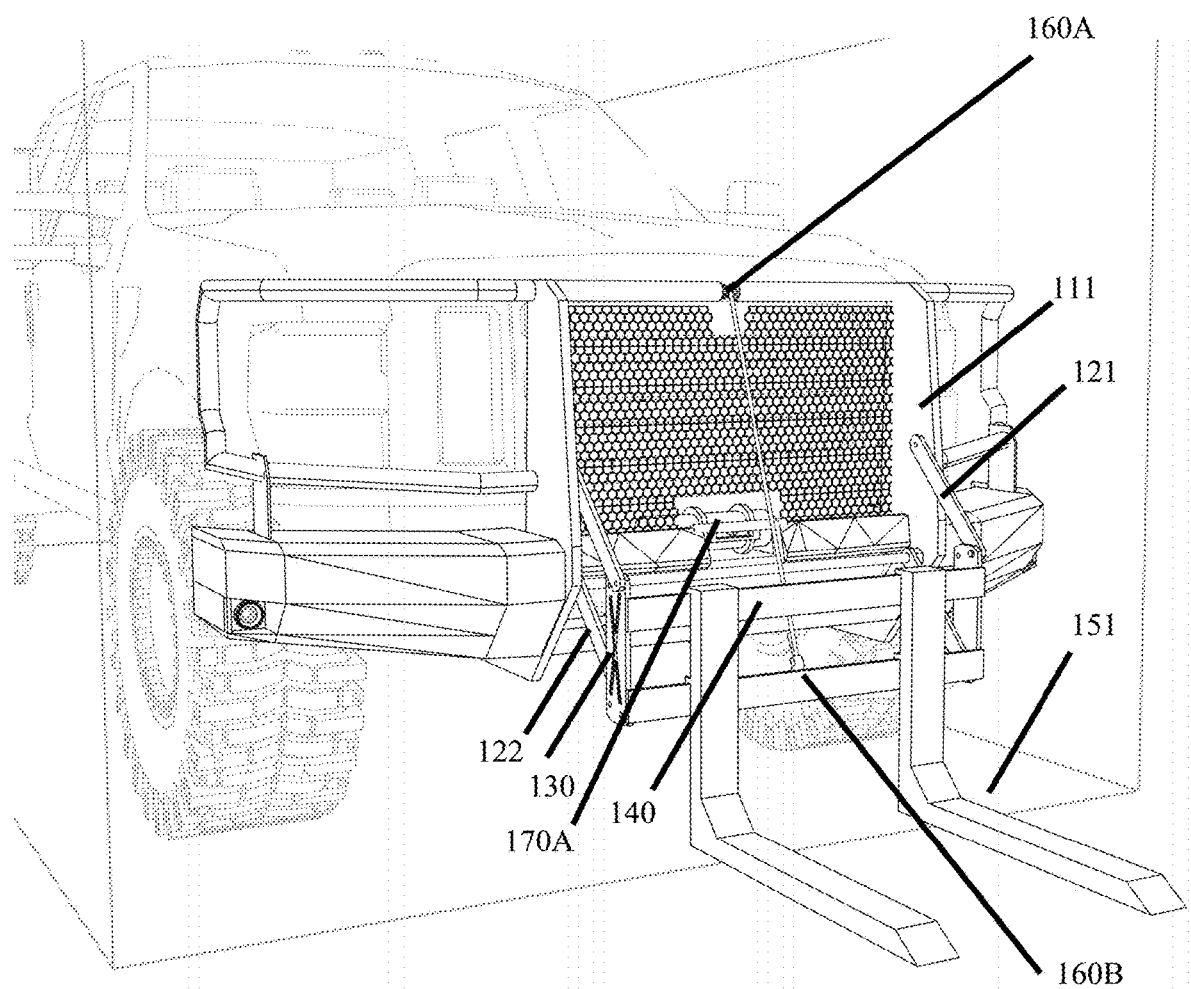
FIG. 7D shows an integrated modular brush guard and lift conversion system for mounting on an existing vehicle in accordance with an embodiment of the subject invention in perspective view. The lift is in a deployed position mounted on a vehicle with a modular forklift implement installed.

FIGS. 7A through 7D show an integrated modular brush guard and lift conversion system for mounting on an existing vehicle in accordance with an embodiment of the subject invention in perspective view. In FIG. 7A the lift is in a stowed configuration and ready for mounting on a vehicle. In FIG. 7B the lift is in a stowed configuration mounted on a vehicle. In FIG. 7C the lift is in a deployed position mounted on a vehicle. In FIG. 7D the lift is in a deployed position mounted on a vehicle with a modular forklift implement 151 installed. Embodiments may provide a movable frame (e.g., comprising a modular implement base 140, x-plate 130, and movable arms or slides (e.g., 121, 122, 221) configured to fit within the confines of a fixed frame when in a stowed configuration. Alternatively, the movable frame may fit within the width of the fixed frame and fit within either the height or the depth of the fixed frame, but not both. The movable frame may fit within the width of the fixed frame and fit within the height of the fixed frame, but extend a distance beyond the depth of the fixed frame when in a stowed configuration (e.g., extending beyond by 0.1, 0.2, 0.3, 0.4, 0.5, 0.6, 0.7, 0.8, 0.9, 1, 2, or 3 times the depth of the fixed frame including ranges, increments, and combinations thereof.) Alternatively, the movable frame may fit within the width of the fixed frame and fit within the depth of the fixed frame, but extend a distance beyond the height of the fixed frame when in a stowed configuration (e.g., extending beyond by 0.1, 0.2, 0.3, 0.4, 0.5, 0.6, 0.7, 0.8, 0.9, or 1 times the height of the fixed frame including ranges, increments, and combinations thereof.)

As depicted in FIGS. 7A through 7D, the lift system 100 comprises a fixed frame 110 having a frame width (not shown), a frame depth (not shown), and a frame height (not shown) and a movable frame 120. Vertical frame members 111 connect upper pivot point 112, lower pivot point 113, and hook 114; while providing support for vehicle frame mounting points (not shown). Upper pivot arms 121 connect at a near end 121A to upper pivot point 112 and at a far end 121B to adjustable upper pivot point 131. Lower pivot arms 122 connect at a near end 122A to lower pivot point 113 of x-plate 130 and at a far end 122B to adjustable lower pivot point 132 of x-plate 130. Vehicle mounted winch 170A is shown with cable 171 routing in contact with cable interface points, comprising one or more rollers 160A and an attachment point 160B, respectively, such that tension applied to the cable may create a downward or rearward pressure on the fixed frame and a motion imparting force on the movable frame. Attachment points and other elements may be hidden from view in some figures. Modular implement base 140 spans between x-plates 130 to support and align modular lifting fork implement 151.

Figure 8A:
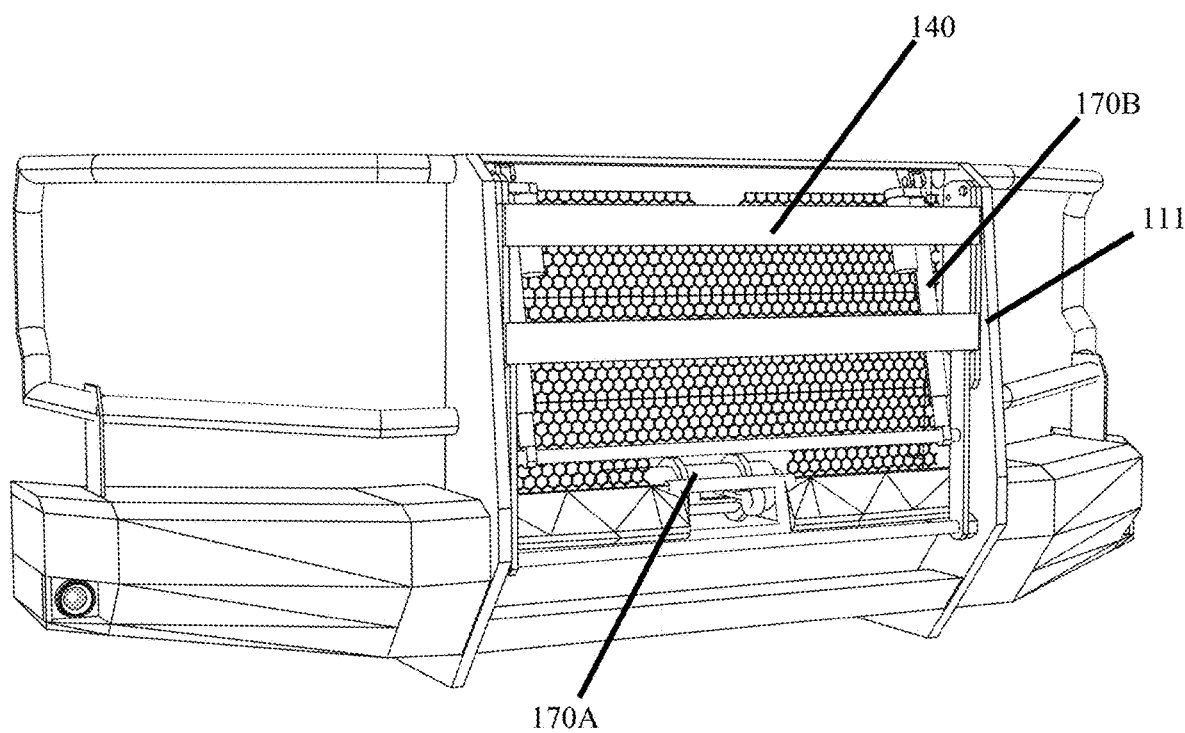
FIG. 8A shows an integrated modular brush guard and lift conversion system for mounting on an existing vehicle in accordance with an embodiment of the subject invention in perspective view. The lift is in a stowed configuration and ready for mounting on a vehicle.
Figure 8B:
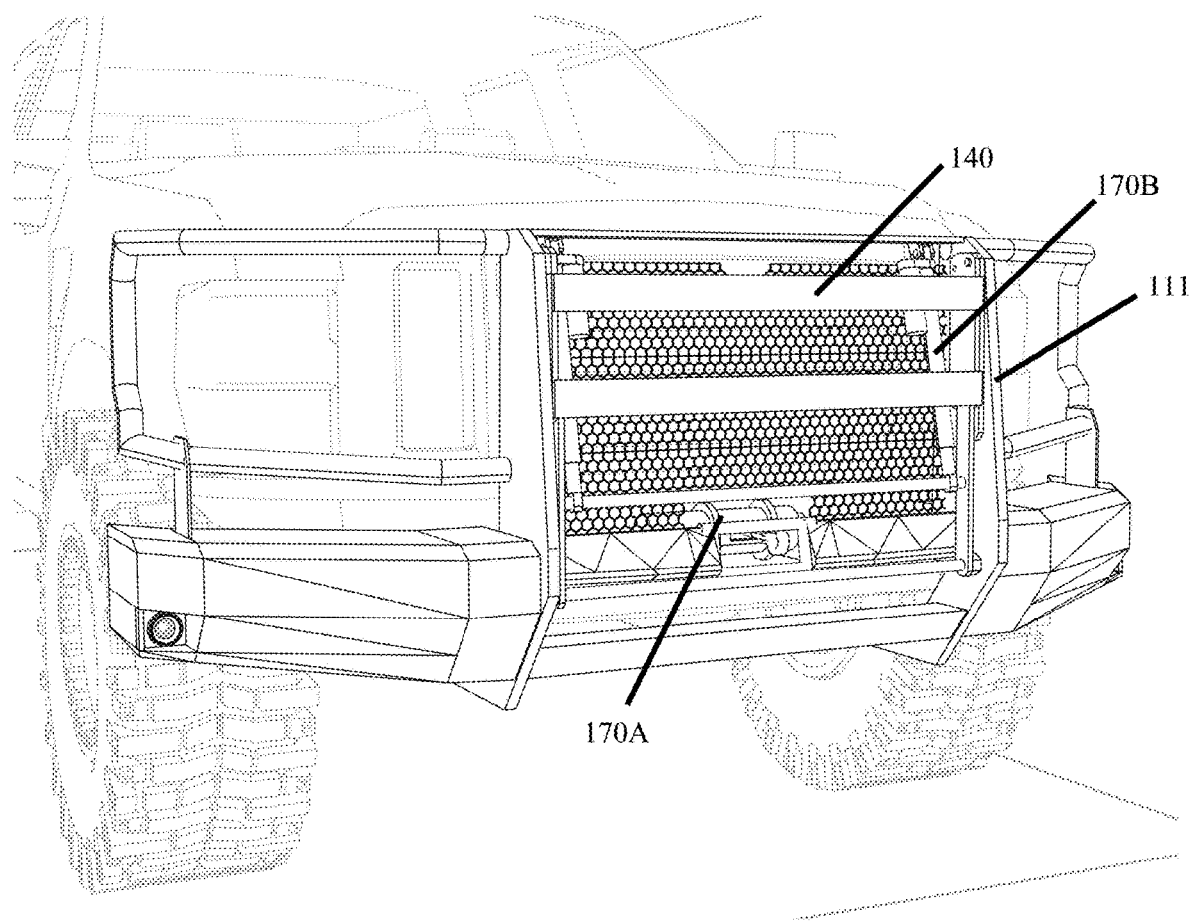
FIG. 8B shows an integrated modular brush guard and lift conversion system for mounting on an existing vehicle in accordance with an embodiment of the subject invention in perspective view. The lift is in a stowed configuration mounted on a vehicle.
Figure 8C:
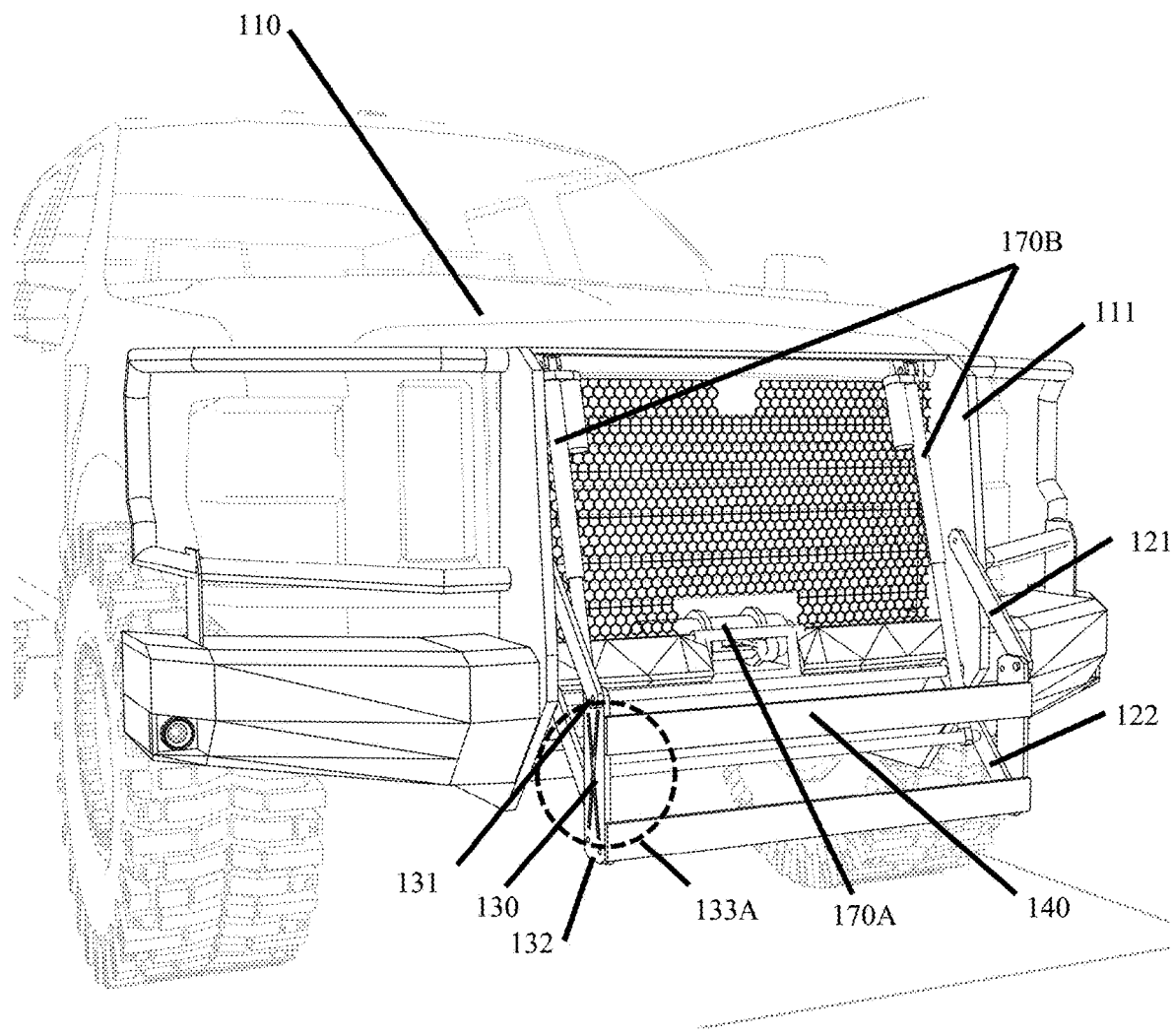
FIG. 8C shows an integrated modular brush guard and lift conversion system for mounting on an existing vehicle in accordance with an embodiment of the subject invention in perspective view. The lift is in a deployed position mounted on a vehicle.
Figure 8D:
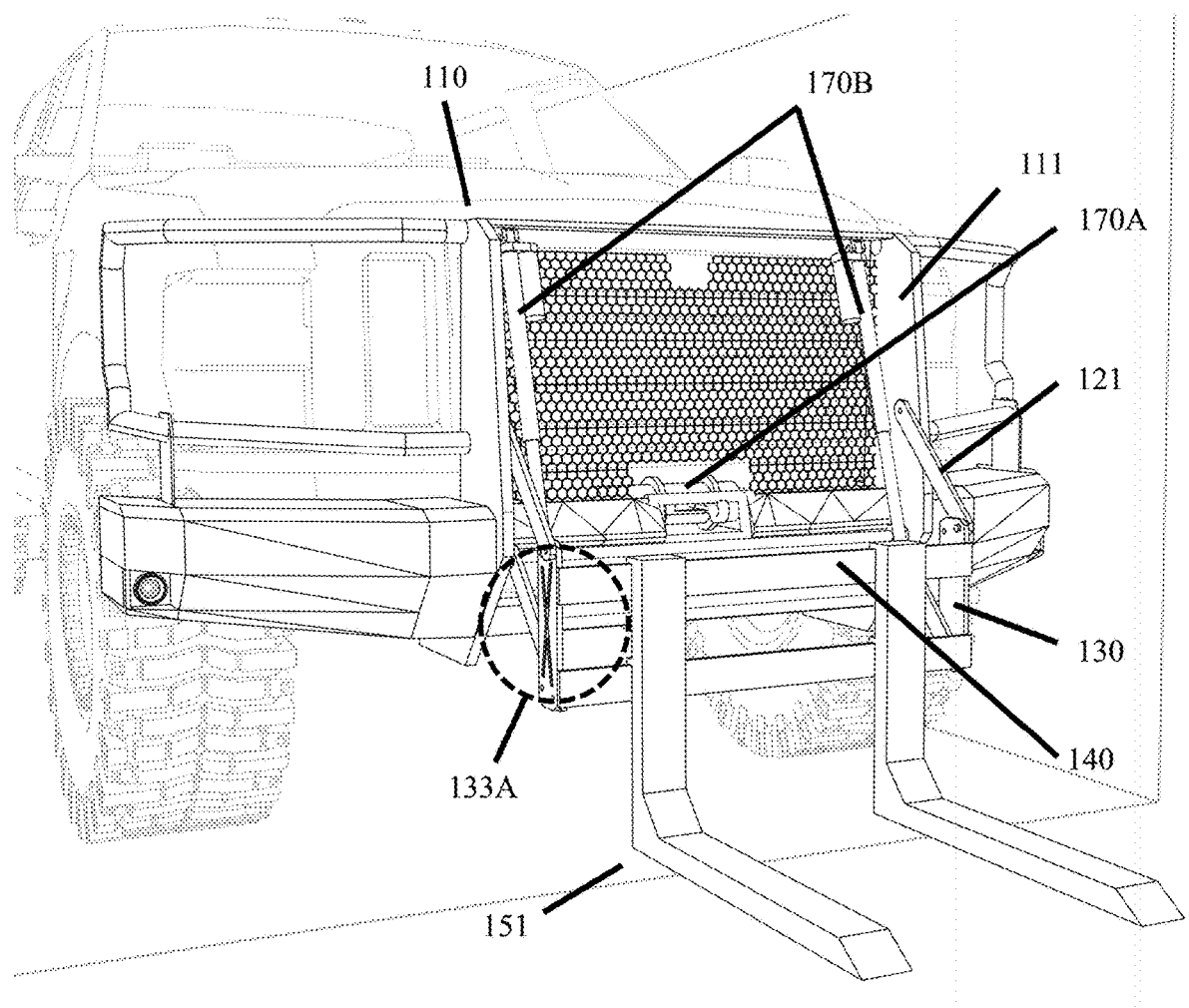
FIG. 8D shows an integrated modular brush guard and lift conversion system for mounting on an existing vehicle in accordance with an embodiment of the subject invention in perspective view. The lift is in a deployed position mounted on a vehicle with a modular forklift implement installed.

FIGS. 8A through 8D show an integrated independently powered modular brush guard and lift conversion system for mounting on an existing vehicle in accordance with an embodiment of the subject invention in perspective view. In FIG. 8A the lift is in a stowed configuration and ready for mounting on a vehicle. In FIG. 8B the lift is in a stowed configuration mounted on a vehicle. In FIG. 8C the lift is in a deployed position mounted on a vehicle. In FIG. 8D the lift is in a deployed position mounted on a vehicle with a modular forklift implement installed. Embodiments may provide a lift winch in addition to or in place of a vehicle winch. The lift winch may be used in addition to or in place of the linear actuators to drive the lift.

Figure 9A:
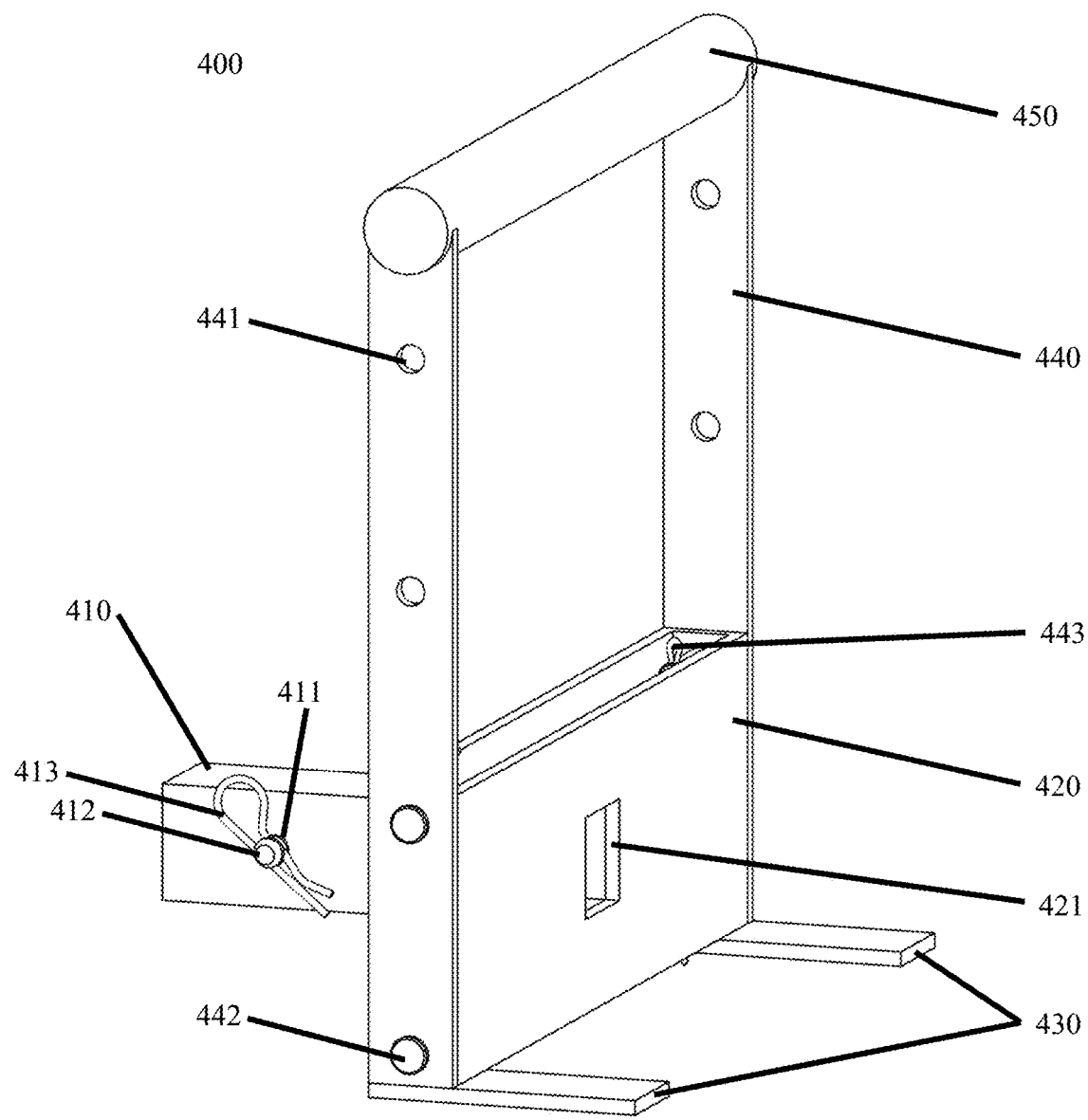
FIG. 9A shows a modular lift conversion system and 2-inch receiver adapter for mounting on an existing vehicle hitch receiver in accordance with an embodiment of the subject invention in perspective view. The 2-inch receiver adapter is ready for mounting on a vehicle.
Figure 9B:
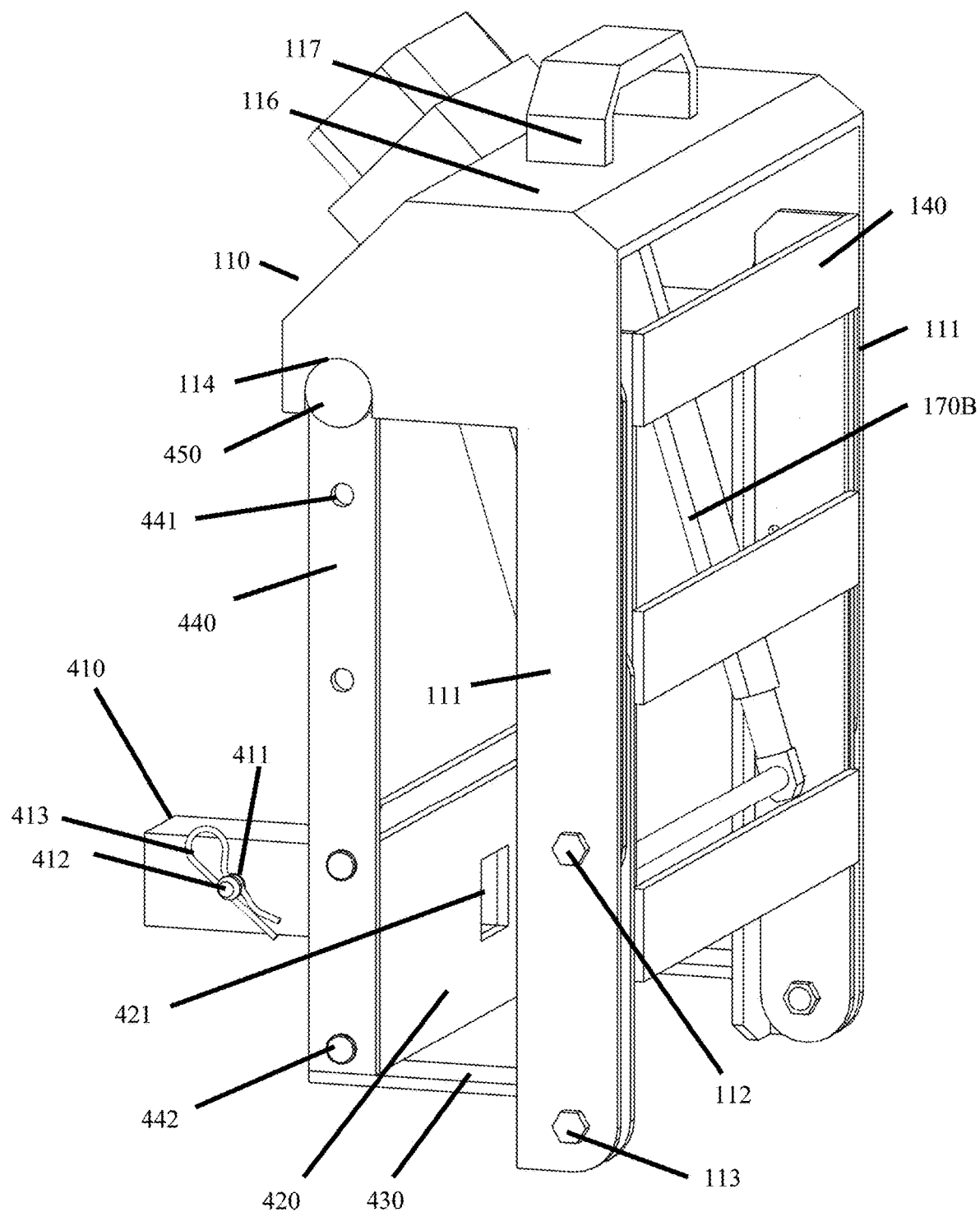
FIG. 9B shows a modular lift conversion system and 2-inch receiver adapter for mounting on an existing vehicle hitch receiver in accordance with an embodiment of the subject invention in perspective view. The lift is in a stowed configuration mounted on the adapter and ready for mounting on a vehicle.
Figure 9C:
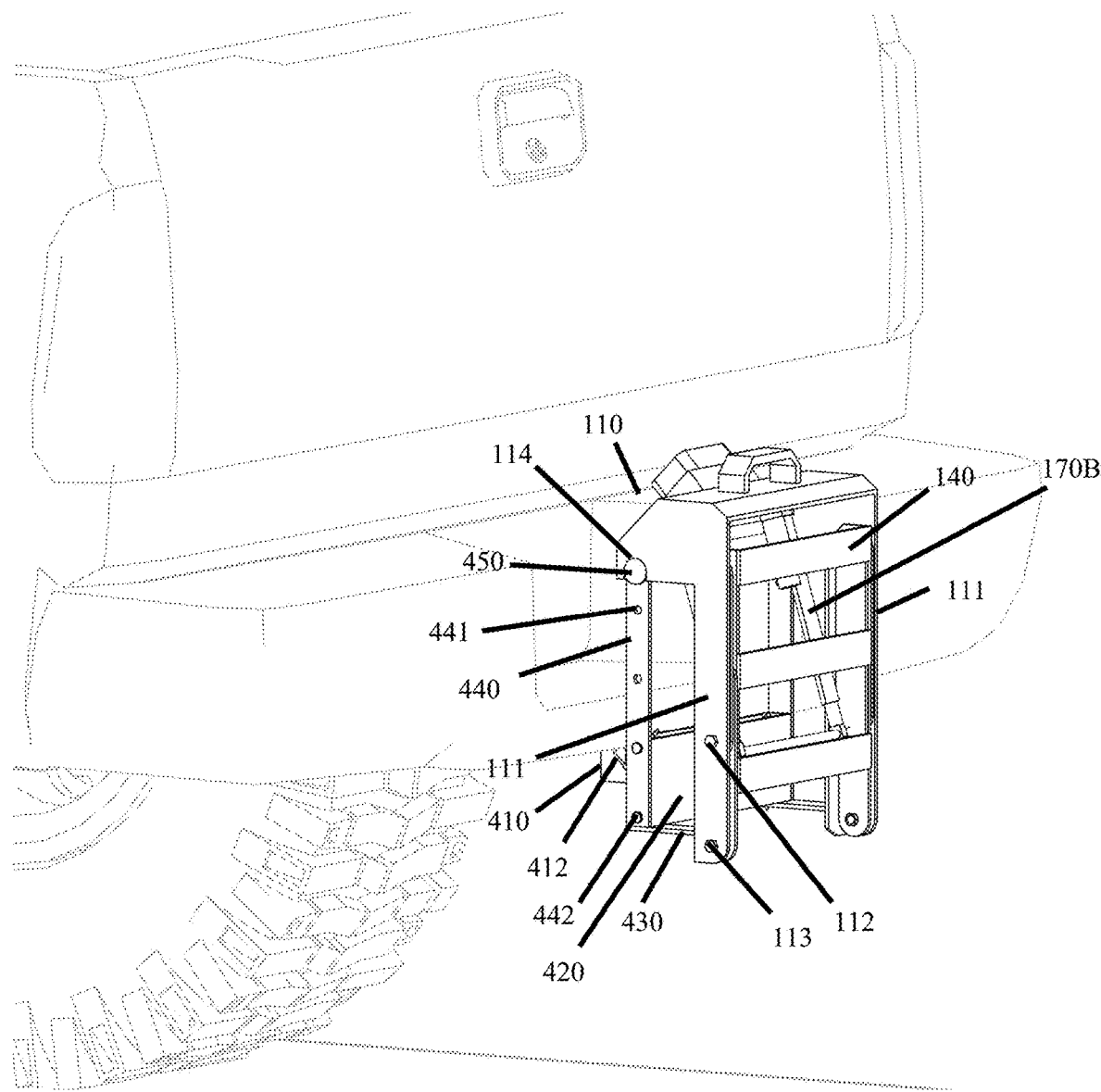
FIG. 9C shows a modular lift conversion system and 2-inch receiver adapter for mounting on an existing vehicle hitch receiver in accordance with an embodiment of the subject invention in perspective view. The lift is in a stowed configuration on the adapter and mounted on a vehicle.
Figure 9D:
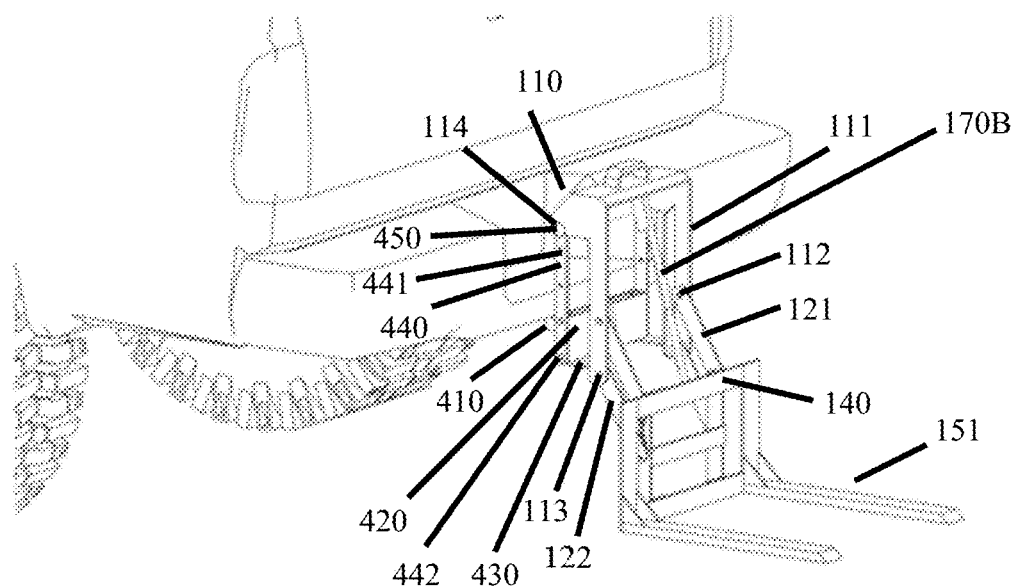
FIG. 9D shows a modular lift conversion system and 2-inch receiver adapter for mounting on an existing vehicle hitch receiver in accordance with an embodiment of the subject invention in perspective view. The lift is in a deployed position mounted on a vehicle with a modular forklift implement installed.
Figure 9E:
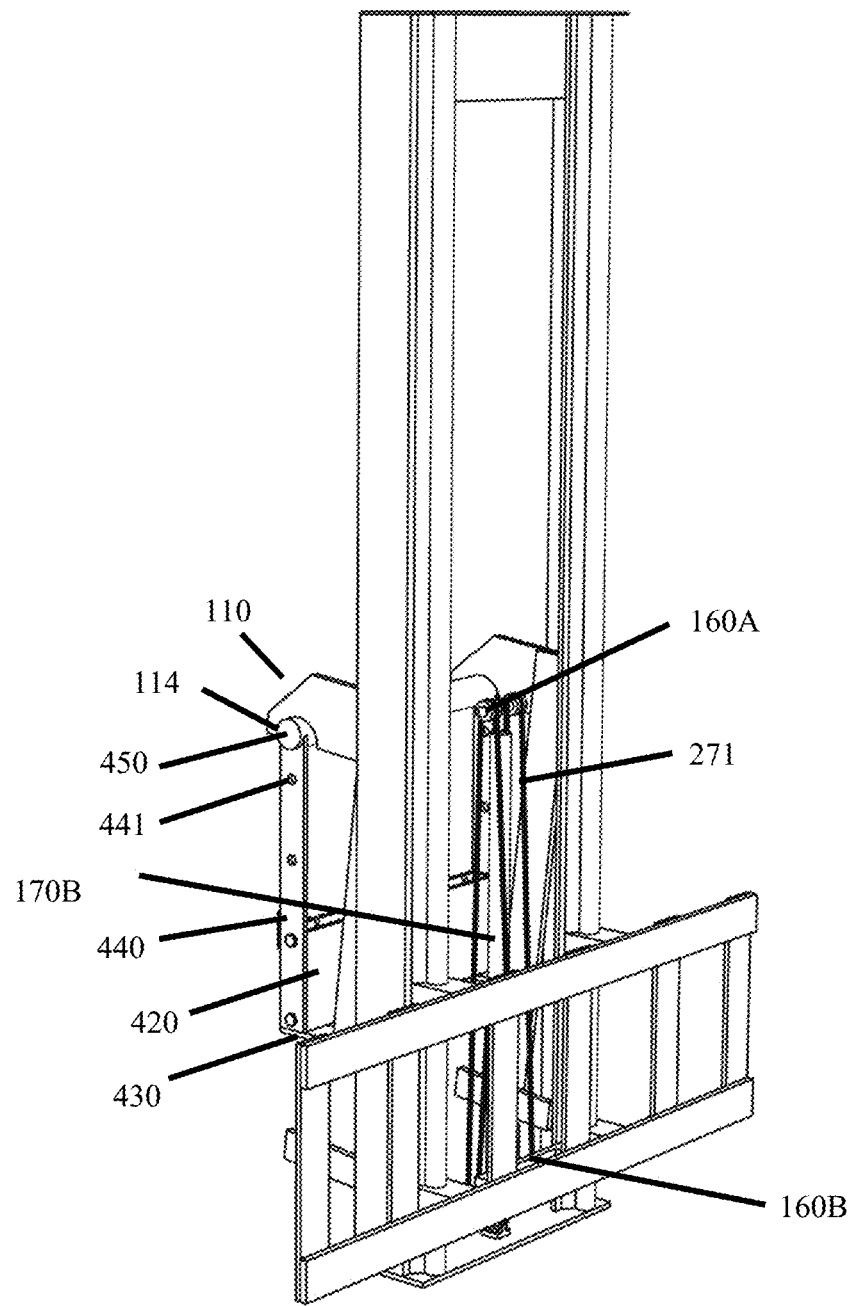
FIG. 9E shows a modular vertical lift conversion system and 2-inch receiver adapter for mounting on an existing vehicle hitch receiver in accordance with an embodiment of the subject invention in perspective view. The lift is in a stowed configuration mounted on the adapter and ready for mounting on a vehicle.
Figure 9F:
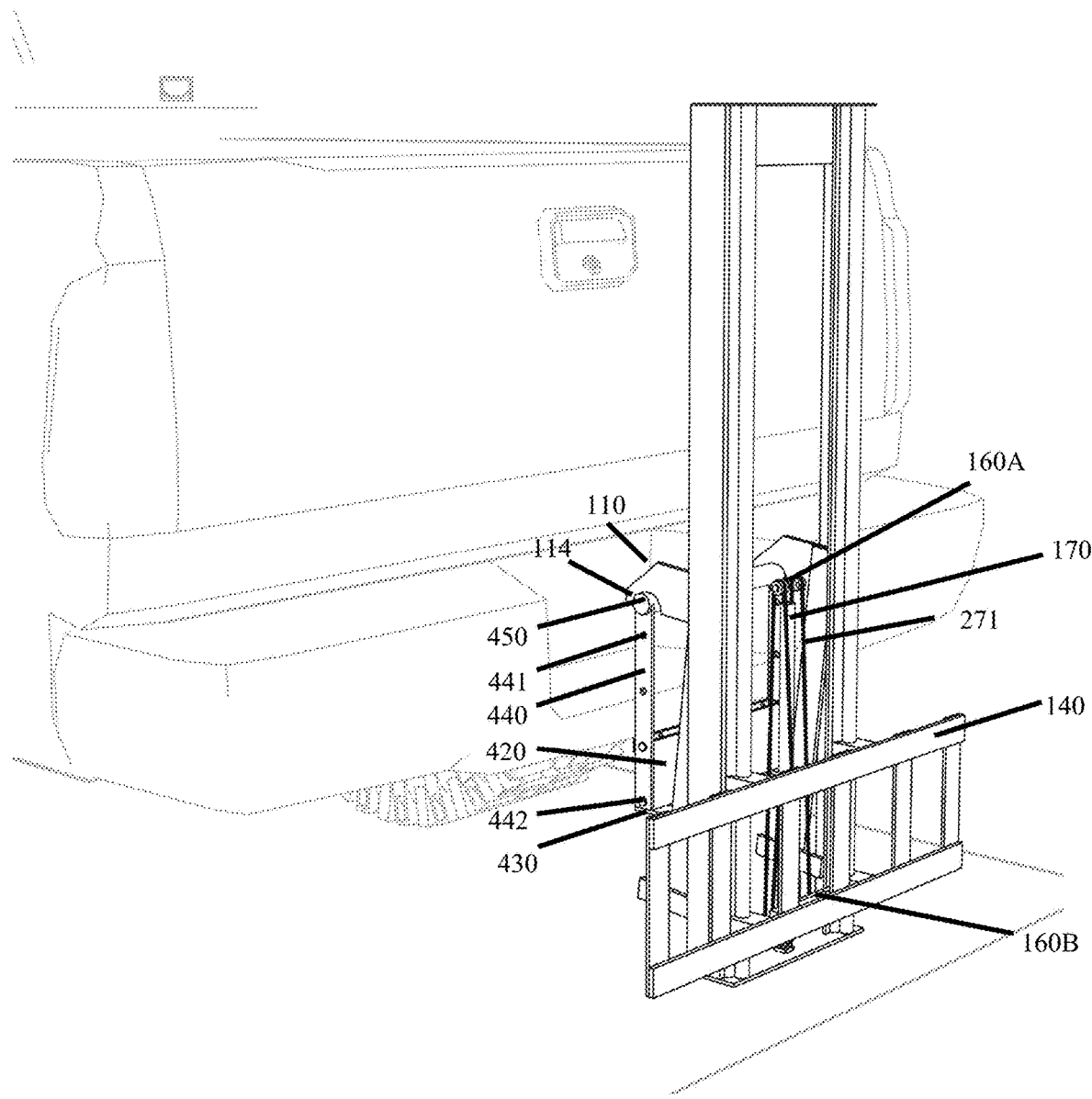
FIG. 9F shows a modular vertical lift conversion system and 2-inch receiver adapter for mounting on an existing vehicle hitch receiver in accordance with an embodiment of the subject invention in perspective view. The lift is in a stowed configuration mounted on the adapter mounted on a vehicle.

FIGS. 9A through 9F show a modular lift conversion system and 2-inch receiver adapter 400 for mounting on an existing vehicle hitch receiver in accordance with an embodiment of the subject invention in perspective view. In FIG. 9A the 2-inch receiver adapter is ready for mounting on a vehicle. Embodiments may include a 2-inch receiver draw-bar mount or other standard or non-standard size mount (e.g., 1¼", 2½", 3", or 50 mm.) In FIG. 9B the lift is in a stowed configuration mounted on the adapter and ready for mounting on a vehicle. In FIG. 9C the lift is in a stowed configuration mounted on a vehicle. In FIG. 9D the lift is in a deployed position mounted on a vehicle with a modular forklift implement installed. In FIG. 9E the lift is in a stowed configuration mounted on the adapter and ready for mounting on a vehicle. In FIG. 9F the lift is in a stowed configuration mounted on the adapter mounted on a vehicle.

Embodiments provide an adapter that allows the modular lift to mount supported by a standard hitch receiver (e.g., a 1¼", 2", or 2½" receiver) on a vehicle in much the same manner as the lift would mount on a brush guard or rack. The adapter may provide a 2" (or 1 ¼", or 2½") box section sized to fit a standard hitch receiver and of a length sufficient to mount firmly in the receiver, support the adapter, and clear surrounding structures (e.g., providing clearance for a bumper, body panel, tailgate, or trunk.) The adapter may be secured in the receiver by a pin and circlip, locking pin, anti-rattle device, or other means known in the art. The adapter may incorporate or accommodate a winch mounting plate. The adapter may be rigidly constructed, configurable, or adjustable to compensate for factors such as vehicle height, receiver height, lift size, or vertical or horizontal offset.

As shown in FIG. 9A, in an embodiment, the box section 410 supports a subframe 420 with access portal 421 that then holds one or more frame supports 430 and adapter arms 440 finally supporting mounting rail 450. The box section 410 may be secured to a vehicle with pin 412 passing through hole 411 and secured by circlip 413. Each connection between elements of the adapter may be made by methods known in the art (e.g., welding or rivets for strength and simplicity, pins for quick change adjustability, or bolts for a balance of strength and adjustability.) The frame supports may be supported by and move with the adapter arms. Alternatively, the frame supports may be supported by and move with the subframe. In this embodiment, holes 441 hold pins 442 to connect adapter arms and subframe. A circlip 443 is visible securing one pin. Other pins and circlips are hidden or partially hidden in this view. Pins may be removed and replaced to select different holes for different configurations (e.g., changing height of the adapter arms relative to the subframe.)

FIG. 9B depicts a lift installed on a hitch adapter in accordance with the subject invention. Embodiments may provide an adapter and lift of the same, similar, or about the same width, as shown in FIG. 9B. Alternatively, the adapter width may be greater than the frame width of the lift (e.g., 1 inch greater, alternatively one-half, 2, 3, 4, 5, or 6 inches greater including ranges, increments, and combinations thereof.) Alternatively, the adapter width may be less than the frame width of the lift (e.g., 1 inch less, alternatively one-half, 2, 3, 4, 5, or 6 inches less including ranges, increments, and combinations thereof.) The adapter my fit inside the fixed frame of the lift. The adapter may provide a rail or mounting location (e.g., similar to the rack or brush guard of a vehicle.) Alternatively, the adapter may provide a unique mounting feature, or a selection of different mounting features, or a modular mounting feature to support a single lift configuration; to support a family of lift configurations with a single adapter; to support a single adapter configuration with a family of different lift configurations; or to support a family of lift configurations with a family of different lift configurations. Various kits are contemplated within the scope of the subject invention comprising one or more lifts, one or more adapters, and optionally one or more accessories (e.g., one or more fasteners, alignment elements, brackets, covers, trim pieces, or other functional or decorative elements) intended for use with the lifts or adapters.

The adapter or the lift may provide an alignment or registration feature, or a pair of mating or opposing features (e.g., a protrusion, wall, stop, washer, edge, ridge, pin, post, detent, slot, hole, depression, convex feature, concave feature, or other feature) that assists in lateral alignment of the lift on the adapter. Alternatively, the lift and adapter may be reversibly joined, registered, fastened, mated, or aligned together (e.g., by a pin, linchpin, bolt, snap-ring, clip, strap, clamp, cam-lock, or other fastener known in the art.) Alternatively, the lift and adapter may be permanently or semi-permanently joined, registered, fastened, mated, or aligned together (e.g., by one or more security bolts, rivets, welds, press-fits, shrink fits, or other methods known in the art.) Alternatively, a lift may be provided as a single unit comprising some or all elements of the adapter (e.g., a receiver adapter may be welded or bolted directly to a fixed frame of a lift, with or without additional elements of the adapter.)

Embodiments may provide frame supports as shown or similar to the supports shown in FIGS. 9A-9F (e.g., horizontal flat, angle, or box section structures located at or near the bottom of the adapter, optionally configured to engage the lift at or near the bottom of the fixed frame height.) Alternatively, frame supports may take different forms or be provided in different locations (e.g., vertical or angled supports, curved supports, round pipe sections, extensions of the box section, subframe, adapter arms, or mounting rail.

Alternative adapter configurations are contemplated within the scope of the subject invention, some of which may function in the absence of one or more individual elements disclosed herein or depicted in FIGS. 9A-9F (e.g., some or all functionality of the subframe may be achieved by features of the box section.) While FIG. 9A depicts a symmetric two-sided design for elements of the adapter, alternative designs are contemplated (e.g., asymmetric, monolithic, central, three, or four sided designs are contemplated.)

Figure 10A:
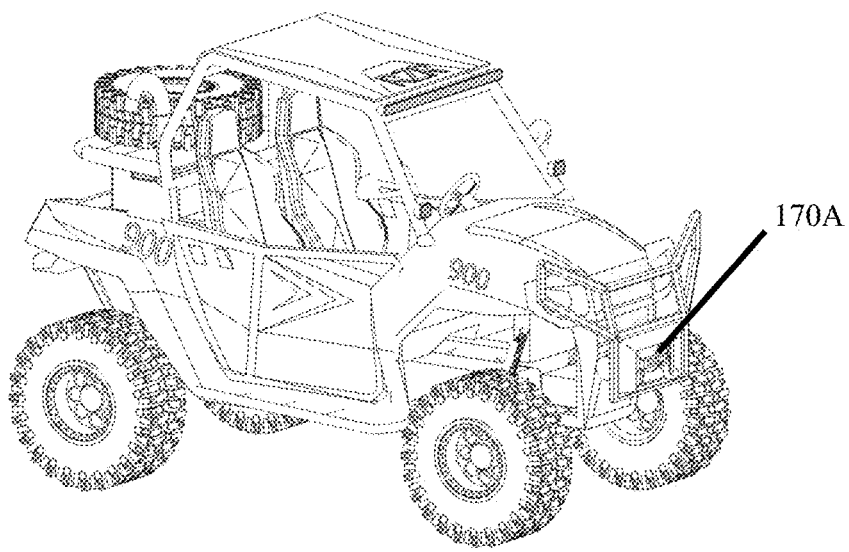
FIG. 10A shows a UTV vehicle with a rack or guard and winch installed.
Figure 10B:
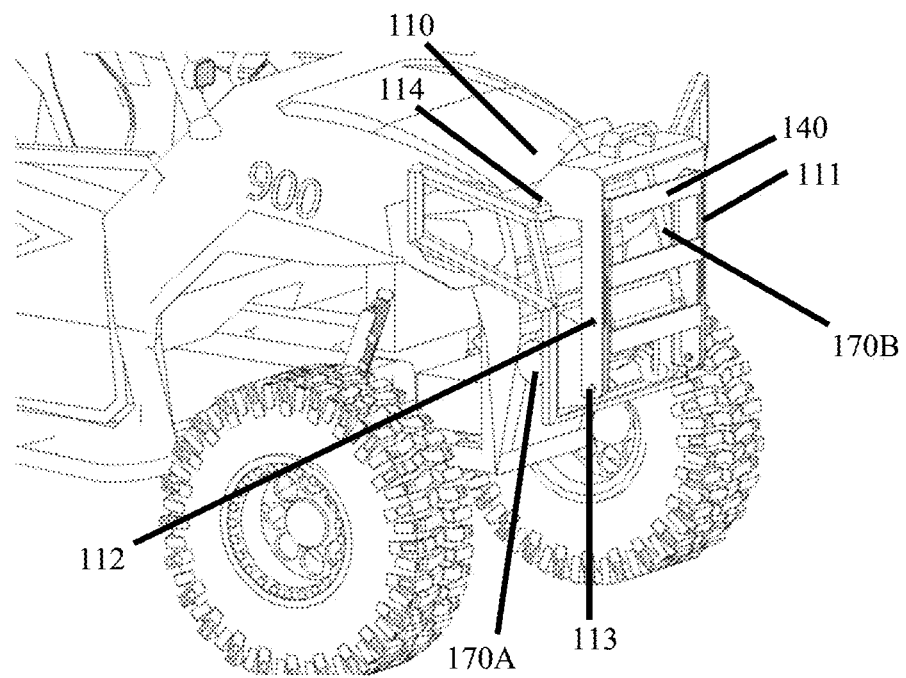
FIG. 10B shows a modular lift conversion system for mounting on an existing vehicle rack or guard in accordance with an embodiment of the subject invention in perspective view. The lift is in a stowed configuration mounted on a UTV.
Figure 10C:
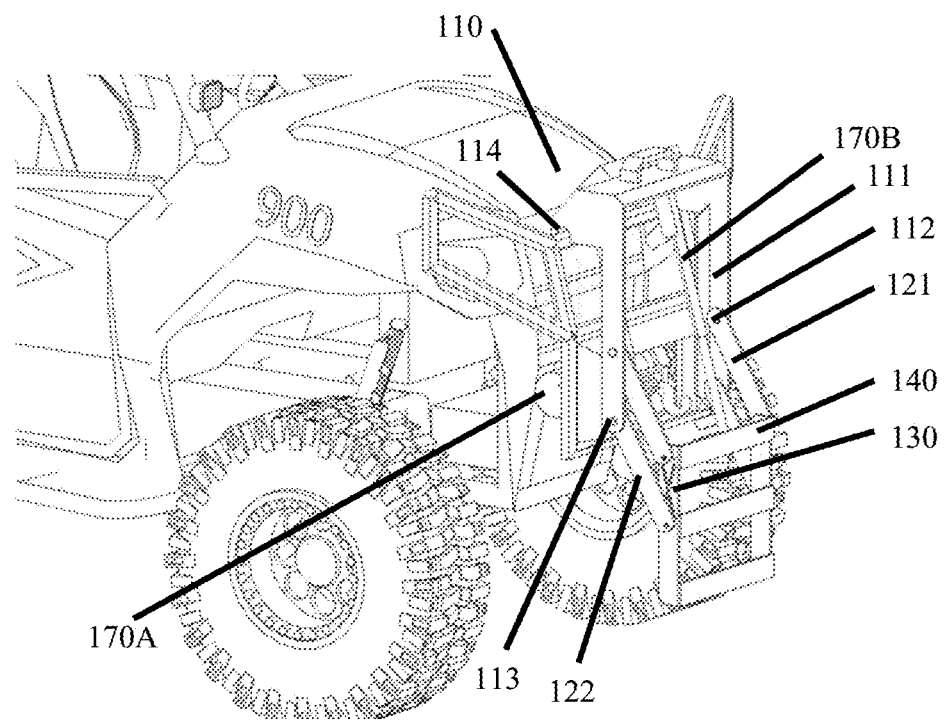
FIG. 10C shows a modular lift conversion system for mounting on an existing vehicle rack or guard in accordance with an embodiment of the subject invention in perspective view. The lift is in a deployed position mounted on a UTV.
Figure 10D:
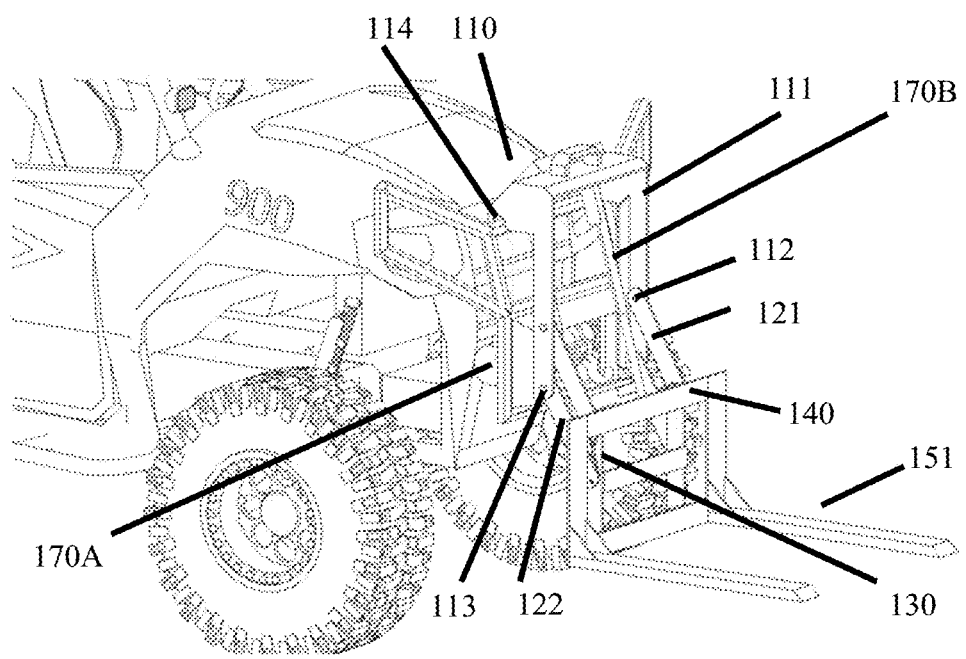
FIG. 10D shows a modular lift conversion system for mounting on an existing vehicle rack or guard in accordance with an embodiment of the subject invention in perspective view. The lift is in a deployed position mounted on a UTV with a modular forklift implement installed.

FIGS. 10A through 10D show a UTV vehicle with a rack or guard and winch installed, and a self-powered (e.g., battery powered) modular lift conversion system for mounting on the UTV vehicle rack or guard in accordance with an embodiment of the subject invention in perspective view. FIG. 10A shows the UTV vehicle with a rack or guard and winch installed. In FIG. 10B the lift is in a stowed configuration mounted on a UTV without using the vehicle winch. In FIG. 10C the lift is in a deployed position mounted on a UTV. In FIG. 10D the lift is in a deployed position mounted on a UTV with a modular forklift implement installed. In each of FIGS. 10A through 10D the vehicle winch is available for other uses while the lift is installed or in use. Alternatively, the lift is operable in the absence of a vehicle winch, or in the event of failure of a vehicle winch.

Figure 11A:
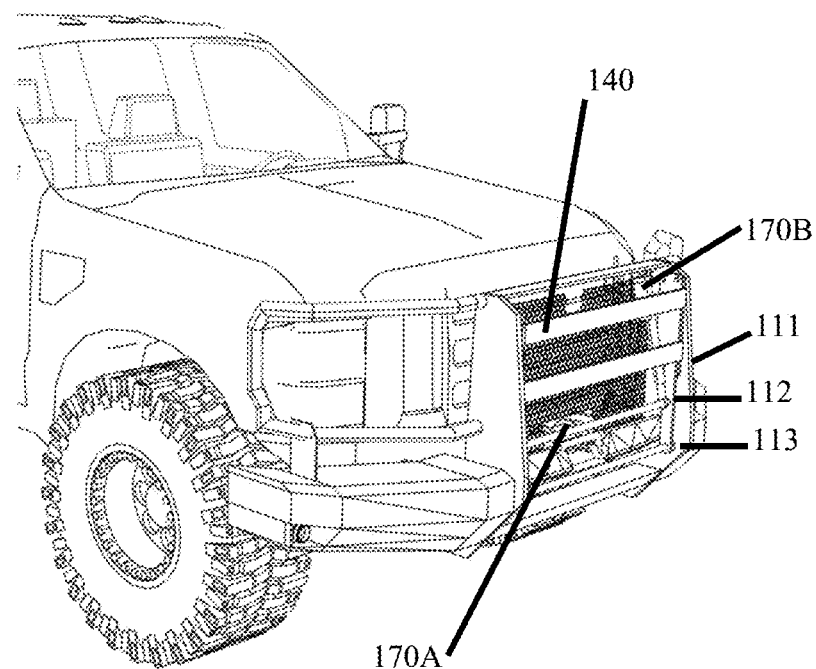
FIG. 11A shows an integrated modular brush guard and lift conversion system for mounting on an existing vehicle in accordance with an embodiment of the subject invention in perspective view. The lift is in a stowed configuration mounted on a truck.
Figure 11B:
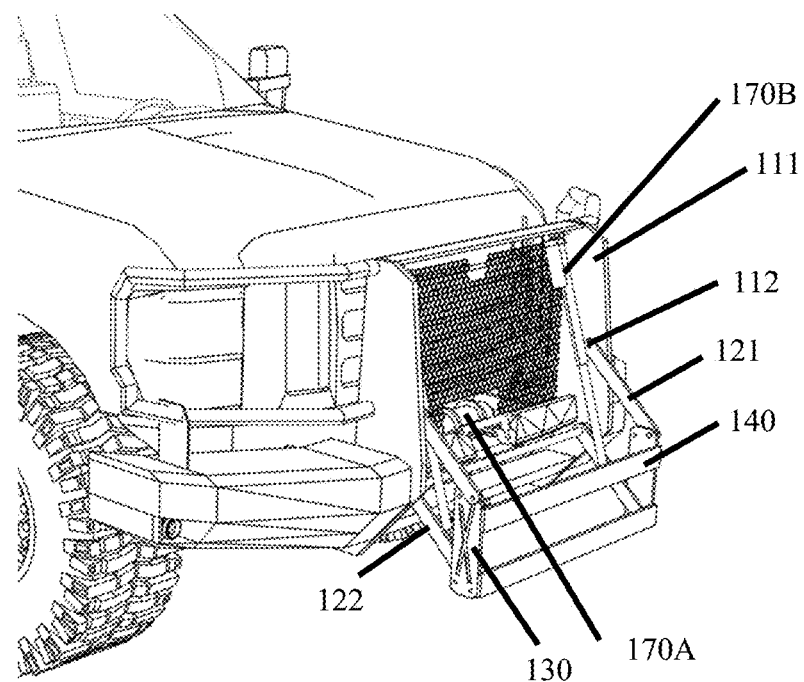
FIG. 11B shows an integrated modular brush guard and lift conversion system for mounting on an existing vehicle in accordance with an embodiment of the subject invention in perspective view. The lift is in a deployed position mounted on a truck.
Figure 11C:
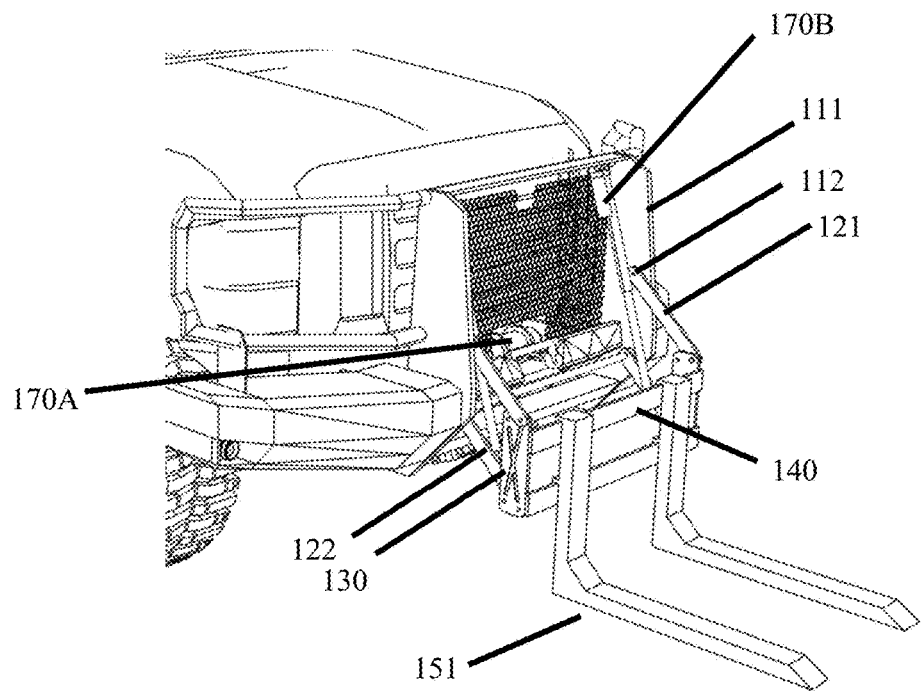
FIG. 11C shows an integrated modular brush guard and lift conversion system for mounting on an existing vehicle in accordance with an embodiment of the subject invention in perspective view. The lift is in a deployed position mounted on a truck with a modular forklift implement installed.
Figure 11D:
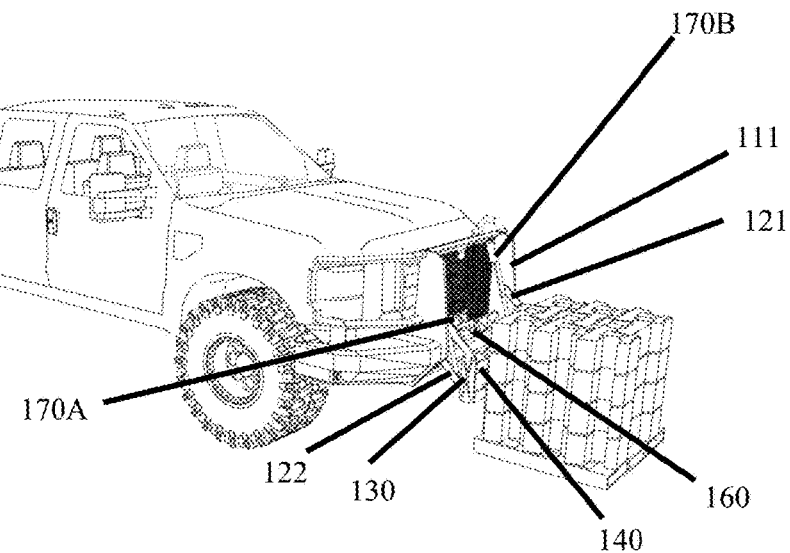
FIG. 11D shows an integrated modular brush guard and lift conversion system for mounting on an existing vehicle in accordance with an embodiment of the subject invention in perspective view. The lift is in a deployed position mounted on a truck with a modular forklift implement installed and engaged to lift and carry a loaded pallet.

FIGS. 11A through 11D show an independently powered (e.g., battery powered, or drawing electrical or other power from the vehicle without reliance on the vehicle winch); integrated modular brush guard and lift conversion system for mounting on an existing vehicle in accordance with an embodiment of the subject invention in perspective view. In FIG. 11A the lift is in a stowed configuration mounted on a truck having a vehicle winch. In FIG. 11B the lift is in a deployed position mounted on a truck. In FIG. 11C the lift is in a deployed position mounted on a truck with a modular forklift implement installed. In FIG. 11D the lift is in a deployed position mounted on a truck with a modular forklift implement installed and engaged to lift and carry a loaded pallet. In each of FIGS. 11A through 11D the vehicle winch is available for other uses while the lift is installed or in use. Alternatively, the lift is operable in the absence of a vehicle winch, or in the event of failure of a vehicle winch.

Embodiments may provide a lift comprising a lift winch separate from any vehicle winch. The linear actuators or lift winch may be powered by a battery, by electrical power from the vehicle, or by other means known in the art.

Figure 12A:
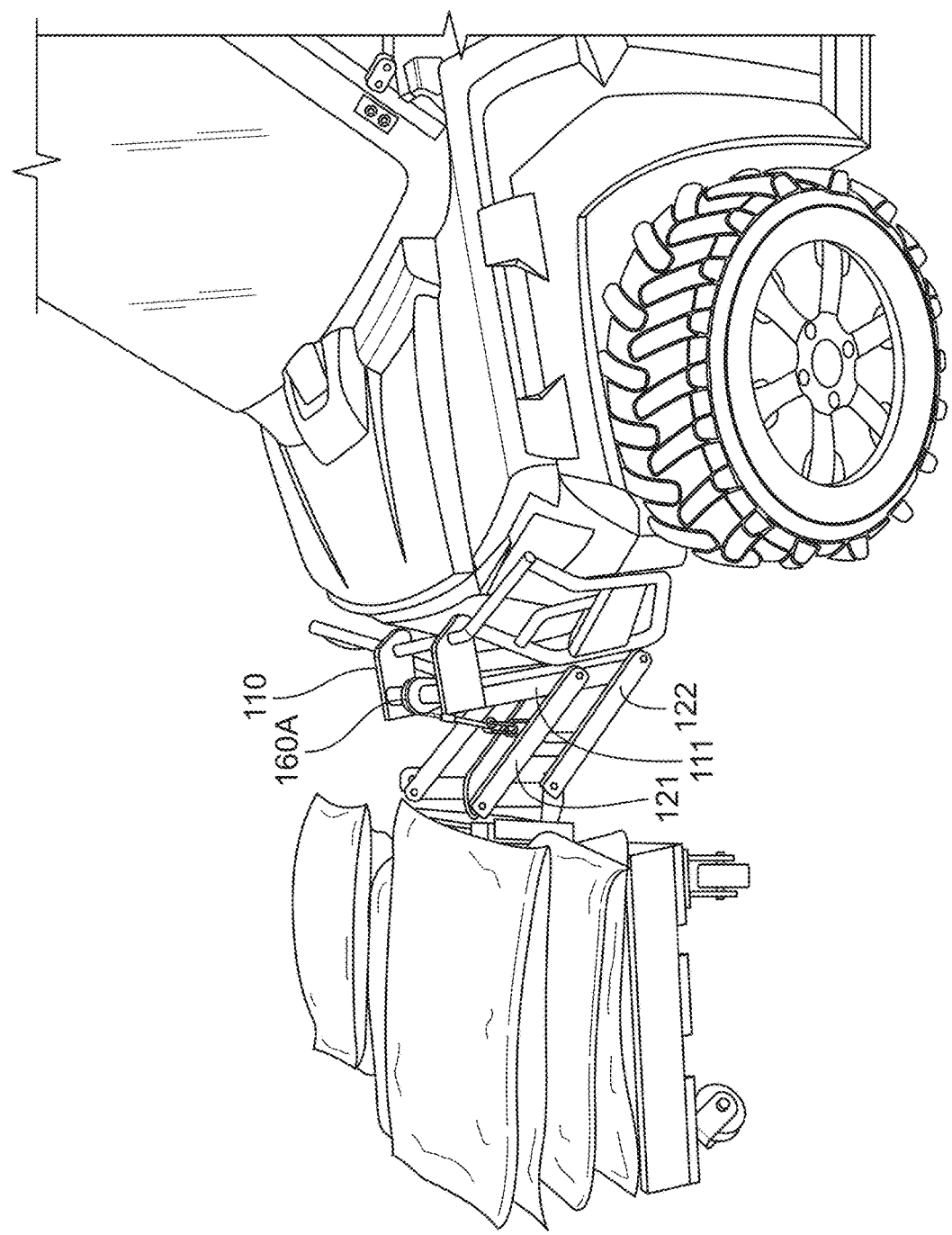
FIG. 12A shows the prototype lift of Example 1 in use carrying a load.

FIG. 12A shows the prototype lift of Example 1 in use carrying a load of topsoil on a pallet.

Figure 12B:
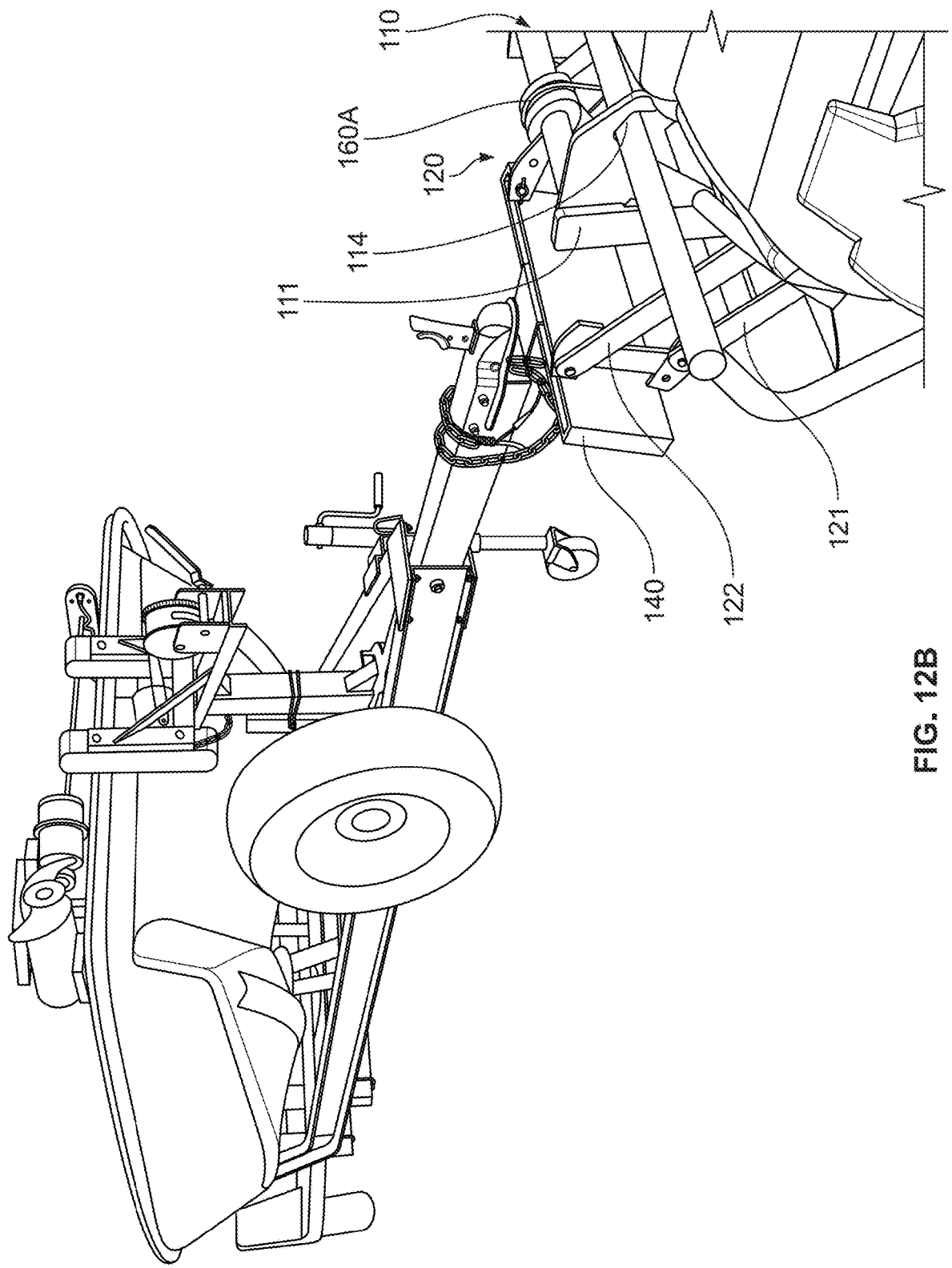
FIG. 12B shows the prototype lift of Example 1 in use moving a trailer.

FIG. 12B shows the prototype lift of Example 1 in use moving a boat trailer.

Figure 12C:
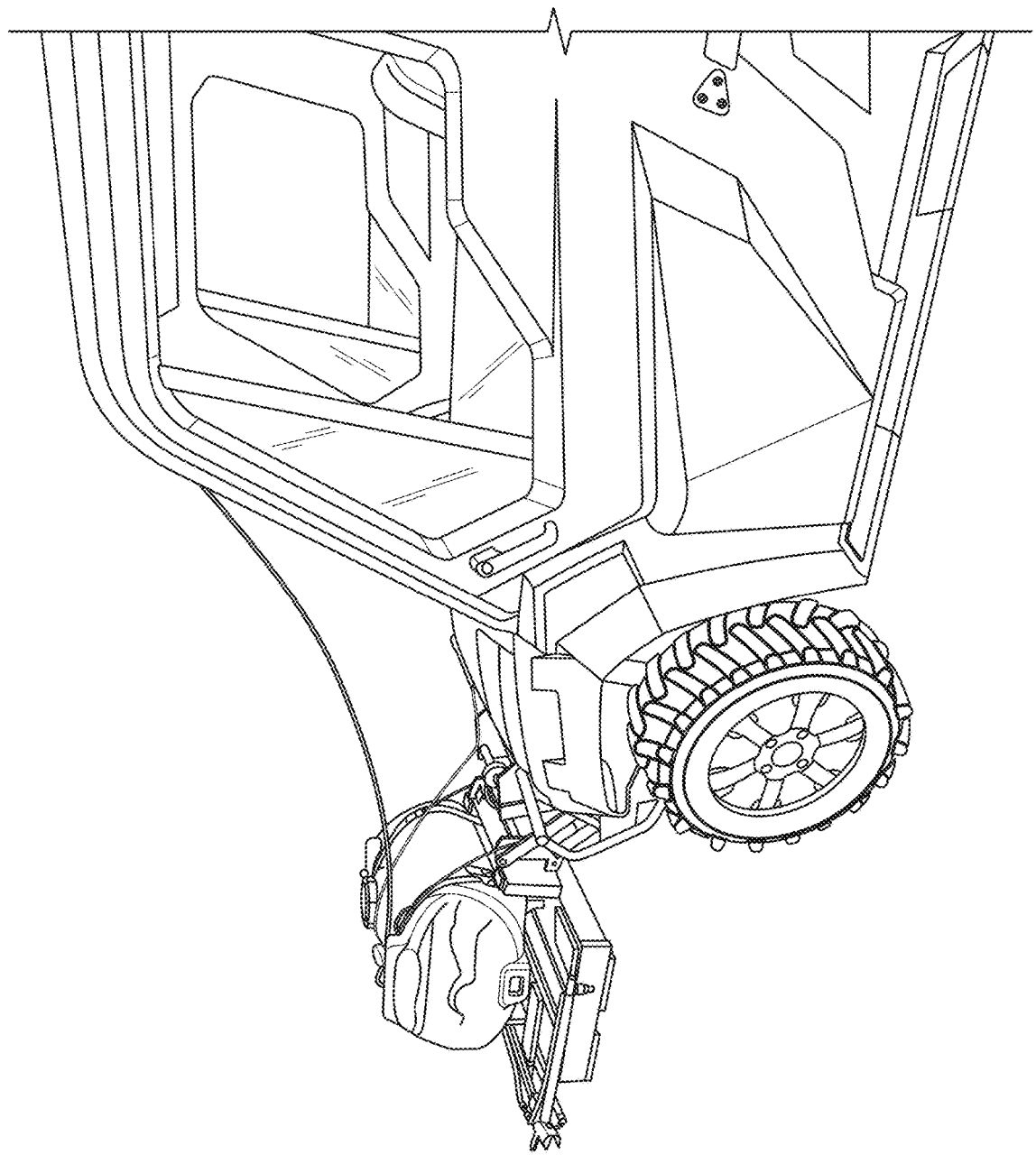
FIG. 12C shows the prototype lift of Example 1 in use carrying a load.

FIG. 12C shows the prototype lift of Example 1 in use carrying a chemical sprayer tank on a pallet.

Figure 12D:
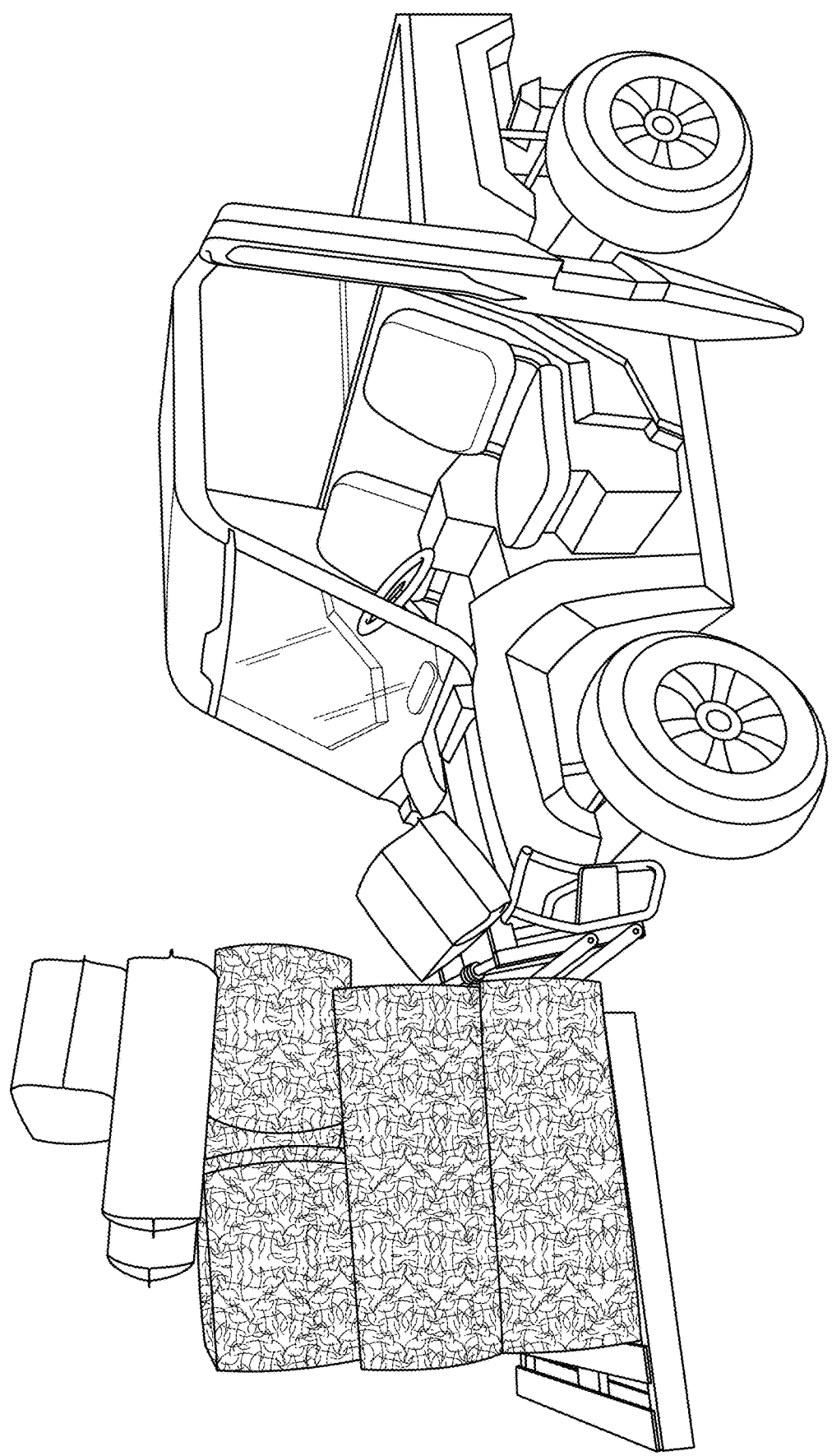
FIG. 12D shows the prototype lift of Example 1 in use carrying a load.

FIG. 12D shows the prototype lift of Example 1 in use carrying a load of hay bales on a pallet.

Figure 12E:
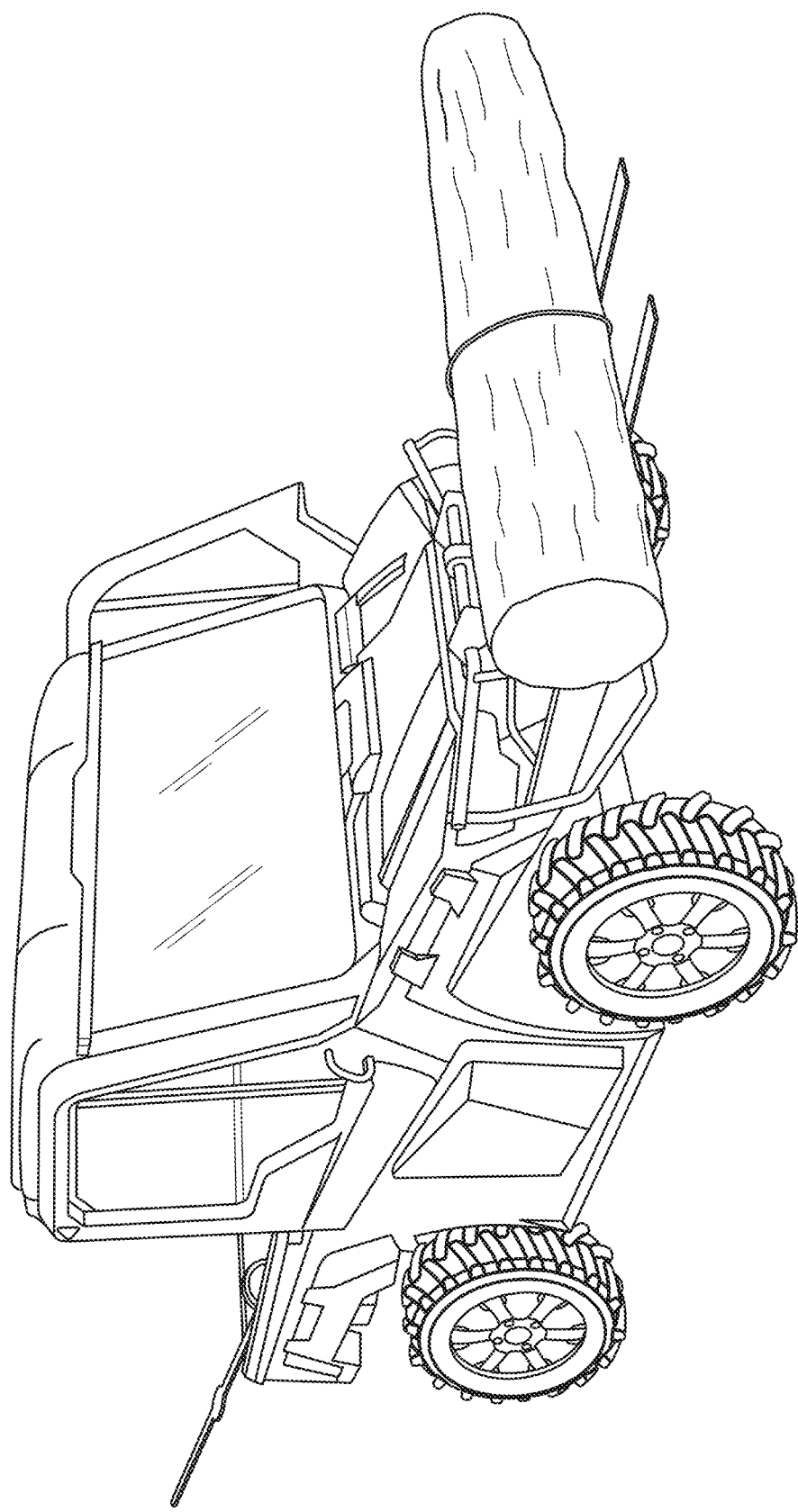
FIG. 12E shows the prototype lift of Example 1 in use carrying a load.

FIG. 12E shows the prototype lift of Example 1 in use carrying a portion of a downed tree.

Figure 12F:
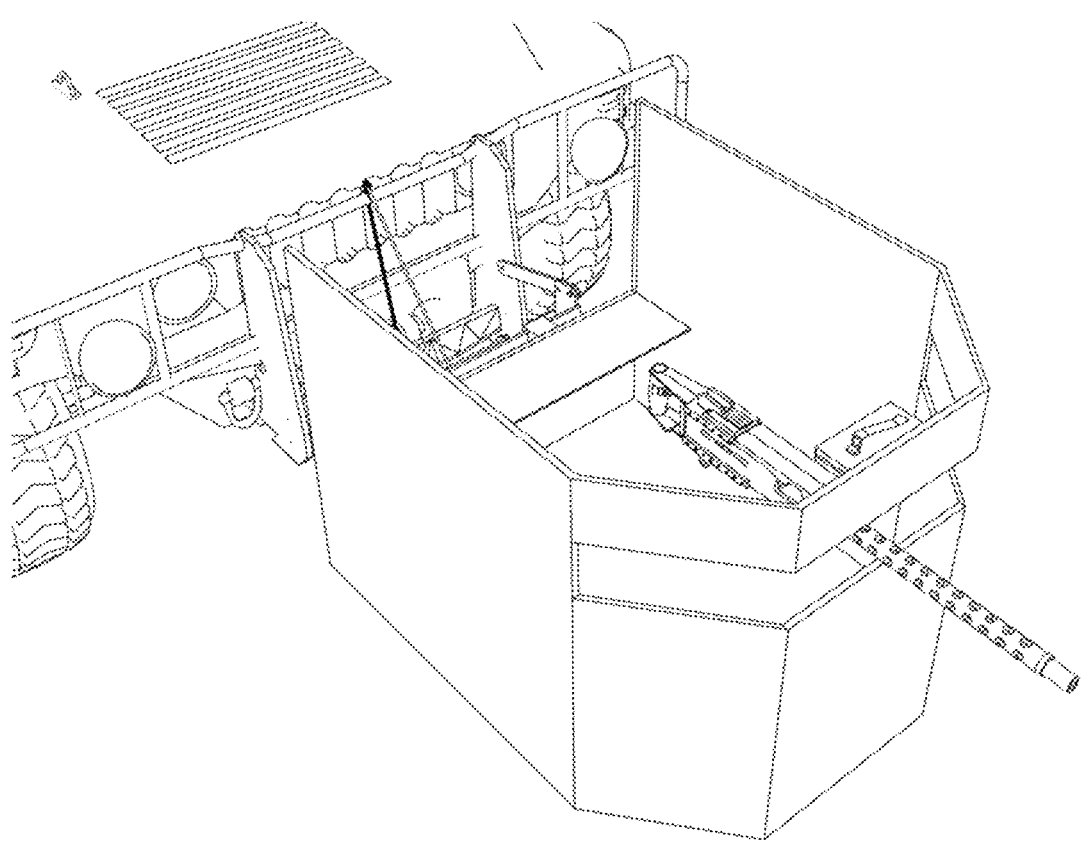
FIG. 12F shows an integrated modular brush guard and lift conversion system for mounting on an existing vehicle in accordance with an embodiment of the subject invention in perspective view. The lift is depicted in a lowered position with a modular armored manned turret military implement.

FIG. 12F shows an integrated modular brush guard and lift conversion system for mounting on an existing vehicle in accordance with an embodiment of the subject invention in perspective view. The lift is depicted in a lowered position with a modular armored manned turret military implement.

Figure 12G:
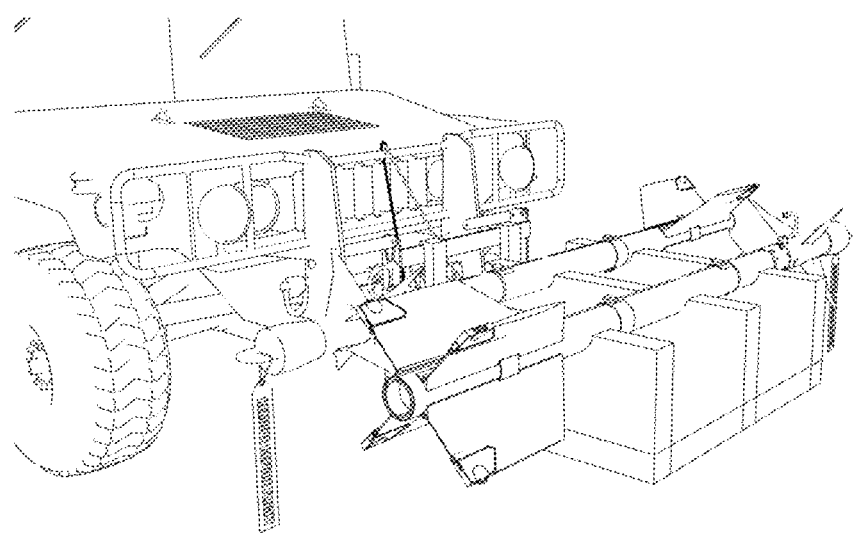
FIG. 12G shows an integrated modular brush guard and lift conversion system for mounting on an existing vehicle in accordance with an embodiment of the subject invention in perspective view. The lift is depicted in a lowered position with a modular cargo carrying military implement for transporting air to air missiles across the tarmac to a waiting aircraft.

FIG. 12G shows an integrated modular brush guard and lift conversion system for mounting on an existing vehicle in accordance with an embodiment of the subject invention in perspective view. The lift is depicted in a lowered position with a modular cargo carrying military implement for transporting air to air missiles across the tarmac to a waiting aircraft.

Figure 12H:
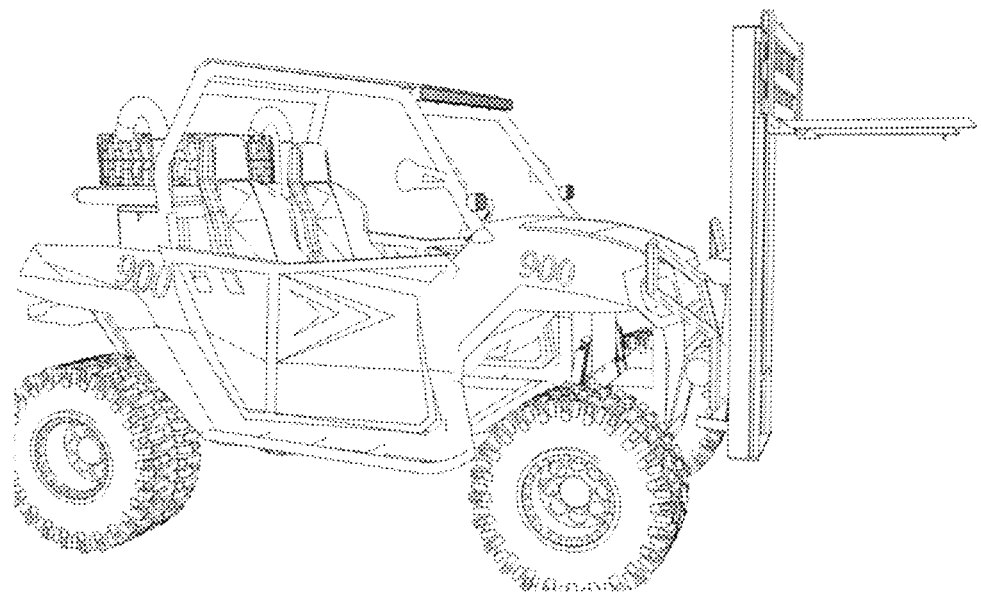
FIG. 12H shows a modular vertical slide lift conversion system for mounting on an existing vehicle rack or guard in accordance with an embodiment of the subject invention in perspective view. The lift is in a deployed position mounted on a vehicle with a modular forklift implement installed.

FIG. 12H shows a modular vertical slide lift conversion system for mounting on an existing vehicle rack or guard in accordance with an embodiment of the subject invention in perspective view. The lift is in a deployed position mounted on a vehicle with a modular forklift implement installed.

Figure 12I:
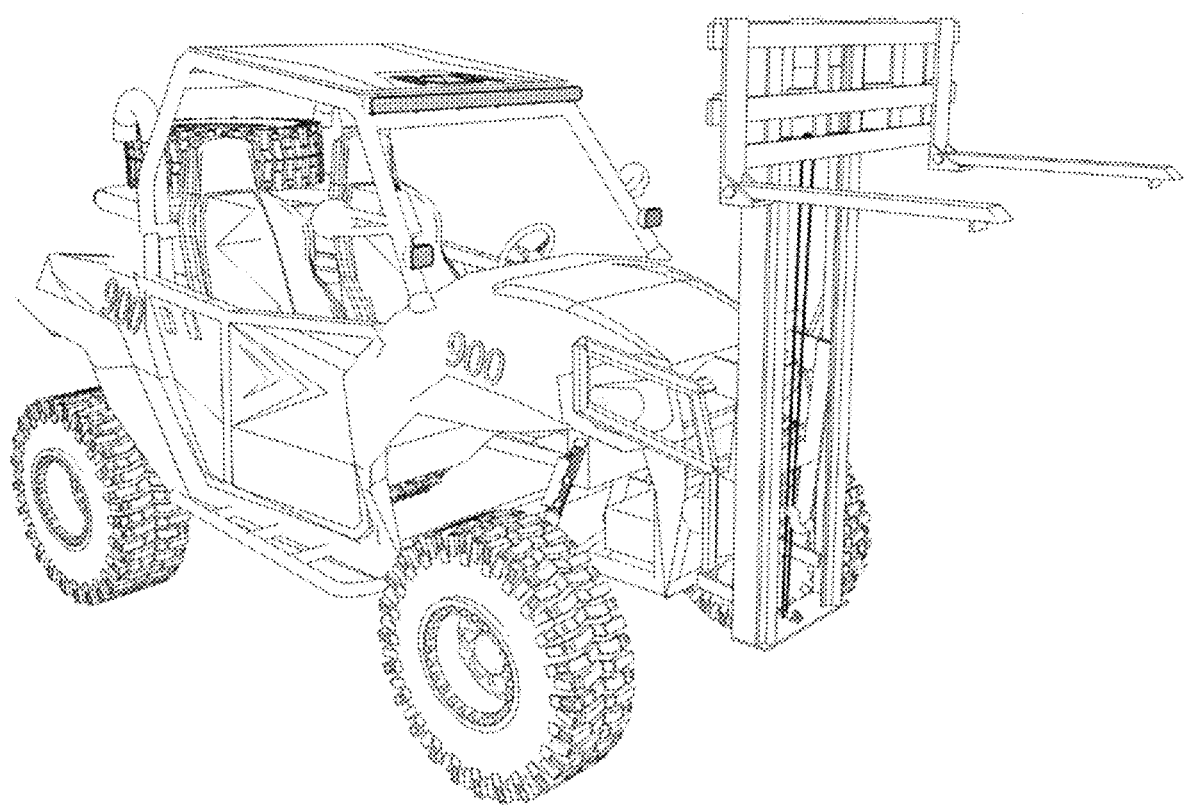
FIG. 12I shows a modular vertical slide lift conversion system for mounting on an existing vehicle rack or guard in accordance with an embodiment of the subject invention in perspective view. The lift is in a deployed position mounted on a vehicle with a modular forklift implement installed.

FIG. 12I shows a modular vertical slide lift conversion system for mounting on an existing vehicle rack or guard in accordance with an embodiment of the subject invention in perspective view. The lift is in a deployed position mounted on a vehicle with a modular forklift implement installed.

FIG. 13 shows two x-plate designs according to embodiments of the subject invention wherein the opposing x-plate mounting points (135A-135H) are laid in a circular pattern along smaller circle 133A such that the x-plate may have multiple opposing points of rotation allowing for angular adjustment of the modular implement base. Embodiments provide x-plate mounting points 135 that are holes, or alternatively slots, pins, pegs, protrusions, depressions, openings, bayonet mounts, or other means of connection known in the art. Embodiments provide x-plate mounting points that are opposing or non-opposing. The x-plate mounting point 135A is opposing 135B, x-plate mounting point 135C is opposing 135D, x-plate mounting point 135E is opposing 135F, x-plate mounting point 135G is opposing 135H. In this embodiment, pairs of opposing x-plate mounting points around small circle 133A may be selected to alter the angle of the x-plate 130 and modular implement base 140 when mounted to upper pivot arms 121 and lower pivot arms 122, while preserving the linkage ratios and angular motion characteristics of upper pivot arms 121 and lower pivot arms 122. Alternatively, embodiments may provide x-plate mounting points which are non-opposing (e.g., configured in an ellipse, line, irregular, or other non-circular pattern, or configured in multiple non-concentric circular or arcuate patterns, not shown) and which do alter the linkage ratios and angular motion characteristics of upper pivot arms 121 and lower pivot arms 122 when a new mounting configuration is chosen.

FIG. 14 shows a linchpin retainer 134 for securing the lift in a stowed configuration according to an embodiment of the subject invention. The retainer 134 passes through a vertical frame member 111 of the fixed frame 110 and x-plate 130 of the movable frame 120 to secure the lift in a stowed configuration within the confines of the fixed frame 110.

The subject invention may be understood in part by reference to certain exemplary and non-limiting embodiments, including the following examples.

Embodiment 1

A stowable, modular lift conversion system 100 configured for aftermarket application to a truck hitch receiver, all-terrain vehicle (ATV), or utility task vehicle (UTV), the system comprising:
  a fixed frame 110 configured to mount to the vehicle, the fixed frame comprising:
    an opposing pair of vertical frame members 111 having a frame height H and a frame depth D, separated by a frame width W, wherein the frame height, the frame depth, and the frame width define the confines of the fixed frame; the frame height H optionally being between 16.75 and 28.75 inches, the frame width W optionally being between 10 and 22 inches, and the frame depth D optionally being between 6 and 14 inches,
    an upper pivot point 112 on each of the vertical frame members, and
    a lower pivot point 112 on each of the vertical frame members; and
  a movable frame 120 configured to lift loads and movable from a stowed configuration to an extended or deployed configuration, the movable frame comprising:
    an opposing pair of upper pivot arms 121, each having a near end 121A respectively connected to one of the upper pivot points, and a far end 121B opposite the near end,
    an opposing pair of lower pivot arms 122, each having a near end 122A respectively connected to one of the lower pivot points, and a far end 122B opposite the near end,
    an opposing pair of x-plates 130, each connected to the far end of one of the upper pivot arms, and to the far end of one of the lower pivot arms, and
    a modular implement base 140 connecting the opposing pair of x-plates;
  wherein the movable frame is configured to fit within the confines of the fixed frame when in a stowed configuration.

In this and other embodiments, the frame height H may be greater than both the fame width W and the frame depth D. The frame width may be greater than the frame depth. The frame height may be about 1.5 times the frame width, alternatively about 1.25, 1.75, 2.0, 2.5, 3, 4, 5, or 10 times the frame width, including ranges, increments, and combinations thereof (e.g., the frame height may be between about 1.5 and 2.0 times the frame width, e.g., for application to a vehicle which is either tall or narrow or both, such as an off-road UTV or ATV.) The frame height may be about 3 times the frame depth, alternatively about 2.0, 2.5, 3.5, 4, 5, 6, 7, 8, 9, 10, 15, or 20 times the frame depth, including ranges, increments, and combinations thereof (e.g., the frame height may be between about 2.5 and 3.5 times the frame depth.) The frame width may be about 2 times the frame depth, alternatively about 1.0, 1.5, 2.5, 3.5, 4, 5, 6, 7, 8, 9, 10, 15, or 20 times the frame depth, including ranges, increments, and combinations thereof (e.g., the frame width may be between about 1.5 and 2.5 times the frame depth.)

In this and other embodiments, the frame width W may be greater than both the fame height H and the frame depth D. The frame height may be greater than the frame depth. The frame width may be about 1.5 times the frame height, alternatively about 1.25, 1.75, 2.0, 2.5, 3, 4, 5, or 10 times the frame height, including ranges, increments, and combinations thereof (e.g., the frame width may be between about 1.5 and 2.0 times the frame height, e.g., for application to a vehicle which is either low or wide or both, such as a small-wheeled truck or car.)

The specification of frame height H, frame width W, and frame depth D, either independently or in concert may advantageously be chosen to provide maximum lifting power, lifting range, speed of motion, or security of the lift assembly when installed. Of particular advantage in certain embodiments may be the ratios providing a large height in comparison to the width or depth, that takes advantage of the unique design of the subject invention to provide a large lifting range in a compact space (e.g., a relatively smaller frame width or frame depth for a relatively larger frame height; e.g., a frame height about 1, 1.25, 1.5, 1.75, 2, 2.5, 3, 3.5, 4, 4.5, 5 times the frame width including ranges, increments, and combinations thereof or about 2, 3, 4, 5, 6, 7, 8, 9, or 10 times the fame depth including ranges, increments, and combinations thereof; e.g., a frame height between 2.4 to 4.6 times the frame width and also about 3.5 to 5.8 times the frame depth), while maintaining modularity and adaptability of the design (e.g., providing the above ratios together with an x-plate, and modular hook mounting feature, a four bar linkage system, or a vertical or near vertical frame member to provide a compact, modular, stowable lift that fits on the available depth and width of a vehicle grill or frame to provide desirable lift, security and ground clearance in operation).

Embodiment 2

The system according to embodiment 1, wherein each vertical frame member 111 and x-plate 130, respectively, operates in a unique vertical plane across the frame width W, such that each of the x-plates 130 may overlap each other and overlap each of the vertical frame members 111 to fit within the confines of the fixed frame 110 when in a stowed configuration. Embodiments may provide spacers, bushings, washers, bearings, bosses or other design elements known in the art to ensure proper spacing and support of frame members and lift components together with lateral alignment and rigidity required in a lift in accordance with the subject invention. For example, upper pivot arms 121 or lower pivot arms 122 may be on opposite sides of a vertical frame member 111 and x-plate 130. The arms, frame member, and x-plate may each operate in a unique vertical plane, or the frame member and x-plate may share a vertical plane of operation while the arms each operate in a separate plane. Embodiments may provide cut-outs or clearance features (e.g., allowing an x-plate to fit into a cut-out or recess of a vertical frame member operating in the same vertical plane). Embodiments may also provide, together or in the alternative, limited vertical height of elements operating in the same or different vertical planes (e.g., allowing an x-plate to extend above the top of a vertical frame member operating in the same vertical plane). Embodiments may also provide two or more elements (e.g., two or more of an upper pivot arm 121 or a lower pivot arm 122) operating in the same vertical plane, but configured for sufficient clearance to fit within the confines of the fixed frame 110 when in a stowed configuration. By way of non-limiting example, a lower pivot arm 122 could rest in front of, adjacent, or touching an upper pivot arm 121 or upper pivot point 112 when in a stowed configuration. Alternatively, a first portion of a lower pivot arm 122 could rest in front of, adjacent, or touching a first portion of a lower pivot arm 121 or upper pivot point 112, while a second portion of the lower pivot arm 122 could overlap, clear, or pass adjacent to a second portion of the lower pivot arm 121 or upper pivot point 112, when in a stowed configuration. Embodiments may provide one or more notches, slots, holes, concavities, curvatures, to allow two elements to fit more closely together. Embodiments may provide one or more spacers, bosses, washers, bushings, or bearings to align members in specific vertical planes in operation or when in a stowed configuration.

Embodiment 3

The system according to embodiment 2, wherein the opposing pair of vertical frame members 111, the opposing pair of upper pivot arms 121, the opposing pair of lower pivot arms 122, and the opposing pair of x-plates 130 form an opposing pair of four-bar linkages configured to maintain a consistent angle between the vertical frame members 111 and the x-plates 130. Embodiments may provide parallel four-bar linkages, non-parallel four-bar linkages, adjustable four bar linkages, pivots, lever arms, and other linkages that are not four-bar linkages.

Embodiment 4

The system according to embodiment 3, comprising at least one modular implement (151, 152, 153) configured to mount on the modular implement base 140, wherein the implement is not removable from the modular implement base 140 when in a stowed configuration. Embodiments may provide features preventing or deterring theft or accidental loss or removal of implements when in a stowed configuration or during operation (e.g., a frame member or protrusion blocking the exit path of an implement).

Embodiments provide a securing element to prevent or inhibit removal of implements. For example, an upper frame member 116 or vertical frame member 111 may be configured to be in proximity to and blocking the removal of an implement 151, 152, 153 when in a stowed configuration. Alternatively, a protrusion, a tab, or a key may engage with or inhibit motion of an implement in a given configuration (e.g., in a stowed configuration.) By way of non-limiting example, an upper frame member 116 may be located vertically above a modular implement base 140 when in a stowed configuration, thus blocking removal of an implement (e.g., 151, 152, 153) and providing benefits including security during transport or theft deterrence during storage.

Embodiment 5

The system according to embodiment 3, the fixed frame comprising a hook 114 configured to drop down onto the vehicle from above and inhibit motion of the fixed frame in more than one direction, and a support surface 115 configured to support the frame against rotation. Embodiments may provide a full round, oval, polygonal, square, or angled notch or slot, alternatively two or more flat or curved surfaces, alternatively one or more frame members that inhibit motion of the frame in one or more directions and a second body, face, or surface that inhibits motion of the frame in another direction.

Embodiment 6

The system according to embodiment 5, the system comprising at least two cable interface points (160A, 160B) configured to simultaneously generate a downward force on the fixed frame 110 and an upward force on the movable frame 120 when tension is applied to a cable 171 originating from the vehicle and routed in contact with the two cable interface points. Embodiments may provide cable interface points configured to produce a force pulling the lift into contact with the vehicle when tension is applied to the cable.

Embodiment 7

The system according to embodiment 6, the two cable interface points (160A, 160B) comprising at least one of a pulley, a pin, a sliding support, an eyelet, a hook, or a clamp. Embodiments may comprise one movable interface point (e.g., a slider or roller) and one fixed interface point (e.g., an eyelet, hook, or clamp).

Embodiment 8

The system according to embodiment 3, the fixed frame 110 configured to mount permanently to the vehicle by means of being integrated into a brush guard permanently mounted to the frame of the vehicle by means of bolts, rivets, clamps, or welding. Embodiments may provide a lift with a fixed frame configured to mount to existing holes or structures of the vehicle frame.

Embodiment 9

The system according to embodiment 8, comprising a cable winch 170A configured to generate motion of the movable frame 120 with respect to the fixed frame 110. Embodiments may provide a cable winch mounted on the fixed frame with a cable attachment point 160B on the movable frame 120, and optionally a cable slide or pivot 160A mounted on either the fixed frame 110 or the movable frame 120.

Embodiment 10

The system according to embodiment 3, comprising one or more linear actuators 170B configured to generate motion of the movable frame 120 with respect to the fixed frame 110. Embodiments may provide electrically powered linear actuators mounted to the fixed frame with a movable end attached to the movable frame.

Embodiment 11

A stowable, modular implement lift system 100 configured for aftermarket application to an existing utility vehicle having an existing rack, guard, or bumper, the lift system comprising:
  a vertical hook 114 configured to allow installation of the lift system onto the existing rack, guard, or bumper in a vertical direction, and inhibit motion of the lift system in a non-vertical direction;
  a frame member 111 configured to engage an outward surface of the existing rack, guard, or bumper in rotational opposition to the vertical hook such that the lift system is aligned in a vertical or near-vertical orientation when installed;
  an upper pivot point 112 on the frame member;
  a lower pivot point 113 on the frame member;
  an upper arm 121 rotatably connected to the upper pivot point;
  a lower arm 122 rotatably connected to the lower pivot point;
  an x-plate 130 movable from a stowed configuration to an extended position, the x-plate comprising an adjustable upper pivot point 131, an adjustable lower pivot point 132, and a modular implement base 140; and
  at least one modular implement (151, 152, 153) configured to allow installation on the modular implement base 140;
  wherein the x-plate 130 is configured to allow adjustment of the modular implement base 140 to align vertically when the lift system is installed on the vehicle.

Embodiment 12

The system according to embodiment 11, at least one of the adjustable upper pivot point 131 or the adjustable lower pivot point 132 comprising a plurality of attachment points selectable to rotatably connect the x-plate 130 to either the upper pivot arm 121 or the lower pivot arm 122 while adjusting an angle of alignment between the x-plate 130 and the frame member 111. The x-plate and respective frame members are affixed to one another by way of a nut and bolt, spring clip, retaining ring, clevis pin, or any other similar device that attaches said frame members to the x-plate but still allows for rotation during raising or lowering.

Embodiment 13

The system according to embodiment 12, wherein each of the frame member 111 and the x-plate 130, respectively, operates in a unique vertical plane across a width of the lift system, such that the x-plate 130 overlaps the frame member 111 at one or more points in operation of the lift system.

It is contemplated that overlap may include fully or partially overlapping components, that the amount or condition of overlap may change within a configuration or when moving between configurations, and that two components may operate in a unique vertical plane with respect to each other in a case where a portion of a first component overlaps with a second component but another portion of the first component extends into or crosses the vertical plane of the second component. (e.g., one flange of an angle-iron, "L" or "T" cross-section member may operate in a unique vertical plane across the width of the lift system, even though the angled, bent, or flanged portion of the same member does not. In this manner, a first member may overlap a second member in part and operate in a unique vertical plane across a width of the lift system while partially overlapping and while having a portion which extends across or into the unique vertical plane of the second member, either with or without a corresponding or mating notch, cutout, hole, concavity, or opening in the second member. Alternatively, a tab or flange may be extruded, bent, formed, welded, bolted, or riveted in place to form a stop or catch which prevents overlap or limits travel between two components beyond a specified point but still operates in a unique vertical plane across a width of the lift system, overlaps, and (e.g., in the case of a member of the movable frame 120) fits within the confines of the fixed frame 110 when in a stowed configuration.

Embodiment 14

The system according to embodiment 13, further comprising an actuator (170A or 170B) configured to generate motion of the x-plate 130 with respect to the frame member 111.

Embodiment 15

The system according to embodiment 14, the actuator comprising a winch cable (171A) originating from a winch 170A on the vehicle.

Embodiment 16

The system according to embodiment 14, the actuator comprising a winch cable (171A) originating from a winch 170A mounted to the frame member.

Embodiment 17

The system according to embodiment 14, the actuator comprising a linear actuator 170B.

Embodiment 18

The system according to embodiment 14, comprising at least one modular implement 151, 152, 153 configured to mount on the modular implement base 140, wherein the implement 151, 152, 153 is not removable from the modular implement base 140 when in a stowed configuration.

Embodiment 19

A stowable, modular lift conversion system 100 configured for aftermarket application to a truck, all-terrain vehicle (ATV), or utility task vehicle (UTV), the system comprising:
   a fixed frame 110 configured to mount to the vehicle, the fixed frame comprising:
      an opposing pair of vertical frame members 111 having a frame height H and a frame depth D, separated by a frame width W, wherein the frame height, the frame depth, and the frame width define the confines of the fixed frame 110, and
      an upper pivot point 112 on each of the vertical frame members 111, and
      a lower pivot point 113 on each of the vertical frame members 111; and
   a movable frame 120 configured to lift loads, and movable from a stowed configuration to an extended position, the movable frame comprising:
      an opposing pair of upper pivot arms 121, each having a near end 121A respectively connected to one of the upper pivot points 112, and a far end 121B opposite the near end 121A,
      an opposing pair of lower pivot arms 122, each having a near end 122A respectively connected to one of the lower pivot points 113, and a far end 122B opposite the near end 122A,
      an opposing pair of x-plates 130, each connected to the far end 121B of one of the upper pivot arms 121, and to the far end 122B of one of the lower pivot arms 122, and a modular implement base 140 connecting the opposing pair of x-plates 130;
   wherein the movable frame 120 is configured to fit within the confines of the fixed frame 110 when in the stowed configuration;
   wherein each vertical frame member 111 and x-plate 130, respectively, operates in a unique vertical plane across the frame width W, such that the x-plates 130 may overlap each other and overlap each of the vertical frame members 111 to fit within the confines of the fixed frame 110 when in the stowed configuration;
   wherein the opposing pair of vertical frame members, the opposing pair of upper pivot arms, the opposing pair of lower pivot arms, and the opposing pair of x-plates form an opposing pair of four-bar linkages configured to maintain a consistent angle between the vertical frame members and the x-plates;
   wherein the system further comprises at least one modular implement 151, 152, 153 configured to mount on the modular implement base 140, wherein the implement 151, 152, 153 is not removable from the modular implement base 140 when in a stowed configuration;
   wherein the fixed frame 110 further comprises a hook 114 configured to drop down onto the vehicle from above and inhibit motion of the fixed frame 110 in more than one direction when installed, and a support surface 115 configured to support the fixed frame 110 against rotation;
   wherein the system further comprises at least two cable interface points 160A, 160B configured to simultaneously generate a downward force on the fixed frame 110 and an upward force on the movable frame 120 when tension is applied to a cable 171A originating from the vehicle and routed in contact with the two cable interface points 160A, 160B; and
   wherein the two cable interface points 160A, 160B further comprise at least one of a pulley, a pin, a sliding support, an eyelet, a hook, or a clamp.

Embodiment 20

The system according to embodiment 19, each of the x-plates 130 comprising an adjustable upper pivot point 131 and an adjustable lower pivot point 132, for connecting to the far end of one of the upper pivot arms 121, and to the far end of one of the lower pivot arms 122, respectively;
   wherein each of the x-plates 130 is configured to allow adjustment of the modular implement base 140 to align vertically when the lift system is installed on the vehicle;
   wherein at least one of the adjustable upper pivot point 112 or the adjustable lower pivot point 113 on each of the x-plates 130 comprises a plurality of attachment points selectable to rotatably connect the x-plate 130 to the far end 121B of one of the upper pivot arms 121, or to the far end 122B of one of the lower pivot arms 122, respectively, while adjusting an angle of alignment between the x-plate 130 and the fixed frame 110; and
   wherein the system further comprises an actuator configured to generate motion of the x-plate with respect to the frame member, the actuator comprising a winch cable 171A originating from a winch 170A on the vehicle.

Embodiment 21

A passive lift conversion system (200) configured for aftermarket application to a vehicle, the system comprising:
   a fixed frame 210 configured to mount to the vehicle, the fixed frame comprising:
      an opposing pair of vertical frame members 211, and
      an opposing pair of vertical guiderail 212 each attached to one of the vertical frame members, respectively; and
   a movable frame 220 configured to lift loads, and movable from a stowed configuration to an extended position, the movable frame comprising:
      an opposing pair of rail followers 221, each movably connected to one of the respective vertical guiderails, and
      a modular implement base 140 connecting the opposing pair of rail followers; and
   at least two cable interface points (160A, 160B) configured to simultaneously generate a downward force on the fixed frame and an upward force on the movable frame when tension is applied to a cable originating from the vehicle and routed in contact with the two cable interface points.

Embodiment 22

The system according to embodiment 21, the two cable interface points comprising at least one of a pulley, a pin, a sliding support, an eyelet, a hook, or a clamp.

Embodiment 23

The system according to embodiment 22, the two cable interface points comprising a roller bar 160A and an attachment point 160B.

Embodiment 24

The system according to embodiment 23, comprising at least one modular implement (151, 152, 153) configured to mount on the modular implement base.

Embodiment 25

The system according to embodiment 23, the fixed frame comprising a hook 114 configured to drop down onto the vehicle from above and inhibit motion of the fixed frame 110 in more than one direction when installed, and a support surface configured to support the frame against rotation.

Embodiment 26

A lift conversion system configured to affix on a brush guard, bumper, or frame of an all-terrain or utility-task vehicle, the system comprising:
- a hook 114 having a vertical entrance located a distance away from the center of mass of the system, configured to drop down onto the vehicle vertically;
- a vertical support surface 115 located between the hook and the center of mass of the system, configured to hang in place on the vehicle at a vertical or nearly vertical angle when the system is installed on the vehicle;
- a vertical guiderail 212 supported by an interaction of the hook and the support surface against the brush guard, bumper, or frame of the vehicle;
- a modular implement base 140 slidably mounted on the vertical guiderail; and
- at least two cable interface points (160A, 160B) configured to simultaneously generate an additional downward force on the fixed frame and an upward force on the modular implement base when tension is applied to a cable originating from the vehicle and routed in contact with the two cable interface points.

Embodiment 27

The system according to embodiment 26, the at least two cable interface points comprising at least one roller bar 160A and at least one attachment point 160B. Wherein the roller bar may comprise a pulley or pulley bar having one or more sidewalls, guides, or depressions configured to guide or align the cable.

Embodiment 28

The system according to embodiment 27, the at least one attachment point 160B attached to the modular implement base.

Embodiment 29

A lift conversion system (200) configured to affix on a brush guard, bumper, or frame of an all-terrain or utility-task vehicle, the system comprising:
- a hook 114 having a vertical entrance located a distance away from the center of mass of the system, configured to drop down onto the vehicle vertically;
- a vertical support surface 115 located between the hook and the center of mass of the system, configured hang in place on the vehicle at a vertical or nearly vertical angle when the system is installed on the vehicle;
- a vertical guiderail 212 supported by an interaction of the hook and the support surface against the brush guard, bumper, or frame of the vehicle;
- a modular implement base 140 slidably mounted on the vertical guiderail; and
- a linear actuator 170B configured to move the modular implement base along the vertical guiderail when supplied with power from a remote source.

Embodiment 30

The system according to embodiment 29, wherein the linear actuator is configured to receive power from a rotary hand tool, a manual crank arm, or a cordless power tool battery.

Embodiment 31

The system according to embodiment 30, wherein the linear actuator is configured to receive mechanical power from a rotary hand tool.

Embodiment 32

The system according to embodiment 30, wherein the linear actuator is configured to receive electrical power from a cordless hand tool battery 320.

Embodiment 33

The system according to embodiment 29, wherein the linear actuator is configured to move the modular implement base directly. (not shown)

Embodiment 34

The system according to embodiment 29, wherein the linear actuator is configured to move the modular implement base indirectly. (see, e.g., FIG. 4B)

Embodiment 35

The system according to embodiment 29, wherein the linear actuator is configured to move the modular implement base indirectly by acting on a cable, the cable connected at a first end to an attachment point attached to either the vehicle or the system, the cable connected at a second end to an attachment point attached to the modular implement base. (see, e.g., FIG. 4A)

Embodiment 36

The system according to embodiment 29, wherein the linear actuator is configured to move the modular implement base two inches for every one inch or extension of the linear actuator. (see, e.g., FIG. 4A)

All patents, patent applications, provisional applications, and publications referred to or cited herein are incorporated by reference in their entirety, including all figures and tables, to the extent they are not inconsistent with the explicit teachings of this specification.

Following are examples that illustrate procedures for practicing the invention. These examples should not be construed as limiting.

Example 1

A prototype of the modular lift conversion system 100 was constructed using ⅜" thick steel for all flat members, a 2" diameter steel bar and two pulleys for the cable interface points (160A, 160B), and ⅜" thick steel for the modular implement base 140, and ⅜" thick steel for one implement 151 (forks for lifting). Welds were used to assemble the frame (111, 112, 113, 114, and 115). Welds were also used to affix the cable interface points (160A, 160B) supporting bars to the frame. Welds were also used to affix the x-plates 130 to the implement bars of the modular implement base 140. 7/16" diameter Clevis pins were used to affix the upper pivot arms 121 and lower pivot arms 122 to the frame on the near end 121A, and to the x-plates on the far end 121B.

This unit has been deployed on a 2021 Arctic Cat Prowler Pro UTV. (Arctic Cat, Inc., Plymouth, Minn.; marketed and sold by Bass Pro Shops as a Tracker 800SX LE); then lifted off and deployed on a 2019 Mahindra Retriever 700 (Mahindra USA, Inc., Houston, Tex.). Each unit utilized a 4,000-pound pull winch (Warn Industries, Inc., Clackamas, Oreg.) This unit has been used with a modular fork implement 151 deployed to pick up pallets of material (including 350 pounds of topsoil pictured in FIG. 12A.)

When deployed with the trailer ball implement 152, this unit has been used to lift the tongue and move the following trailers:

| Trailer | Weight |
| --- | --- |
| Two Horse Trailer | 3,000 pounds |
| Utility Trailer | 750 pounds |
| Boat Trailer With 24-foot Boat | 4,500 pounds |

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

I claim:

1. A stowable, modular lift conversion system (100) configured for application to a truck, all-terrain vehicle, or utility task vehicle, the system comprising:
    a fixed frame (110) configured to mount to the truck, all-terrain vehicle, or utility task vehicle and having a frame height (H) and a frame depth (D), separated by a frame width (W), wherein the frame height, the frame depth, and the frame width define confines of the fixed frame, the fixed frame comprising:
    an opposing pair of vertical frame members (111),
    an upper pivot point (112) on each of the vertical frame members (111), and
    a lower pivot point (113) on each of the vertical frame members (111); and
    a movable frame (120) configured to lift loads and movable from a stowed configuration to an extended position, the movable frame comprising:
    an opposing pair of upper pivot arms (121), each having a near end (121A) respectively connected to one of the upper pivot points (112), and a far end (121B) opposite the near end,
    an opposing pair of lower pivot arms (122), each having a near end (122A) respectively connected to one of the lower pivot points (113), and a far end (122B) opposite the near end, and
    an opposing pair of adaptive alignment plates (130), each connected to the far end (121B) of one of the upper pivot arms (121), and to the far end (122B) of one of the lower pivot arms (122);
    a modular implement base (140) connecting the opposing pair of adaptive alignment plates (130), the modular implement base (140) configured such that a multiplicity of modular implements (151), (152), (153) can be attached or detached to and from the modular implement base when the movable frame is in the extended position;
    wherein the opposing pair of adaptive alignment plates (130) is configured to fit within the confines of the fixed frame (110) when the movable frame is in the stowed configuration; and
    wherein each vertical frame member (111) and adaptive alignment plate (130), respectively, operates in a unique vertical plane across the frame width (W), such that each of the adaptive alignment plates (130) respectively overlaps the other of the adaptive alignment plates (130) and overlaps each of the vertical frame members (111) and is positioned adjacent to an outer edge of the fixed frame across the frame width (W), to fit within the confines of the fixed frame (110) when the movable frame is in the stowed configuration.

2. The system according to claim 1, wherein the opposing pair of vertical frame members (111), the opposing pair of upper pivot arms (121), the opposing pair of lower pivot arms (122), and the opposing pair of adaptive alignment plates (130) form an opposing pair of four-bar linkages configured to maintain a consistent angle between the vertical frame members (111) and the adaptive alignment plates (130).

3. The system according to claim 2, wherein at least one of the modular implements (151), (152), or (153) is not removable from the modular implement base (140) when the movable frame is in the stowed configuration, but is removable from the modular implement base (140) when the movable frame is in the extended position.

4. The system according to claim 2, wherein the fixed frame comprises a hook (114) configured to drop down onto the truck, all-terrain vehicle, or utility task vehicle from above and inhibit motion of the fixed frame (110) in more than one direction, and a support surface (115) configured to support the frame against rotation; wherein at least one frame member of the opposing pair of vertical frame members (111) connects at least one upper pivot point (112), at least one lower pivot point (113), the hook (114), and the support surface (115).

5. The system according to claim 4, comprising at least two cable interface points (160A), (160B) configured to simultaneously generate a downward force on the fixed frame and an upward force on the movable frame when tension is applied to a cable (171) originating from the truck, all-terrain vehicle, or utility task vehicle and routed in contact with the two cable interface points.

6. The system according to claim 5, wherein the two cable interface points (160A), (160B) comprise a roller (160A), and an attachment point (160B) both operating in a vertical plane centered across the frame width (W) and aligned with a center of mass of the system; the attachment point (160B) configured to detachably receive a winch hook at a first end of the cable.

7. The system according to claim 2, wherein the fixed frame (110) is configured to mount permanently to the truck, all-terrain vehicle, or utility task vehicle.

8. The system according to claim 7, comprising a cable winch (170A) configured to generate motion of the movable frame (120) with respect to the fixed frame (110) by applying tension to a cable routed in contact with a roller (160A), and an attachment point (160B) both operating in a vertical plane centered across the frame width (W) and aligned with a center of mass of the system; and a winch hook at a first end of the cable configured to detachably receive the attachment point (160B).

9. The system according to claim 2, comprising a linear actuator (170B) configured to receive power from a cordless hand tool battery (320), and configured to generate motion of the movable frame (120) with respect to the fixed frame (110).

10. A stowable, modular implement lift system (100) configured for application to an existing utility vehicle having an existing rack, guard, or bumper, the lift system comprising:
- a frame member (111) having a hook (114) directly connected or integral thereto, the hook (114) configured to allow installation of the lift system onto the existing rack, guard, or bumper in a vertical direction, and inhibit motion of the lift system in a non-vertical direction, the frame member (111) having a support surface (115) configured to engage an outward surface of the existing rack, guard, or bumper in rotational opposition to the hook such that the lift system is aligned in a vertical or near-vertical orientation when installed;
- an upper pivot point (112) on the frame member;
- a lower pivot point (113) on the frame member;
- an upper arm (121) rotatably connected to the upper pivot point (112);
- a lower arm (122) rotatably connected to the lower pivot point (113);
- an adaptive alignment plate (130) movable from a stowed configuration to an extended position the adaptive alignment plate (130) comprising an adjustable upper pivot point (131), and an adjustable lower pivot point (132);
- a modular implement base (140) connected to the adaptive alignment plate (130); and
- at least one modular implement (151), (152), (153) configured to allow installation on and removal from the modular implement base (140);
- wherein the frame member (111) connects the upper pivot point (112), the lower pivot point (113), the hook (114), and the support surface (115);
- wherein the adaptive alignment plate (130) is configured to allow adjustment of the modular implement base (140) to align vertically when the lift system is installed on the utility vehicle; and
- wherein at least one of the adjustable upper pivot point (131) or the adjustable lower pivot point (132) comprises a plurality of attachment points aligned in a circle and selectable to rotatably connect the adaptive alignment plate (130) to either the upper pivot arm (121) or the lower pivot arm (122) while adjusting an angle of alignment between the adaptive alignment plate (130) and the frame member (111).

11. The system according to claim 10, wherein each of the frame member (111) and the adaptive alignment plate (130), respectively, operates in a unique vertical plane across a frame width (W) of the lift system, such that the adaptive alignment plate (130) overlaps the frame member (111) when the adaptive alignment plate is in the stowed configuration to fit within the confines of the fixed frame.

12. The system according to claim 11, wherein the at least one modular implement (151), (152), or (153) is not removable from the modular implement base (140) when the adaptive alignment plate is in the stowed configuration, but is removable from the modular implement base (140) when the adaptive alignment plate is in the extended position.

13. The system according to claim 10, further comprising an actuator comprising a winch cable (171) originating from a winch on the utility vehicle and configured to generate motion of the adaptive alignment plate (130) with respect to the frame member (111), a roller (160A), and an attachment point (160B), both the roller (160A), and the attachment point (160B) operating in a vertical plane centered across the frame width (W) and aligned with a center of mass of the system; the attachment point (160B) configured to detachably receive a winch hook at a first end of the winch cable.

14. The system according to claim 10, further comprising an actuator comprising a winch cable (171) originating from a winch mounted to the frame member and configured to generate motion of the adaptive alignment plate (130) with respect to the frame member (111), a roller (160A), and an attachment point (160B), both the roller (160A), and the attachment point (160B) operating in a vertical plane centered across the frame width (W) and aligned with a center of mass of the system; the winch hook at a first end of the cable configured to detachably receive the attachment point (160B).

15. The system according to claim 10, further comprising an actuator comprising a linear actuator (170B) configured to receive power from a cordless hand tool battery (320), and configured to generate motion of the adaptive alignment plate (130) with respect to the frame member (111).

16. A stowable, modular lift conversion system (100) configured for application to a truck, all-terrain vehicle, or utility task vehicle, the system comprising:
- a fixed frame (110) configured to mount to the truck, all-terrain vehicle, or utility task vehicle, the fixed frame (110) comprising:
- an opposing pair of vertical frame members (111) having a frame height (H) and a frame depth (D), separated by a frame width (W), wherein the frame height (H), the frame depth (D), and the frame width (W) define confines of the fixed frame (110),
- an upper pivot point (112) on each of the vertical frame members (111), and
- a lower pivot point (113) on each of the vertical frame members (111); and
- a movable frame (120) configured to lift loads, and movable from a stowed configuration to an extended position, the movable frame (120) comprising:
- an opposing pair of upper pivot arms (121), each having a near end (121A) respectively connected to one of the upper pivot points (112), and a far end (121B) opposite the near end (121A),
- an opposing pair of lower pivot arms (122), each having a near end (122A) respectively connected to one of the lower pivot points (113), and a far end (122B) opposite the near end (122A), and
- an opposing pair of adaptive alignment plates (130), each connected to the far end (121B) of one of the upper pivot arms (121), and to the far end (122B) of one of the lower pivot arms (122);
- a modular implement base (140) connecting the opposing pair of adaptive alignment plates (130);

wherein the movable frame (120) is configured to fit within the confines of the fixed frame (110) when the movable frame is in the stowed configuration;

wherein each vertical frame member (111) and adaptive alignment plate (130), respectively, operates in a unique vertical plane across the frame width (W), such that each of the adaptive alignment plates (130) respectively overlaps the other of the adaptive alignment plates (130) and overlaps each of the vertical frame members (111) to fit at least partially within the confines of the fixed frame (110) when the movable frame is in the stowed configuration;

wherein the opposing pair of vertical frame members (111), the opposing pair of upper pivot arms (121), the opposing pair of lower pivot arms (122), and the opposing pair of adaptive alignment plates (130) form an opposing pair of four-bar linkages configured to maintain a consistent angle between the vertical frame members (111) and the adaptive alignment plates (130);

wherein the system further comprises a roller (160A), and an attachment point (160B) configured to simultaneously generate a downward force on the fixed frame (110) and an upward force on the movable frame (120) when tension is applied to a winch cable (171) routed in contact with the roller (160A) and the attachment point (160B); and wherein both the roller (160A), and the attachment point (160B) operate in a vertical plane centered across the frame width (W) and aligned with a center of mass of the system, and a winch hook at a first end of the cable is configured to detachably receive the attachment point (160B).

17. The system according to claim 16, wherein each of the adaptive alignment plates (130) comprises an adjustable upper pivot point (131) and an adjustable lower pivot point (132), connecting to the far end (121B) of one of the upper pivot arms (121) and to the far end (122B) of one of the lower pivot arms (122), respectively;

wherein each of the adaptive alignment plates (130) is configured to allow adjustment of the modular implement base (140) to align vertically when the lift system is installed on the truck, all-terrain vehicle, or utility task vehicle;

wherein at least one of the adjustable upper pivot point (131) or the adjustable lower pivot point (132) on each of the adaptive alignment plates (130) comprises a plurality of attachment points aligned in a circle and selectable to rotatably connect the adaptive alignment plate (130) to the far end (121B) of one of the upper pivot arms (121), or to the far end (122B) of one of the lower pivot arms (122), respectively, while adjusting an angle of alignment between the adaptive alignment plate (130) and the fixed frame (110); and wherein the system further comprises an actuator (170A) mounted on the truck, all-terrain vehicle, or utility task vehicle and configured to generate motion of the adaptive alignment plate 130 with respect to the vertical frame member 111, the actuator comprising a winch configured to apply tension to the cable (171), the tension originating from on the truck, all-terrain vehicle, or utility task vehicle.

18. The system according to claim 17, wherein the fixed frame (110) further comprises a hook (114) configured to drop down onto the truck, all-terrain vehicle, or utility task vehicle from above and inhibit motion of the fixed frame (110) in more than one direction when installed, and a support surface (115) configured to support the fixed frame (110) against rotation; and wherein the system further comprises at least one modular implement (151), (152), (153) configured to mount on the modular implement base (140), wherein the at least one modular implement (151), (152), (153) is not removable from the modular implement base (140) when the movable frame is in the stowed configuration, but is removable from the modular implement base (140) when the movable frame is in the extended position.

* * * * *